(12) United States Patent
Berkstresser et al.

(10) Patent No.: US 12,533,869 B2
(45) Date of Patent: Jan. 27, 2026

(54) PROCESSING APPARATUSES AND METHODS OF USING

(71) Applicant: QUANTUMSCAPE BATTERY, INC., San Jose, CA (US)

(72) Inventors: David Berkstresser, San Jose, CA (US); Lucas Broganer, San Jose, CA (US); Timothy Holme, San Jose, CA (US); John Olenick, San Jose, CA (US); Murugan Ramaswamy, San Jose, CA (US); Tugrul Samir, San Jose, CA (US); Matthew Sheffield, San Jose, CA (US); Brad Stimson, San Jose, CA (US); Martin Winterkorn, San Jose, CA (US); Yi Zhou, San Jose, CA (US); Rishi Ramanathan, San Jose, CA (US); Jordan Friedland, San Jose, CA (US); Anand Parejiya, San Jose, CA (US)

(73) Assignee: QuantumScape Battery, Inc., San Jose, CA (US)

( * ) Notice: Subject to any disclaimer, the term of this patent is extended or adjusted under 35 U.S.C. 154(b) by 0 days.

(21) Appl. No.: 19/078,154

(22) Filed: Mar. 12, 2025

(65) Prior Publication Data
US 2025/0236097 A1    Jul. 24, 2025

Related U.S. Application Data

(63) Continuation of application No. PCT/US2023/074226, filed on Sep. 14, 2023.
(Continued)

(51) Int. Cl.
*B32B 18/00* (2006.01)
*B32B 15/04* (2006.01)
(Continued)

(52) U.S. Cl.
CPC .............. *B32B 18/00* (2013.01); *B32B 15/04* (2013.01); *B32B 37/06* (2013.01); *B32B 37/18* (2013.01);
(Continued)

(58) Field of Classification Search
None
See application file for complete search history.

(56) References Cited

U.S. PATENT DOCUMENTS

| | | | |
|---|---|---|---|
| 2,900,254 | A | 8/1959 | Raiklen |
| 3,330,654 | A | 7/1967 | Sweet |

(Continued)

FOREIGN PATENT DOCUMENTS

| | | |
|---|---|---|
| CN | 102 554 249 A | 7/2012 |
| CN | 110 869 456 A | 3/2020 |

(Continued)

OTHER PUBLICATIONS

International search report and written opinion of PCT/US2022/019641 dated Jul. 7, 2022; 14 pages.
(Continued)

*Primary Examiner* — Tae H Yoon
(74) *Attorney, Agent, or Firm* — Squire Patton Boggs (US) LLP

(57) ABSTRACT

Set forth herein are processes for making sintered bilayers and sintered bilayers made by such processes. The process includes rapidly sintering thin bilayers that comprise a green body layer on a metal layer in order to produce bilayers that have a sintered oxide layer on a metal layer.

20 Claims, 20 Drawing Sheets

Related U.S. Application Data

(60) Provisional application No. 63/406,711, filed on Sep. 14, 2022.

(51) Int. Cl.
  *B32B 37/06* (2006.01)
  *B32B 37/18* (2006.01)

(52) U.S. Cl.
  CPC .............. *B32B 2250/02* (2013.01); *B32B 2307/7376* (2023.05); *B32B 2311/22* (2013.01); *B32B 2311/30* (2013.01); *B32B 2315/02* (2013.01)

(56) References Cited

U.S. PATENT DOCUMENTS

| | | |
|---|---|---|
| 3,704,872 A | 12/1972 | Klein |
| 5,089,455 A | 2/1992 | Ketcham et al. |
| 5,567,240 A | 10/1996 | Kogame et al. |
| 5,686,394 A | 11/1997 | Sibata et al. |
| 8,696,350 B2 | 4/2014 | Ohara |
| 9,631,867 B2 | 4/2017 | Borrel |
| 10,026,990 B2 | 7/2018 | Badding et al. |
| 10,155,667 B2 | 12/2018 | Badding et al. |
| 10,396,396 B2 | 8/2019 | Badding et al. |
| 10,486,332 B2 | 11/2019 | Badding et al. |
| 10,563,918 B2 | 2/2020 | Iyer et al. |
| 10,581,115 B2 | 3/2020 | Badding et al. |
| 10,766,165 B2 | 9/2020 | Badding et al. |
| 10,840,544 B2 | 11/2020 | Holme et al. |
| 10,875,212 B2 | 12/2020 | Badding et al. |
| 10,967,539 B2 | 4/2021 | Badding et al. |
| 11,014,822 B2 | 5/2021 | Badding et al. |
| 11,111,155 B1 | 9/2021 | Badding et al. |
| 11,148,321 B2 | 10/2021 | Badding et al. |
| 11,351,697 B2 | 6/2022 | Badding et al. |
| 11,411,245 B2 | 8/2022 | Badding et al. |
| 11,629,915 B2 | 4/2023 | Badding et al. |
| 11,735,707 B2 | 8/2023 | Jamadar et al. |
| 11,768,032 B2 | 9/2023 | Badding et al. |
| 11,953,264 B2 | 4/2024 | Badding et al. |
| 2004/0206470 A1 | 10/2004 | Bayazitoglu |
| 2014/0134438 A1 | 5/2014 | Gadkaree et al. |
| 2015/0099188 A1 | 4/2015 | Holme et al. |
| 2017/0210634 A1 | 7/2017 | Badding et al. |
| 2018/0104848 A1 | 4/2018 | Badding et al. |
| 2019/0077674 A1 | 3/2019 | Badding et al. |
| 2019/0103630 A1 | 4/2019 | Choi |
| 2019/0207252 A1 | 7/2019 | Badding et al. |
| 2019/0280331 A1 | 9/2019 | Holme |
| 2020/0112050 A1 | 4/2020 | Hu et al. |
| 2020/0144660 A1 | 5/2020 | Schneider et al. |
| 2021/0143389 A1 | 5/2021 | Sceats et al. |
| 2021/0344040 A1 | 11/2021 | Donnelly et al. |
| 2022/0085425 A1 | 3/2022 | Jamadar et al. |
| 2022/0166062 A1 | 5/2022 | Kim et al. |
| 2022/0209288 A1 | 6/2022 | Badding et al. |
| 2022/0209289 A1 | 6/2022 | Badding et al. |
| 2022/0278364 A1 | 9/2022 | Badding et al. |
| 2023/0307701 A1 | 9/2023 | Badding et al. |

FOREIGN PATENT DOCUMENTS

| | | |
|---|---|---|
| EP | 0 596 822 A1 | 5/1994 |
| EP | 2 037 527 A1 | 3/2009 |
| EP | 3511137 A1 | 7/2019 |
| EP | 3 408 246 B1 | 2/2020 |
| JP | 2001-031476 A | 2/2001 |
| JP | 2003-328006 A | 11/2003 |
| JP | 2009-203898 | 9/2009 |
| JP | 2010-176941 A | 8/2010 |
| WO | WO 2005/085138 A1 | 9/2005 |
| WO | WO 2010/051345 A2 | 5/2010 |
| WO | WO 2014/036090 | 3/2014 |
| WO | WO 2014/103662 A1 | 7/2014 |
| WO | WO 2017/003980 A1 | 1/2017 |
| WO | WO 2018/118964 A1 | 6/2018 |
| WO | WO 2018/236394 A1 | 12/2018 |
| WO | WO 2020/174961 A1 | 9/2020 |
| WO | WO 2020/236767 A1 | 11/2020 |
| WO | WO 2022/050258 A1 | 3/2022 |
| WO | WO 2022/192464 A1 | 9/2022 |
| WO | WO 2023/154571 A1 | 8/2023 |

OTHER PUBLICATIONS

International search report and written opinion of PCT/US2023/013048 dated Apr. 6, 2023; 18 pages.

Interanational search report and written opinion of PCT/US2023/074226 mailed Feb. 7, 2024; 11 pages.

International search report and written opinion of PCT/US2024/015067 dated Jul. 12, 2024; 13 pages.

Geng, et al., "Effect of sintering atmosphere on ionic conduction and structure of $Li_{0.5}La_{0.5}TiO_3$ solid electrolytes", Materials Science and Engineering B, vol. 164, 2009, pp. 91-95, ISSN 0921-5107, https://doi.org/10.1016/j.mseb.2009.07.011.

Geng, H., et al., "Effect of sintering temperature on microstructure and transport properties of $Li_{3x}La_{2/3-x}TiO_3$ with different lithium contents", Electrochimica Acta, vol. 56, issue 9, 2011, pp. 3406-3414, ISSN 0013-4686, https://doi.org/10.1016/j.electacta.2010.06.031.

Hu eat al. "Highly conductive paper for energy-storage devices", PNAS, vol. 106, No. 51, Dec. 22, 2009, pp. 21490-21494; www.pnas.org/cgi/doi/10.1073/pnas.0908858106.

Lu et al., "Electrochemical performance of $LiCoO_2$ cathodes by surface modification using lanthanum aluminum garnet", Journal of Power Sources 184 (2008) 392-401; doi:10.1016/j.jpowsour.2008.04.087.

TA Instruments: "DILATOMETRY", Dec. 30, 2013, pp. 1-32, XP093035804; Retrieved from the Internet: URL:https://tainstruments.com.cn/wp-content/uploads/DIL_805.pdf [retrieved on Mar. 29, 2023].

Waetzig, et al., "Synthesis and sintering of $Li_{1.3}Al_{0.3}Ti_{1.7}(PO_4)_3$ (LATP) electrolyte for ceramics with improved Li+ conductivity", Journal of Alloys and Compounds, vol. 818, 2020, 153237, ISSN 0925-8388, https://doi.org/10.1016/j.jallcom.2019.153237.

Wang et al., "A general method to synthesize and sinter bulk ceramics in seconds", Science 368, May 1, 2020, pp. 521-526.

Yan, G. et al., "Influence of sintering temperature on conductivity and mechanical behavior of the solid electrolyte LATP", Ceramics International, vol. 45, Issue 12, 2019, pp. 14697-14703, ISSN 0272-8842, https://doi.org/10.1016/j.ceramint.2019.04.191.

Low Tension -

High Tension -

PROCESSING APPARATUSES AND METHODS OF USING

CROSS-REFERENCE

This application is a Continuation of International PCT Patent Application No. PCT/US2023/074226, filed Sep. 14, 2023, which claims priority to, and the benefit of, U.S. Provisional Patent Application No. 63/406,711, filed Sep. 14, 2022, the entire contents of each of which are herein incorporated by reference in its entirety for all purposes.

FIELD

The present disclosure concerns processes for calcining, debindering, and/or sintering ceramics. In some examples, these ceramics are deposited as a layer on top of a metal layer. These two layers make a bilayer. The bilayer is heated in a continuous processing apparatus.

BACKGROUND

Certain methods of sintering lithium-stuffed garnet (lithium lanthanum zirconium oxide; LLZO), such as batch sintering of LLZO, has been described, in, for example, U.S. Pat. No. 10,563,918 B2 or 10,840,544 B2. Containerless sintering of certain ceramics is disclosed in US Patent Application No. US 2004/0206470 A1; and also, International PCT Patent Application Publication No. WO 2014/103662 A1.

Despite this background, there is a need for processes for making thin film ceramics or ceramic bilayers, such as sintering lithium-stuffed garnet in a thin film, or bilayer, format. There is also a need for processes that use high-throughput continuous sintering processes such as roll-to-roll methods.

SUMMARY

In one embodiment, set forth herein is a process for making a sintered bilayer, comprising: providing a green bilayer, comprising a green body layer and a metal layer, under tension of 1 N to 300 N per meter of web width; moving the green bilayer through a first heating zone to produce a debindered bilayer; moving the debindered bilayer through a second heating zone to prepare a sintered bilayer; wherein the debindered bilayer is in an arched configuration as the debindered bilayer moves through the second heating zone; wherein the debindered bilayer is in the second heating zone for about 1 second to about 3 minutes; wherein the temperature in the second heating zone is 1050° C. to 1250° C.; and wherein the thickness of the sintered bilayer is less than 100 µm.

In some embodiments, set forth herein is a processing apparatus comprising: a front roller; at least one furnace comprising at least three heating zones; and a runway having a surface that comprises a material selected from: nickel (Ni), iron (Fe), a Ni-alloy, an Fe-alloy, a Ni—Fe alloy, stainless steel, pyrolytic carbon, carbon fiber composite (CFC), graphite, alumina ($Al_2O_3$), zirconia ($ZrO_2$), boron nitride, silicon carbide, magnesium oxide, or a combination thereof.

In other embodiments, set forth herein is a processing apparatus comprising: a front roller; at least one furnace comprising at least three heating zones; and at least one of the following: baffles within a heating zone; baffles between two heating zones; curtain purges between two heating zones; means for controlling at least two distinct pressure zones within the at least three heating zones; means for exhausting through the center of the at least one furnace; means for exhausting through the center of the runway; means for purging gas between two heating zones; means for isolating gas between two heating zones; means for mechanically separating two heating zones; or a combination thereof.

In some other embodiments, set forth herein is a processing apparatus comprising: a front roller; at least one furnace comprising at least three heating zones; and a bilayer held under tension, wherein the tension ranges from 0.1 g/cm to 500 g/cm of web width.

In certain other embodiments, set forth herein is a processing apparatus comprising: a front roller; at least one furnace comprising at least three heating zones; a bilayer; and at least two or more rollers; wherein the bilayer is wrapped around one of the at least two or more rollers at a wrap angle that ranges from 0 to 40°.

In yet other embodiments, set forth herein is a process of using a continuous process apparatus, comprising the following operations: (a) heating a green bilayer as the green bilayer moves through at least one furnace to produce a bilayer having less than 1 weight percentage (wt %) organic content, and (b) winding the bilayer having less than 1 wt % organic content onto a roller.

In certain embodiments, set forth herein is a process of using a continuous process apparatus, comprising the following operations: (a) providing, or having provided, a process apparatus as disclosed herein; (b) heating the bilayer as the bilayer moves through the at least one furnace to produce a bisqued bilayer, and (c) winding the bisqued body.

In some other embodiments, set forth herein is a process of using a continuous process apparatus, comprising the following operations: (a) providing, or having provided, a process apparatus as disclosed herein; (b) heating a bilayer as the bilayer moves through the at least one furnace to produce a sintered bilayer.

BRIEF DESCRIPTIONS OF THE DRAWINGS

Figure 10:
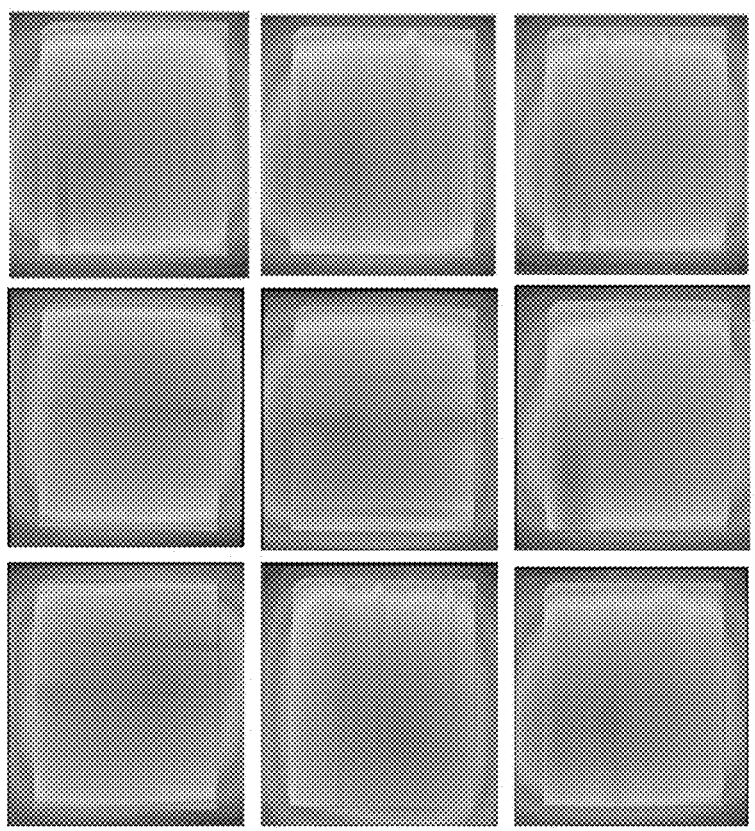
Figure 10:
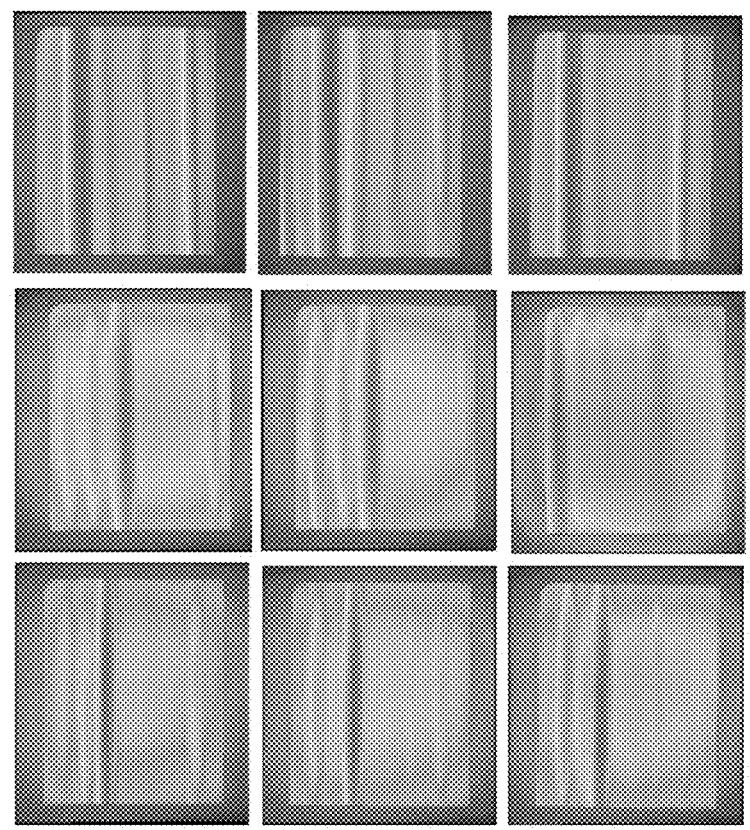

FIG. 10 shows a Keyence microscope image of bilayer flatness a function of the tension on the bilayer. The flatness analysis by the Keyence microscopy is measured at the surface of the sintered oxide layer of the bilayer not at the surface of the metal layer of the bilayer. The flatness is a measurement of the flatness of the sintered oxide layer's surface.

Figure 11:
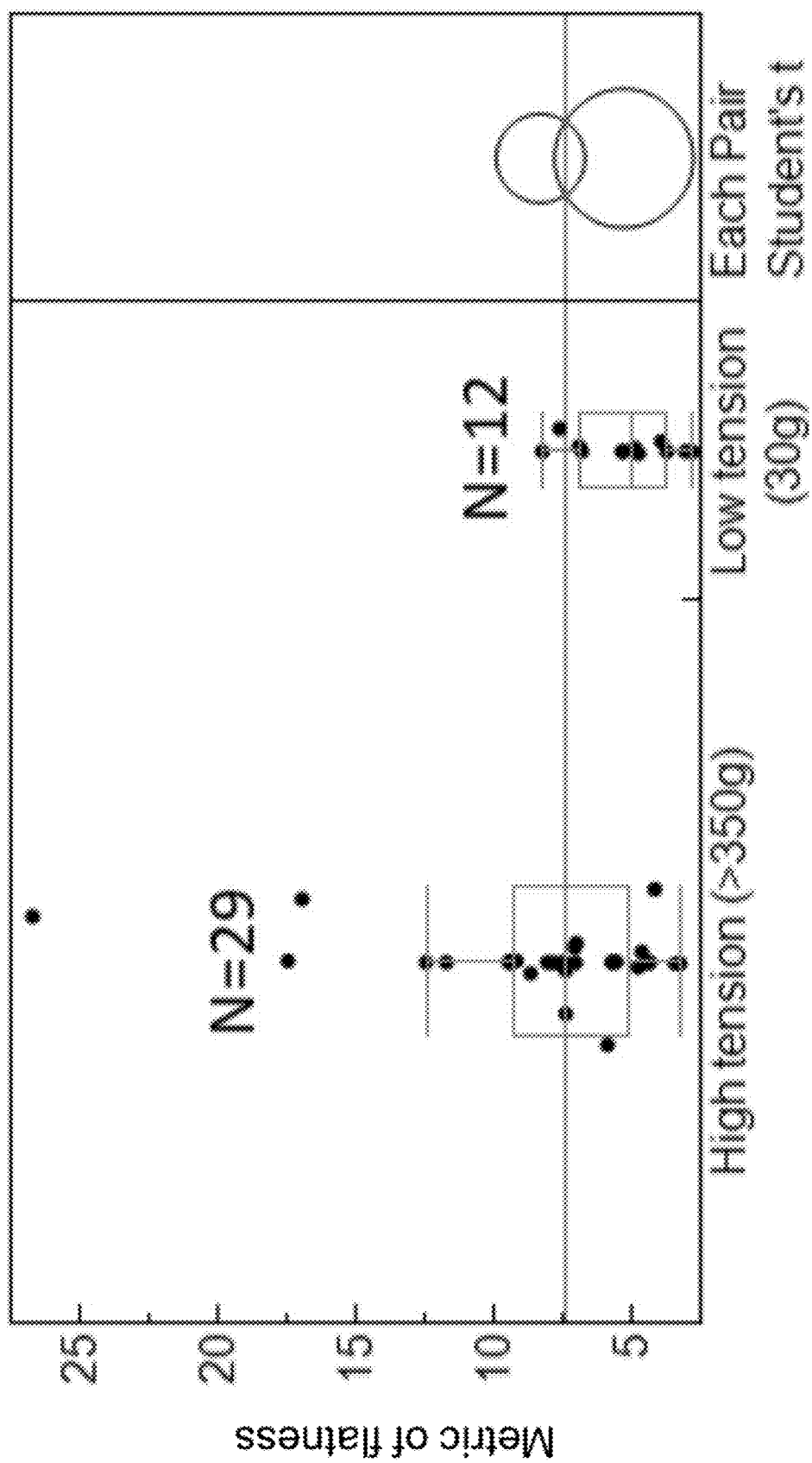

FIG. 11 shows a table that is quantifying flatness of different bilayers as a function of the tension applied to the bilayer during sintering.

Figure 12:
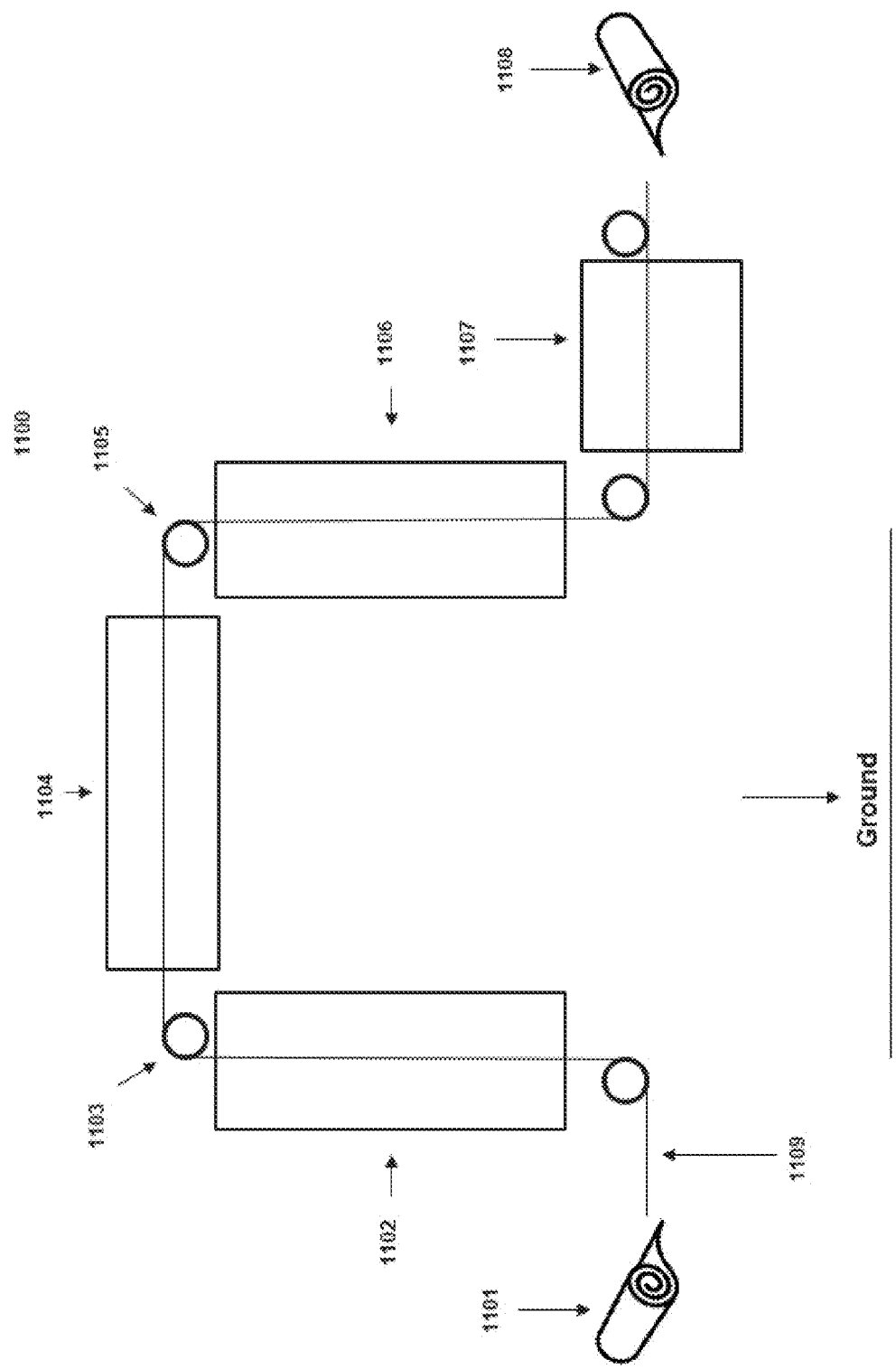

FIG. 12 shows an embodiment of a processing apparatus set forth herein.

Figure 13:
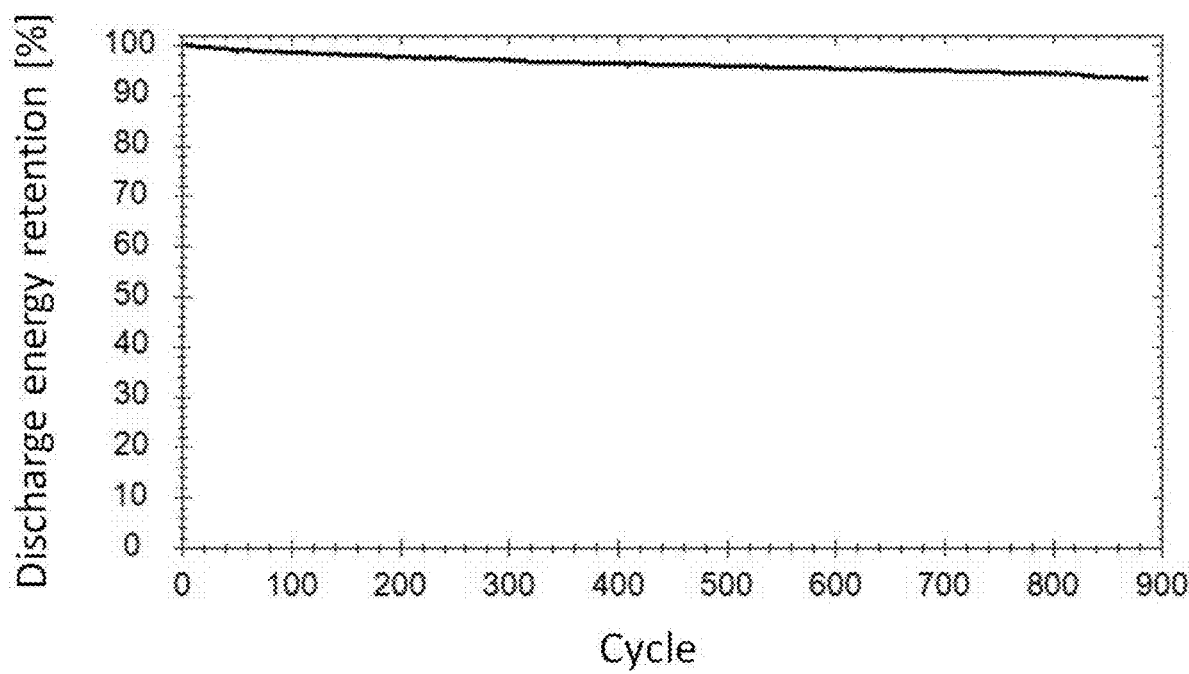

FIG. 13 shows electrochemical cycling results from Example 7.

Figure 14:
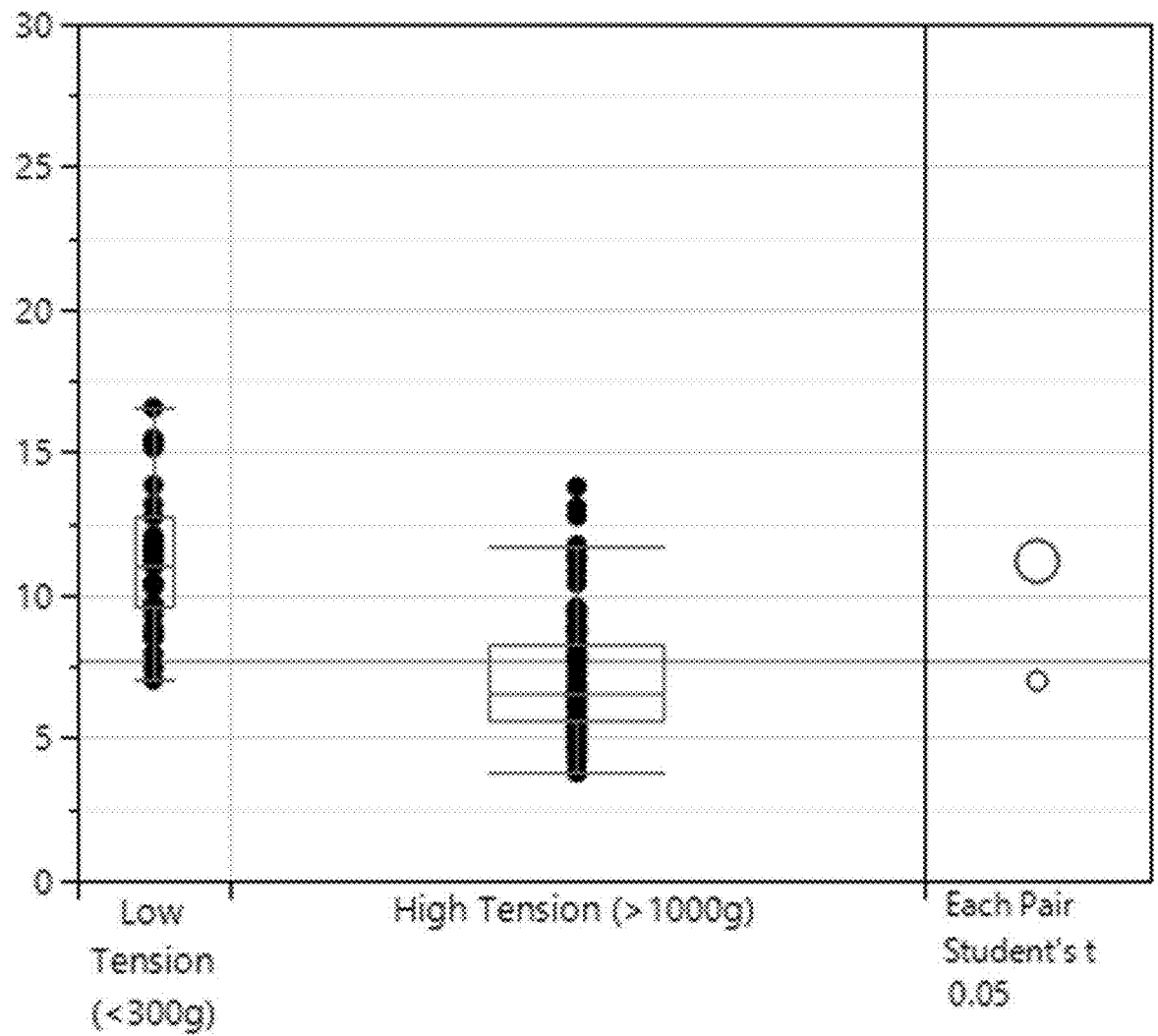

FIG. 14 shows a table quantifying flatness as a function of the tension on the bilayer that was sintered on a curved runway.

Figure 15:
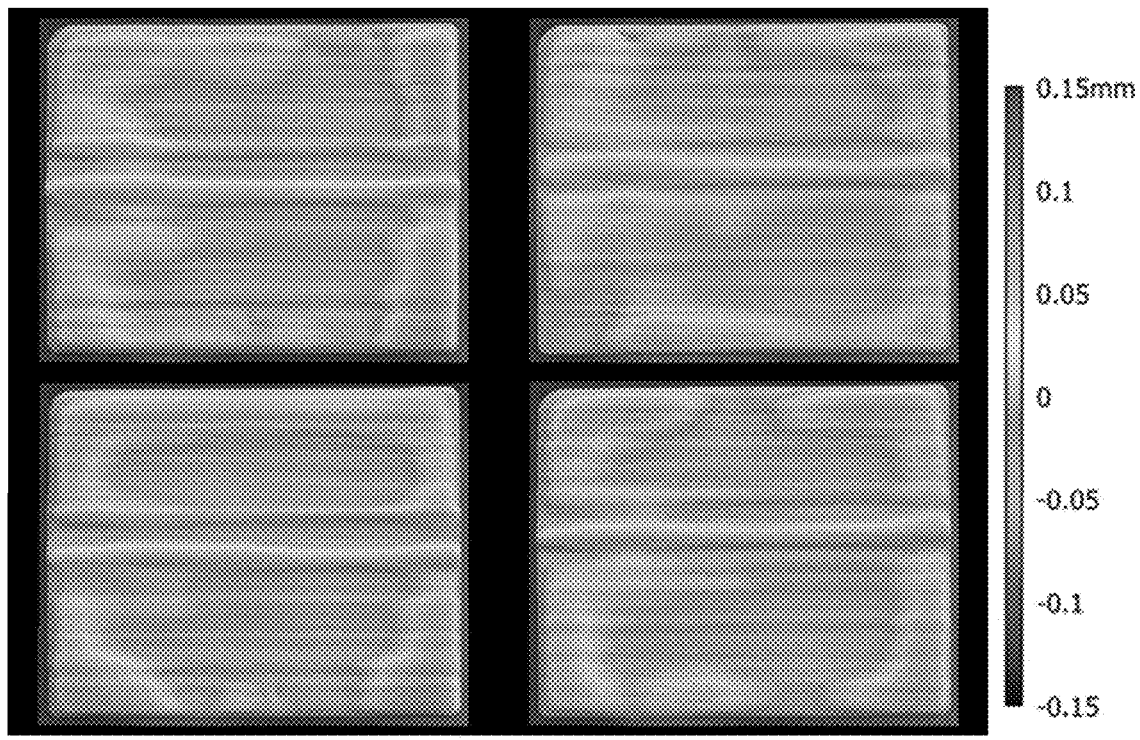

FIG. 15 shows a Keyence microscope image height map of bilayers that were made on a flat runway.

Figure 16:
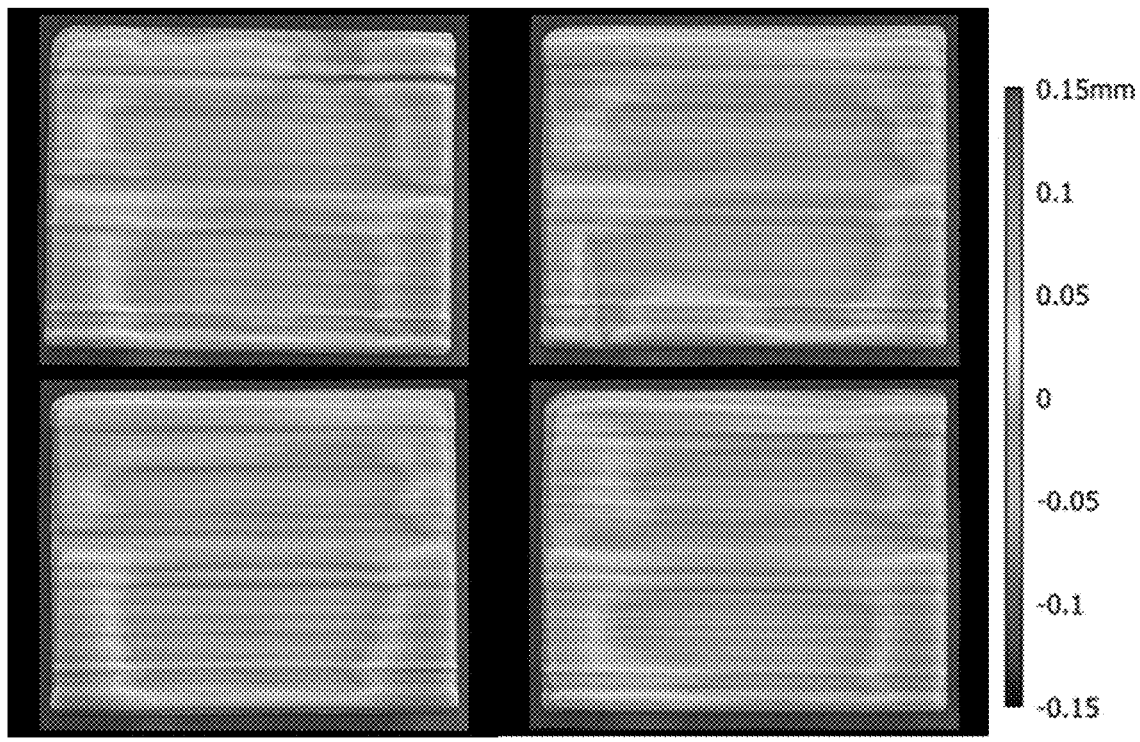

FIG. 16 shows a Keyence microscope image height map of bilayers that were made on a curved (i.e., arched configuration) runway.

Figure 17:
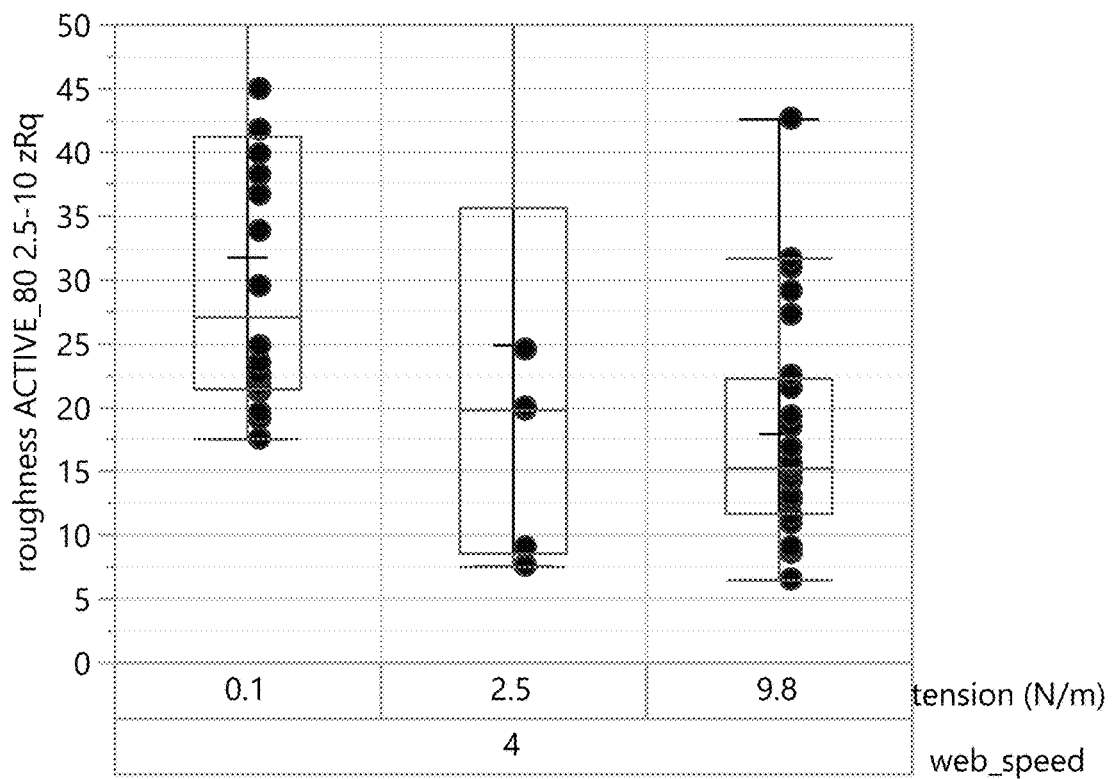

FIG. 17 shows flatness as a function of tension on the bilayer during the heat treatment process.

Figure 18:
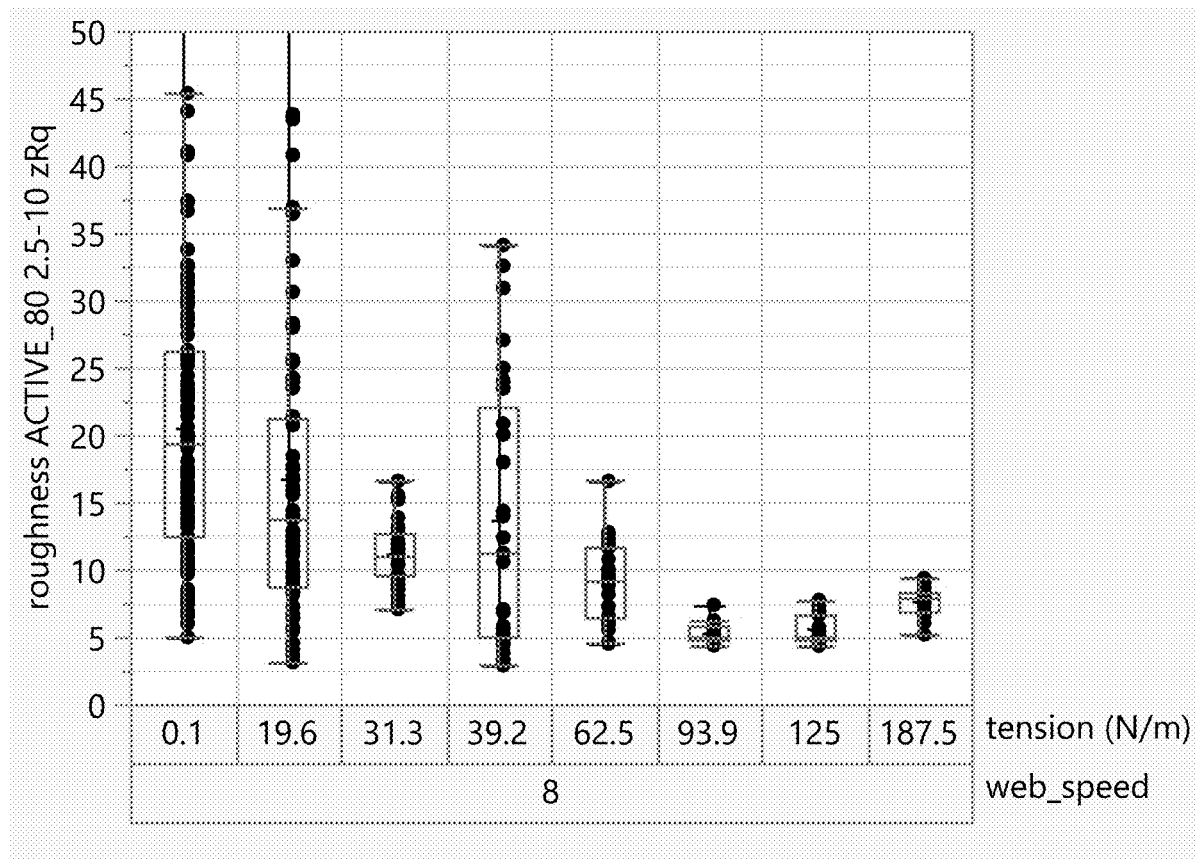

FIG. 18 shows flatness as a function of tension on the bilayer during the heat treatment process.

Figure 19:
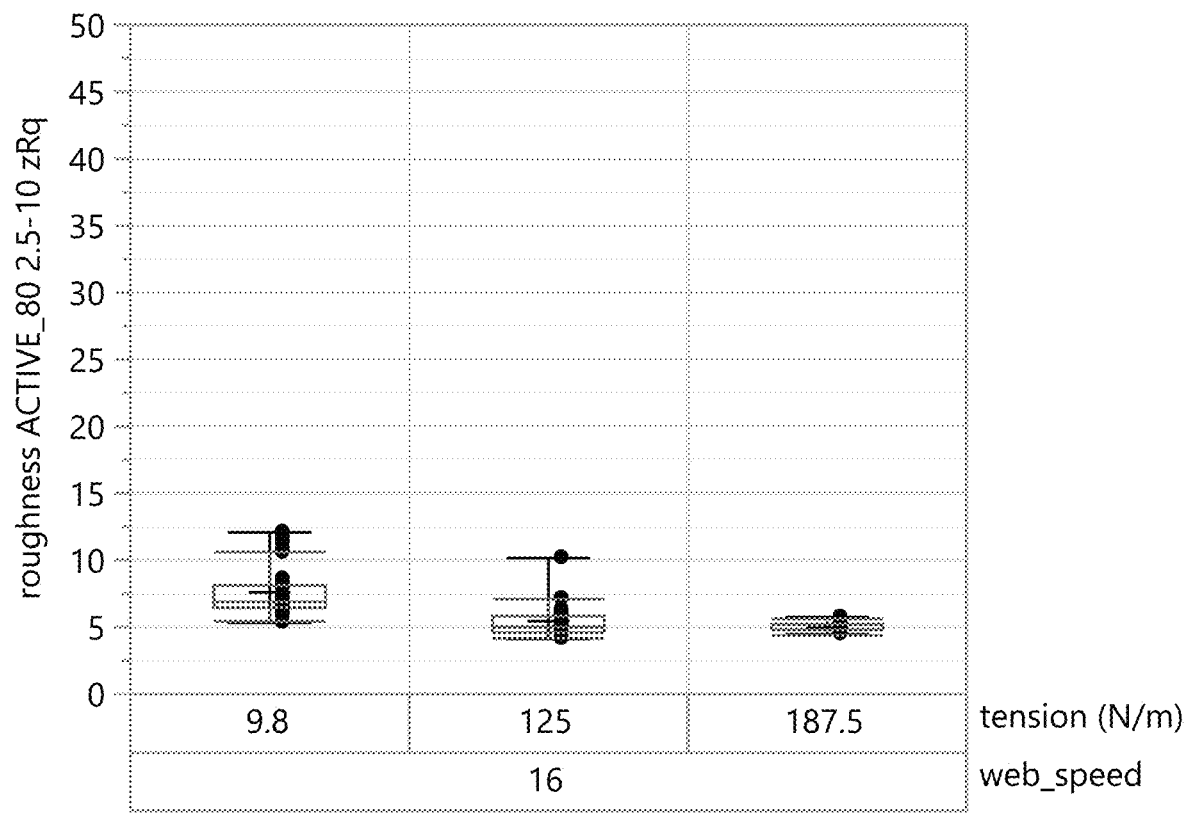

FIG. 19 shows flatness as a function of tension on the bilayer during the heat treatment process.

Figure 20:
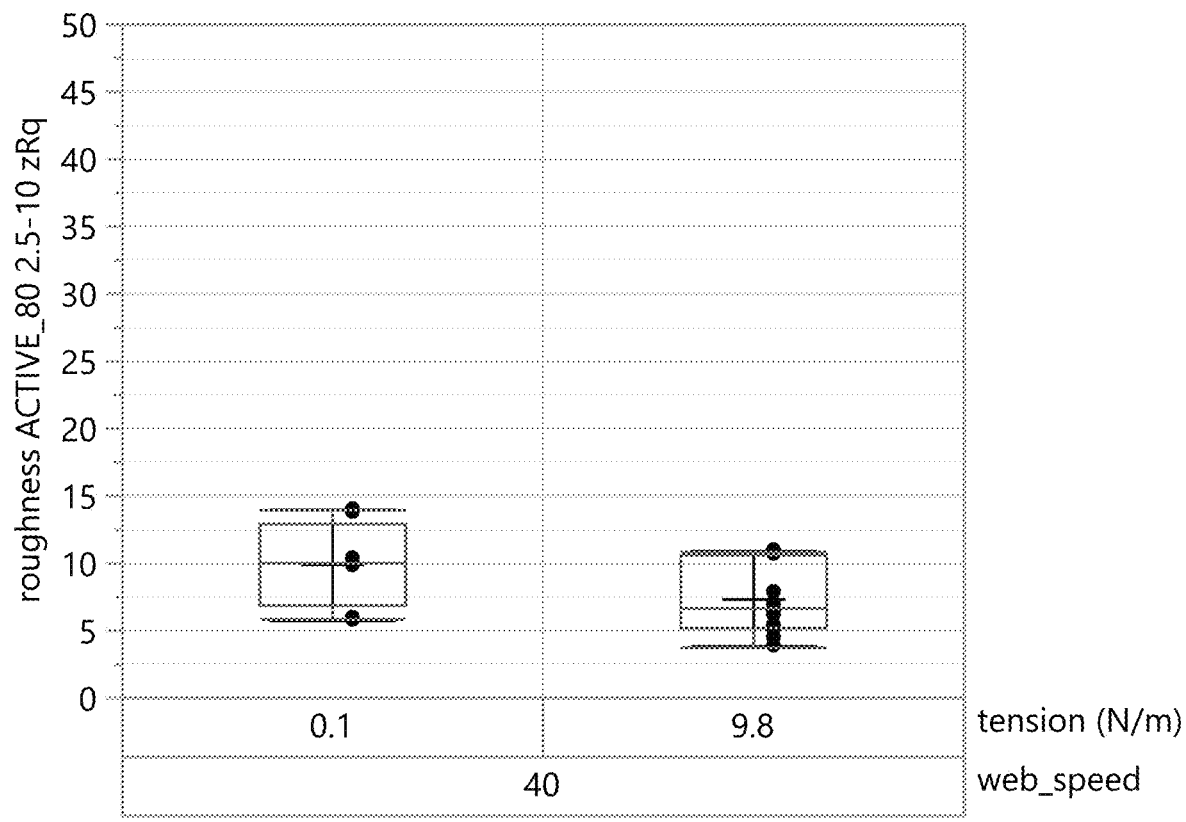

FIG. 20 shows flatness as a function of tension on the bilayer during the heat treatment process.

DETAILED DESCRIPTION

A. Introduction

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the instant disclosure.

All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

While shown in a horizontal format, in some embodiments, the continuous manufacturing lines in the figures herein could be assembled in a vertical format with green tapes or bilayers moving in a parallel or antiparallel direction relative to the immediate downward pull of gravity on the surface of the Earth. For example, a vertical format might have green tapes or bilayers moving up or down and normal (at 90°; i.e., a right angle) to the floor in which the process was occurring. Further, there may be angles between various ovens such that the green tape bends away from a straight line while being processed. The figures herein are presented as representative, non-limiting embodiments, of the instant disclosure. Other configurations and orientations of ovens and sintering lines are contemplated as embraced by the instant disclosure. In some configurations, the green tape moves parallel to gravity. For example, the green tape may hang like a curtain under the weight applied by gravitational forces. In some configurations, the tape moves perpendicular to gravity; for example, the green tape may move in a direction parallel to the floor.

As used herein, a green film moving through a processing apparatus may be described in x-, y-, and z-dimensions. The x- and y-directions of the green film describe the length and width of the green film, whereas the z-direction describes the thickness of the green film. When a green film is moved through the processing apparatus, or in the machine direction (MD), the film is described as moving in the x-dimension, or the web dimension. The cross-web dimension (or cross direction (CD)), describes the y-dimension, in the same plane as the web. The z-dimension is perpendicular to the web and describes the thickness of the web.

Set forth herein is equipment and processes useful for achieving high quality, rapidly processed ceramic electrolyte films. Set forth herein are high-throughput continuous processes for sintering thin film ceramics. The ceramics may include, but are not limited to, lithium aluminum titanium phosphate (LATP), lithium-stuffed garnet oxides (e.g., $Li_7La_3Zr_2O_{12}$ and $Li_7La_3Zr_2O_{12}Al_2O_3$; aka LLZO), lithium lanthanum titanate, and lithium aluminum germanium phosphate (LAGP). The processes include, in certain embodiments, sintering steps in which the sintering film (i.e., a green film or green body on a bilayer which is undergoing the process of becoming a sintered film or sintered bilayer) is not in contact with any surface as it sinters. In some embodiments, when a bilayer is used, the metal layer may contact surfaces, but the green body will not contact surfaces of the processing apparatus during its passage through the furnace or furnaces. By sintering without contacting other surfaces during sintering, the sintered ceramic films prepared by the instant process have unexpectedly advantageous properties such as low flatness. For lithium-stuffed garnet, the processing apparatus has the unexpectedly advantageous property of permitting the retention of the stoichiometric amount of lithium in a given LLZO formula and advantageous LLZO microstructure (e.g., high density, small grain size, and combinations thereof). In some embodiments, by not contacting other surfaces, the materials prepared lack surface flaws. In some embodiments, by not contacting the green body to surfaces, the bilayers prepared herein lack surface flaws on the ceramic side of the bilayer. In some embodiments, by not contacting other surfaces, the materials are prepared without problems such as sticking to a substrate. Additionally, these sintered LLZO are prepared via a novel rapid sintering process. The process is faster per unit volume of product than other processes for making sintered films of LLZO.

Set forth herein are processes for continuously processing a bilayer include a step 1) binder burn-out (BBO), which occurs between room temperature and moderately high temperature, in order to remove the organic material from the bilayer, and step 2) sintering, which at very high temperature, to transform the ceramic powder into a dense solid.

In both stages as well as during the cool down to room temperature afterwards, the temperature profile and gas environment are controlled, and the web of bilayer tape needs to be handled in a way to ensure the final product is flat and free of defects. The specific requirements to achieve this quality are described below in this document.

In some processes, herein, both processing stages (BBO and Sintering), occur in a single tool. In other embodiments, a separate tool is used for each stage, i.e., one tool for BBO and one tool for Sintering.

B. Definitions

As used herein, the term "about," when qualifying a number, e.g., about 15% w/w refers to the number qualified and optionally the numbers included in a range about that qualified number that includes ±10% of the number. For example, about 15% w/w includes 15% w/w as well as 13.5% w/w, 14% w/w, 14.5% w/w, 15.5% w/w, 16% w/w, or 16.5% w/w. For example, "about 75° C.," includes 75° C. as well 68° C., 69° C., 70° C., 71° C., 72° C., 73° C., 74° C., 75° C., 76° C., 77° C., 78° C., 79° C., 80° C., 81° C., 82° C., or 83° C.

As used herein, "selected from the group consisting of" refers to a single member from the group, more than one member from the group, or a combination of members from the group. A member selected from the group consisting of A, B, and C includes, for example, A only, B only, or C only, as well as A and B, A and C, B and C, as well as A, B, and C.

As used herein, "roller," refers to a revolving cylinder or other shape over or on which something is moved or which is used to convey, move, press, shape, spread, or smooth something. A roller is not necessary a perfect mathematical cylinder. A roller can be any shape onto which a tape or film could move across or bend around; or a shape onto which a tape or film could be wound up. In some embodiments, a roller has an outer diameter equal to, or greater than, 6 cm. In some embodiments, a roller has a winding tension equal to, or greater than, 20 g/cm. A roller may have a convex or concave profile. A roller has one axis of rotational symmetry.

A "bilayer" herein includes a ceramic layer deposited onto a metal layer. The ceramic layer may be a green body or a sintered body. In some embodiments, the green body is continuous and in other embodiments the green body is deposited in a patch coating format. After sintering, a bilayer may have a ceramic layer thickness of 10-50 μm and the metal layer thickness is 2-20 μm thick. The bilayer may have a ceramic layer thickness of 20-30 μm and the metal layer thickness is 3-10 μm thick.

A green bilayer, before binder burn-out and sintering, unless specified otherwise, incudes a thin metal foil and a thicker layer of green ceramic material deposited onto it. The green ceramic layer consists of ceramic powder particles embedded in an organic matrix. A green bilayer herein includes a green body layer and a metal layer.

A sintered bilayer is a green bilayer that has undergone processing in a processing apparatus described herein, wherein the sintered bilayer is comprised of a sintered body and a metal layer.

As used herein, the phrase "green film" or "green tape" refers to an unsintered tape or film that includes lithium-stuffed garnet, precursors to lithium-stuffed garnet, or a combination thereof and at least one of a binder, plasticizer, carbon, dispersant, solvent, or combinations thereof. As used herein, "green film tape" refers to a roll, continuous layer, or cut portion thereof of casted tape, either dry or not dry, of green film. A green body is used interchangeably with green film or green tape. A green tape may also include the patches of green bodies which are deposited on a metal layer (i.e., patch coating of a metal layer).

As used herein, a "green body" is a material which is deposited from a slurry and which includes ceramics, or ceramic precursors, and at least one member selected from a solvent, a binder, a dispersant, a plasticizer, a surfactant, or a combination thereof. A green body is considered green before it is heated to either, or both, remove organic material such as the solvent, binder, dispersant, plasticizer, surfactant, or a combination thereof; or sinter the ceramic component of the green body. A green body is made by depositing a slurry onto a substrate and optionally allowing the deposited slurry to dry.

As used herein, "front roller," refers to a roller positioned at the beginning of the processing apparatus and which unwinds, or unrolls, unsintered films, green films, or green bilayers.

As used herein, "end roller," refers to a roller positioned at the end of the processing apparatus and which winds up, or rolls up, sintered films, bilayers, debindered films, or bilayers.

As used herein, "sintered article receiver," refers to any device, including but not limited to an end roller or a machine which cuts and stacks sintered films. As used herein, an oven or a furnace is a partially or completely enclosed compartment in which material may be heated to a temperature above room temperature. For example, an oven may be heated to up to 1,200° C. A binder burn out oven is typically heated to less than 750° C. A bisque oven is typically heated to 600-900° C. A sintering oven is typically heated to 900° C. to 1,450° C. In some embodiments, at least one oven is enclosed in an atmospheric enclosure. In other embodiments, the processing apparatus is enclosed in an atmospheric enclosure. Herein oven and furnace are used interchangeably.

As used herein, "atmospheric control," refers to a system that controls the moisture content, oxygen content, gas flow rate, gas temperature, gas content(s), gas concentration(s), total pressure, vacuum, and combinations thereof within an enclosed or confined space. Atmospheric control can be dynamic in the sense that the system responds to sensed conditions and modifies the atmosphere so as to modify the atmosphere to more closely adhered to certain predetermined conditions. Atmosphere in this instance refers to the gaseous environment immediately in contact with a green tape that is being heated, calcined, sintered, or cooled; or the gaseous environment immediately in contact with a sintered tape that is being heated, sintered, annealed, or cooled. In some embodiments described herein, atmospheric control includes controlling the flow rate of an inlet gas comprising any of oxygen, argon, nitrogen, helium and/or hydrogen. In some embodiments, described herein, atmospheric control includes controlling the amount of water, oxygen, and lithium which is present in the gas state and in immediate contact with a green tape that is being heated, calcined, sintered, or cooled; or in immediate contact with a sintered tape that is being heated, sintered, annealed, or cooled. Atmospheric control may use various gas curtains, gas densities, gas flow rates, gas flow directions, or pulses of gases in, around, and near ovens, furnaces, and any inlets or outlets as well as any apertures through which material such as a green tape or sintered article may pass into or out of an oven or furnace. Atmospheric control may refer to a system wherein nitrogen gas, argon gas, forming gas, dry air, or humidified air is used within an enclosed or confined space. Atmospheric control may refer to a system wherein partial vacuum may be applied to the system, such as when the pressure is less than atmospheric pressure.

As used herein, a "gas curtain," refers to gas flow rates at certain entrances or exits (e.g., green tape inlets and sintered film outlets) of an oven wherein the gas flow rate is determined. For example, the gas flow rate may be between 1-50 Liters/minute at standard pressure and temperature. For example, the gas flow rate may be between greater than 50 Liters/minute at standard pressure and temperature. Gas curtains may be configured to achieve a certain turnover of gas in the chamber per unit time, for example, to exchange the volume of the chamber once per minute. For example, if a chamber has an internal volume accessible to gas of 30 liters, the gas curtain may be configured to flow 30 liters/minute at STP to achieve one turnover per minute. Gas curtains may have pressure sensors at an outlet. The gas curtain flows across the entrance or exit of an oven to control the flow of gas within the oven. A gas curtain may help to maintain a certain atmosphere inside the oven by preventing, partially or completely, gas from exiting or entering the oven.

As used herein the phrase "dry air," refers to air with a reduced amount of humidity. Dry air may be supplied in a clean room. Dry air is characterized as having a dew point less than −20° C., less than −30° C., less than −40° C., less than −50° C., less than −60° C., or less than −70° C.

As used herein the phrase "solid separator" refers to a Li+ ion-conducting material that is substantially insulating to electrons (e.g., the lithium ion conductivity is at least 103 times, and often 106 times, greater than the electron conductivity), and which acts as a physical barrier or spacer between the positive and negative electrodes in an electrochemical cell.

As used herein the phrase "annealing," refers heating a material, e.g., from 100° C. to 1400° C., or e.g., 100° C., 150° C., 200° C., 250° C., 300° C., 350° C., 400° C., 450° C., 500° C., 550° C., 600° C., 650° C., 700° C., 750° C., 800° C., 850° C., 900° C., 950° C., 1000° C., 1050° C., 1100° C., 1150° C., 1200° C., 1250° C., 1300° C., 1350° C., or 1450° C. in a controlled atmosphere, e.g., dry air, nitrogen or argon. Some example annealing methods are found in U.S. Pat. No. 9,966,630 B2, which is incorporated by reference herein in its entirety for all purposes.

As used herein, "area-specific resistance" (ASR) is measured by electrochemical cycling using an Arbin, Maccor or Biologic instrument unless otherwise specified to the contrary. The ASR is calculated by measuring a voltage drop $\Delta V$ after 30-180 s in response to a current interrupt measurement ASR=$\Delta V/J$, where J is the current density in A/cm$^2$.

As used herein, ionic conductivity is measured by electrical impedance spectroscopy methods known in the art.

As used herein, the phrase "ambient conditions," refers to room temperature and a natural atmosphere such as the atmosphere of planet Earth that includes approximately 78% $N_2$ & 21% $O_2$; and/or with moisture also present. Ambient conditions include standard temperature and pressure, with a relative humidity of at least 1%.

As used herein, the term "electrolyte" refers to an ionically conductive and electrically insulating material. Electrolytes are useful for electrically insulating the positive and negative electrodes of a rechargeable battery while allowing for the conduction of ions, e.g., Li$^+$, through the electrolyte As used herein, the phrase "film" or "thin film" refers to a thin membrane of less than 0.5 mm in thickness and greater than 10 nm in thickness. A thin film is also greater than 5 mm in a lateral dimension. A "film" or "thin-film" may be produced by a continuous process such as tape-casting, spray-coating, or slip casting. In some embodiments, the production may include batch process. In some embodiments, the production may include screen-printing.

As used herein, the phrase "thickness" refers to the distance, or median measured distance, between the top and bottom faces of a film, layer, or bilayer. As used herein, the top and bottom of a bilayer refer to the sides of the bilayer having the largest surface area. As used herein, thickness is measured by cross-sectional scanning electron microscopy unless specified otherwise. Cross-sectional SEM can also be used to determine the thickness of a bilayer's metal layer and the thickness of the bilayer's sintered oxide layer. The thickness of the sintered oxide layer is the distance from the face of the sintered oxide layer having the largest surface area to the interface between the metal layer and the sintered oxide layer. The thickness of the metal layer is the distance from the face of the metal layer having the largest surface area to the interface between the metal layer and the sintered oxide layer.

As used herein, "binder" refers to a polymer with the capability to increase the adhesion and/or cohesion of material, such as the solids in a green tape. Suitable binders may include, but are not limited to, PVDF, PVDF-HFP, SBR, and ethylene alpha-olefin copolymer. A "binder" refers to a material that assists in the adhesion of another material. For example, as used herein, polyvinyl butyral is a binder because it is useful for adhering garnet materials. Other binders may include polycarbonates. Other binders may include poly acrylates and poly methacrylates. These embodiments of binders are not limiting as to the entire scope of binders contemplated here but merely serve as embodiments. Binders useful in the present disclosure include, but are not limited to, polypropylene (PP), polyethylene, atactic polypropylene (aPP), isotactic polypropylene (iPP), ethylene propylene rubber (EPR), ethylene pentene copolymer (EPC), polyisobutylene (PIB), styrene butadiene rubber (SBR), polyolefins, polyethylene-co-poly-1-octene (PE-co-PO), polyethylene-co-poly(methylene cyclopentane) (PE-co-PMCP), poly(methyl methacrylate) (and other acrylics), acrylic, polyvinylacetacetal resin, ethyl methacrylate, polyvinyl butyral resin, PVB, polyvinyl acetal resin, stereoblock polypropylenes, polypropylene polymethylpentene copolymer, polyethylene oxide (PEO), PEO block copolymers, silicone, and the like. In some embodiments, including any of the foregoing, the binder is a polymer is selected from the group consisting of polyacrylonitrile (PAN), polypropylene, polyethylene, polyethylene oxide (PEO), poly methyl methacrylate (PMMA), poly(butyl methacrylate), polyvinyl chloride (PVC), polyvinyl pyrrolidone (PVP), polyethylene oxide poly(allyl glycidyl ether) PEO-AGE, polyethylene oxide 2-methoxy ethoxy ethyl glycidyl ether (PEO-MEEGE), polyethylene oxide 2-methoxyethoxyethyl glycidyl poly(allyl glycidyl ether) (PEO-MEEGE-AGE), polysiloxane, polyvinylidene fluoride (PVDF), polyvinylidene fluoride hexafluoropropylene (PVDF-HFP), ethylene propylene (EPR), nitrile rubber (NPR), styrene-butadiene-rubber (SBR), polybutadiene polymer, polybutadiene rubber (PB), polyisobutadiene rubber (PIB), polyolefin, alpha-polyolefin, ethylene alpha-polyolefin, polyisoprene rubber (PI), polychloroprene rubber (CR), acrylonitrile-butadiene rubber (NBR), and polyethyl acrylate (PEA).

Solvents used herein may be selected from alcohols, such as methanol, ethanol, isopropanol, butanol, pentanol, hexanol, and other classes of organic solvents such as ethers and aromatic solvents, including, but not limited to, dibutyl ether, diethyl ether, diisopropyl ether, dimethoxy ethane, diethoxy ethane, tetrahydrofuran, toluene, xylene, toluene: ethanol, acetone, N-methyl-2-pyrrolidone (NMP) diacetone alcohol, ethyl acetate, acetonitrile, hexane, nonane, dodecane, and methyl ethyl ketone (MEK).

In certain embodiments, the dispersant used is selected from fish oil, Mehaden Blown Fish Oil, mineral oils, phosphate esters, Rhodoline™, Rhodoline 4160, phospholan-131™, BYK™ 22124, BYK-22146™, Hypermer KD1™, Hypermer KD6™ and Hypermer KD7™.

As used herein the phrase "casting a film," refers to the process of delivering or transferring a liquid or a slurry into a mold, or onto a substrate, such that the liquid or the slurry forms, or is formed into, a film. Casting may be done via doctor blade, meyer rod, comma coater, gravure coater, microgravure, reverse comma coater, slot die, slip and/or tape casting, and other methods.

As used herein, the phrase "lithium-stuffed garnet" refers to oxides that are characterized by a crystal structure related to a garnet crystal structure. Lithium-stuffed garnets include compounds having the formula $Li_ALa_BZr_CO_F$, $Li_4La_BM'_CM''_DTa_EO_F$, or $Li_ALa_BM'_CM''_DND_EO_F$, wherein $4<A<8.5$, $1.5<B<4$, $0<C<2$, $0<D<2$; $0<E<2.5$, $10<F<13$, and M' and M" are each, independently in each instance selected from Al, Mo, W, Nb, Ga, Sb, Ca, Ba, Sr, Ce, Hf, Rb, and Ta; or $Li_aLa_bZr_cAl_dMe''_eO_f$, wherein $5<a<7.7$; $2<b<4$; $0<c\leq2.5$; $0<d<2$; $0<e<2$, $10<f<13$ and Me" is a metal selected from Nb, V, W, Mo, Ta, Ga, and Sb. Garnets, as used herein, also include those garnets described above that are doped with Al or $Al_2O_3$. Also, garnets as used herein include, but are not limited to, $Li_ALa_BZr_CO_F + yAl_2O_3$, wherein x may be from 5.8 to 7.0, and y may be 0.1, 0.2, 0.3, 0.4, 0.5, 0.6, 0.7, 0.8, 0.9, or 1.0; and wherein $4<A<8.5$, $1.5<B<4$, $0<C\leq2$, $0<D<2$; $10<F<13$. Also, garnets as used herein include, but are not limited to, $Li_xLa_3Zr_2O_{12} + yAl_2O_3$, wherein x may be from 5.8 to 7.0, and y may be 0.1, 0.2, 0.3, 0.4, 0.5, 0.6, 0.7, 0.8, 0.9, or 1.0. As used herein, garnet does not include YAG-garnets (i.e., yttrium aluminum garnets, or, e.g., $Y_3Al_5O_{12}$). As used herein, garnet does not include silicate-based garnets such as pyrope, almandine, spessartine, grossular, hessonite, or cinnamon-stone, tsavorite, uvarovite and andradite and the solid solutions pyrope-almandine-spessarite and uvarovite-grossular-andradite. Garnets herein do not include nesosilicates having the general formula $X_3Y_2(SiO_4)_3$ wherein X is Ca, Mg, Fe, and, or Mn; and Y is Al, Fe, and, or Cr. Lithium-stuffed garnets include, but are not limited to, compounds having the formula $Li_7La_3Zr_2O_{12}Al_2O_3$; $Li_{6-7}La_3Zr_2O_{12-13}Al_2O_3$; $Li_7La_3Zr_2O_{12}$ (0.1-1) $Al_2O_3$; $Li_{6-7}La_3Zr_2O_{12-13}$ (0.1-1) $Al_2O_3$; $Li_7La_3Zr_2O_{12}$ (0.1) $Al_2O_3$; $Li_7La_3Zr_2O_{12}$ (0.2) $Al_2O_3$; $Li_7La_3Zr_2O_{12}$ (0.3) $Al_2O_3$; $Li_7La_3Zr_2O_{12}$ (0.4) $Al_2O_3$; $Li_7La_3Zr_2O_{12}$ (0.5) $Al_2O_3$; $Li_7La_3Zr_2O_{12}$ (0.6) $Al_2O_3$; $Li_7La_3Zr_2O_{12}$ (0.7) $Al_2O_3$; $Li_7La_3Zr_2O_{12}$ (0.8) $Al_2O_3$; $Li_7La_3Zr_2O_{12}$ (0.9) $Al_2O_3$; $Li_7La_3Zr_2O_{12}$ (1.0) $Al_2O_3$; $Li_{6-7}La_3Zr_2O_{12-13}$ (0.1) $Al_2O_3$; $Li_{6-7}La_3Zr_2O_{12-13}$ (0.2) $Al_2O_3$; $Li_{6-7}La_3Zr_2O_{12-13}$ (0.3) $Al_2O_3$; $Li_{6-7}La_3Zr_2O_{12-13}$ (0.4) $Al_2O_3$; $Li_{6-7}La_3Zr_2O_{12-13}$ (0.5) $Al_2O_3$; $Li_{6-7}La_3Zr_2O_{12-13}$ (0.6) $Al_2O_3$; $Li_{6-7}La_3Zr_2O_{12-13}$ (0.7) $Al_2O_3$; $Li_{6-7}La_3Zr_2O_{12-13}$ (0.8) $Al_2O_3$; $Li_{6-7}La_3Zr_2O_{12-13}$ (0.9) $Al_2O_3$; $Li_{6-7}La_3Zr_2O_{12-13}$ (1.0) $Al_2O_3$; or $Li_{7-3x}La_3Zr_2O_{12}Al_x$ wherein x is from 0 to 2. In some examples, lithium-stuffed garnet includes $Li_{7-3x}La_3Zr_2O_{12}Al_x$ wherein x is 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1.0, 1.1, 1.15, 1.2, 1.25, 1.3, 1.35, 1.4, 1.45, 1.5, 1.55, 1.6, 1.65, 1.7, 1.75, 1.8, 1.85, 1.9, 1.95, or 2.0. In certain examples, lithium-stuffed garnet includes $Li_{7-3x}La_3Zr_2O_{12}Al_x$ wherein x is 0.25, 0.5, or 0.75.

As used herein, the phrase "garnet precursor chemicals" or "chemical precursor to a Garnet-type electrolyte" refers to chemicals, which react to form a lithium stuffed garnet material described herein. These chemical precursors include, but are not limited to lithium hydroxide (e.g., LiOH), lithium oxide (e.g., $Li_2O$), lithium carbonate (e.g., $Li_2CO_3$), zirconium oxide (e.g., $ZrO_2$), lanthanum oxide (e.g., $La_2O_3$), aluminum oxide (e.g., $Al_2O_3$), aluminum (e.g., Al), aluminum nitrate (e.g., $AlNO_3$), aluminum nitrate nonahydrate, niobium oxide (e.g., $Nb_2O_5$), tantalum oxide (e.g., $Ta_2O_5$).

As used herein, the phrase "$d_{50}$ diameter" refers to the median size, in a distribution of sizes, measured by microscopy techniques or other particle size analysis techniques, such as, but not limited to, scanning electron microscopy or dynamic light scattering. $D_{50}$ may be characterized as a "number $D_{50}$," or "volume $D_{50}$," where a "number $D_{50}$" is a diameter at which 50% of the particles have a smaller diameter, and a "volume $D_{50}$" is a diameter at which 50% of the volume of the smallest particles have a smaller diameter. Unless specified otherwise, a $D_{50}$ herein is a volume $D_{50}$, i.e., $D_{50}$ includes the characteristic dimension at which 50% of the volume of particles are smaller than the recited size.

As used herein, the phrase "$d_{90}$ diameter" refers to a size, in a distribution of sizes, measured by microscopy techniques or other particle size analysis techniques, such as, but not limited to, scanning electron microscopy or dynamic light scattering. $D_{90}$ includes the characteristic dimension at which 90% of the volume of particles are smaller than the recited size.

As used herein, "flatness" of a surface refers to the greatest normal distance between the lowest point on a surface and a plane containing the three highest points on the surface, or alternately, the greatest normal distance between the highest point on a surface and a plane containing the three lowest points on the surface. It may be measured with an atomic force microscope (AFM), a high precision optical microscope, a 3D vision system, or laser interferometry height mapping of a surface. A Keyence VR-3000 is an example of an optical microscope that permits flatness measurements using structured light. A Keyence VR-3000 is used herein to measure flatness unless specified otherwise to the contrary.

As used herein, the phrase "speed bumps," refers to raised surfaces on a runway or on a surface of a process apparatus over which a bilayer moves as it traverses through a process apparatus. The speed bumps help to apply normal force to the bilayer by contacting the bilayer against the speed bumps, in which the speed bumps contact the metal layer of a bilayer disclosed herein. Unless specified otherwise, the metal layer of the bilayer is the layer that may contact the speed bumps as the bilayer moves across the speed bumps.

As used herein, the phrase "heating zone," refers to a volume heated by one or more heating elements, measured by one or more temperature sensors, with feedback control between the sensor and a set point. In some embodiments, a first heating zone and a second heating zone are both contained within a single furnace or within a single oven. In some other embodiments, a first heating zone and a second heating zone are each individually located within a furnace or within an oven that is different from the furnace or oven used for the other heating zone.

As used herein, the term "runway," refers to a material at least 10 cm long, at least as wide as the tape to be processed, and at least 100 μm thick that may make point contacts or line contacts with the tape to be processed in a heated zone.

As used herein, the term "bisque bilayer" refers to a bilayer herein that has less than 1% organic content by weight and the ceramic layer has at least 10 vol % porosity. Herein, organic content includes compounds that include carbon.

As used herein, the term "debindered films" refers to a green body wherein the binder content is less than 1% by weight.

As used herein, the term "web width" refers to the width of a metal layer of the bilayer.

As used herein, the term "green bilayers" refers to a green film or green body as defined above and having an underlying metal substrate layer attached or bonded to the green film or green body.

As used herein, the term "Invar" is a Ni/Fe material.

As used herein, the phrase "vertical processing" means that the bilayer is oriented for vertical processing as it moves through the CML. Vertical processing means that the bilayer moves parallel or antiparallel to the force of gravity on planet Earth As used herein, the phrase "curtain processing" means that the bilayer is oriented for curtain processing as it moves through the CML. Curtain processing means that the bilayer is turned on its edge so that both the metal layer and green body layer move parallel to the ground but the metal layer is not under the green body layer; rather the metal layer and green body layer are side-by-side. Curtain processing may be beneficial to prevent debris from falling on the top surface of the green body. Curtain processing may be beneficial to prevent sagging of the bilayer.

As used herein, "under tension" means that tension is applied to the bilayer using a physical device, such as, but not limited to, at least one roller, at least one weight, at least one load cell, at least one motor, at least one tension controller device, a series of devices, or a combination thereof. In some embodiments, under tension includes the use of a load cell in a feedback loop with at least one roller, at least one weight, at least one motor, at least one tension controller device, a series of devices, or a combination thereof. A bilayer resting on a flat surface has a natural internal tension holding the structure of the bilayer together even when not attached to anything other than the bilayer, itself. "Under tension" herein means some amount of tension in addition to a material's natural tension. Tension is applied externally to a bilayer, for example, to stretch, expand, flatten, or conform, the bilayer dimensions.

As used herein, "10% tolerance or less," when used in reference to a tension controller means that the tension controller can maintain a tension on the bilayer that has a tolerance of ten percent. For example, if the tension on the bilayer is set to 150 N per meter of web width, then a 10% tolerance or less would mean that the tension controller can maintain a tension on the bilayer between 135 N per meter of web width and 165 N per meter of web width. The "or less" means that the tension controller has an event tighter tolerance range. For example, a 5% tolerance or less for a tension controller set to 150 N per meter of web width would mean that the tension controller can maintain a tension on the bilayer between 142.5 N per meter of web width and 157.5 N per meter of web width.

As used herein, the "arched configuration characterized by a radius of curvature" means that the bilayer is held under tension against a runway, at least one speed bump, or at least one roller, such that the bilayer bends in a curved fashion. The curve of the bilayer can be mathematically approximated using a radius of curvature for the bend of the bilayer. Radius of curvature includes the radius of the circular arc which best approximates the curve at that point. For surfaces, the radius of curvature is the radius of a circle that best fits a normal section of the contacting surface of the bilayer. Unless specified to the contrary, the contacting surface is the metal layer of the bilayer.

C. Processing Apparatus

Figure 1:
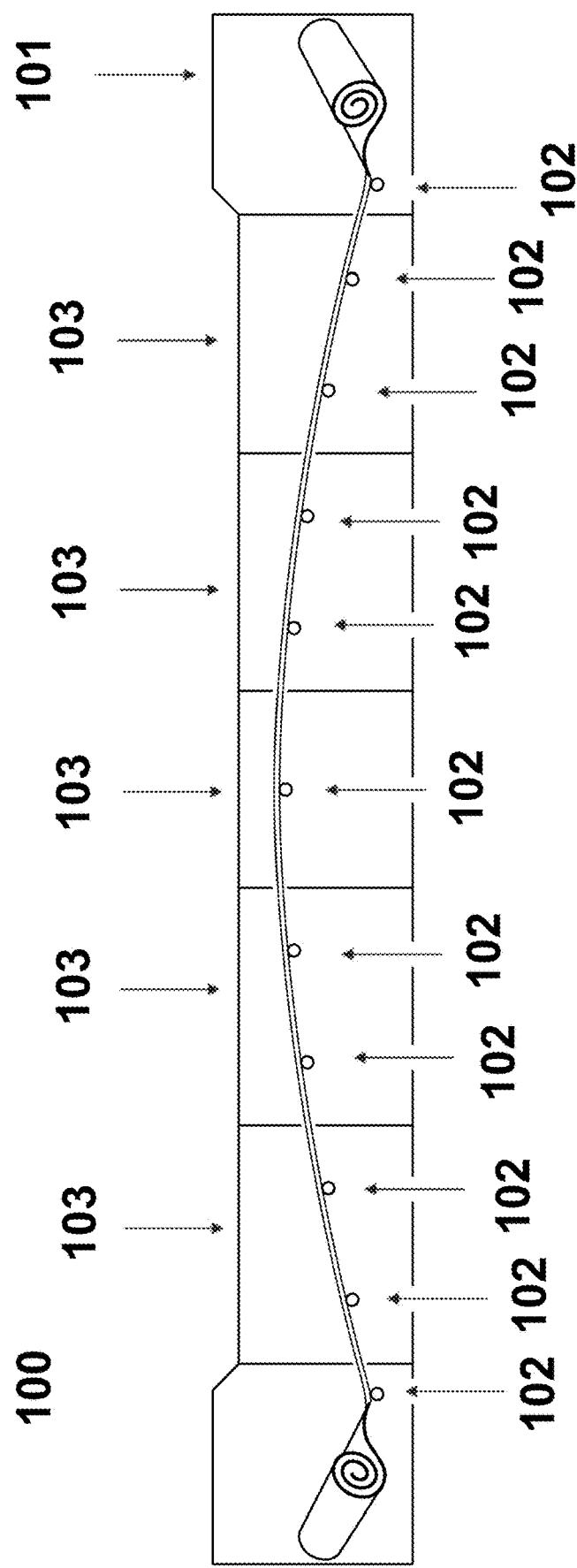
FIG. 1 shows one embodiment of a process apparatus having multiple heating and/or cooling zones and a series of internal rollers, which form the shape of a ramp in an arched configuration.

FIG. 1 shows an embodiment of a process apparatus disclosed herein. The process apparatus, 100, includes a front roller, 101, having a green bilayer wound therearound. The process apparatus, 100, includes an end roller, 102, having a bisqued or a sintered bilayer wound therearound. The process apparatus, 100, includes multiple zones, 103, for heating, cooling, maintaining a temperature, or a combination thereof. Five zones, 103, are illustrated in FIG. 1. However, more or fewer zones, 103, are contemplated herein. For example, the process apparatus, 100, may include 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 zones, 103, for heating, cooling, maintaining a temperature, or a combination thereof. For example, the process apparatus, 100, may include 1-12 zones, 103, for heating, cooling, maintaining a temperature, or a combination thereof. For example, the process apparatus, 100, may include 1-11 zones, 103, for heating, cooling, maintaining a temperature, or a combination thereof. For example, the process apparatus, 100, may include 1-10 zones, 103, for heating, cooling, maintaining a temperature, or a combination thereof. For example, the process apparatus, 100, may include 1-9 zones, 103, for heating, cooling, maintaining a temperature, or a combination thereof. For example, the process apparatus, 100, may include 1-8 zones, 103, for heating, cooling, maintaining a temperature, or a combination thereof. For example, the process apparatus, 100, may include 1-7 zones, 103, for heating, cooling, maintaining a temperature, or a combination thereof. For example, the process apparatus, 100, may include 1-6 zones, 103, for heating, cooling, maintaining a temperature, or a combination thereof. For example, the process apparatus, 100, may include 1-5 zones, 103, for heating, cooling, maintaining a temperature, or a combination thereof. For example, the process apparatus, 100, may include 1-4 zones, 103, for heating, cooling, maintaining a temperature, or a combination thereof. For example, the process apparatus, 100, may include 1-3 zones, 103, for heating, cooling, maintaining a temperature, or a combination thereof. For example, the process apparatus, 100, may include 1-2 zones, 103, for heating, cooling, maintaining a temperature, or a combination thereof. In some embodiments, including any of the foregoing, one zone, 103, is larger than another zone, 103. In certain embodiments, a bilayer moves through the process apparatus at a certain velocity. In these embodiments, the residence time within a zone, 103, will depend on the velocity and the length of the zone, 103, traversed by the bilayer.

Inside the zones, 103, are rollers, 102. The rollers, 102, are arranged in the shape of a ramp. The ramp may have a parabolic shape. The ramp may have an elliptical shape. The ramp may have a circular shape. The ramp may have a catenary shape. In certain examples, the ramp may be symmetric. In other examples, the ramp may not be symmetric. The angle the tape makes as it passes over each roller ranges from 0-40°. The height difference between the highest and lowest roller may range from 0-10 m.

In certain embodiments, the width of the aforementioned ramp is 120 mm-800 mm wide. In certain embodiments, including any of the foregoing, the length of each zone is 100-1000 mm long. In certain embodiments, including any of the foregoing, the height of each zone is 10 mm-1000 mm high.

Figure 2:
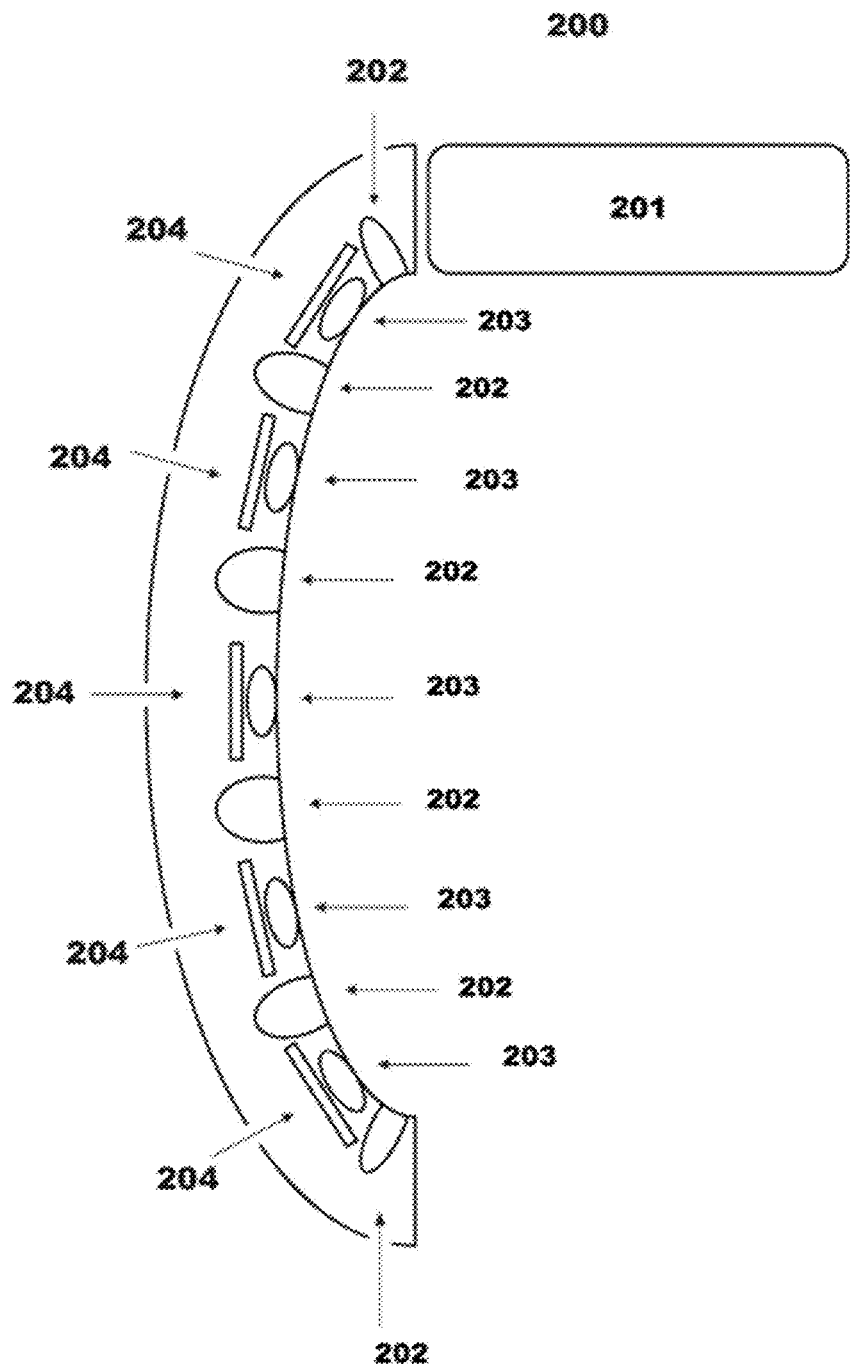
FIG. 2 shows a portion of an embodiment of a process apparatus.

FIG. 2 shows a portion of a process apparatus, 200. Heating zone, 201, a furnace or oven capable of combusting, evaporating, or a combination thereof, the binder in a green bilayer. In some embodiments, the zone, 201, is a binder burn-out zone. On one side of the zone, 201, is a curved runway. The curved runway includes susceptors, 204. The curved runway includes heating elements, 203. The heating elements, 203, may be heating lamps, heating coils, inductive heaters, or any source of heat. The curved runway includes rollers, 202, spaced throughout the curved runway. The rollers 202 may be locked (stationary), overdriven (the roller edge rotates faster than the web speed at the point of contact), underdriven (the roller edge rotates slower than the web speed at the point of contact), or driven at the same speed of the web. The rollers 202 may have cylindrical profile, convex, or concave profile. The roller surface may comprise a metal (comprising iron, nickel, molybdenum, tungsten, stainless steel) or ceramic (comprising silicon carbide, alumina, zirconia, spinel, tungsten carbide, magnesium oxide, boron nitride, and similar high temperature ceramics).

Herein, susceptors are used to absorb energy, such as heat, from the heaters and re-radiate that heat to the film.

Figure 3:
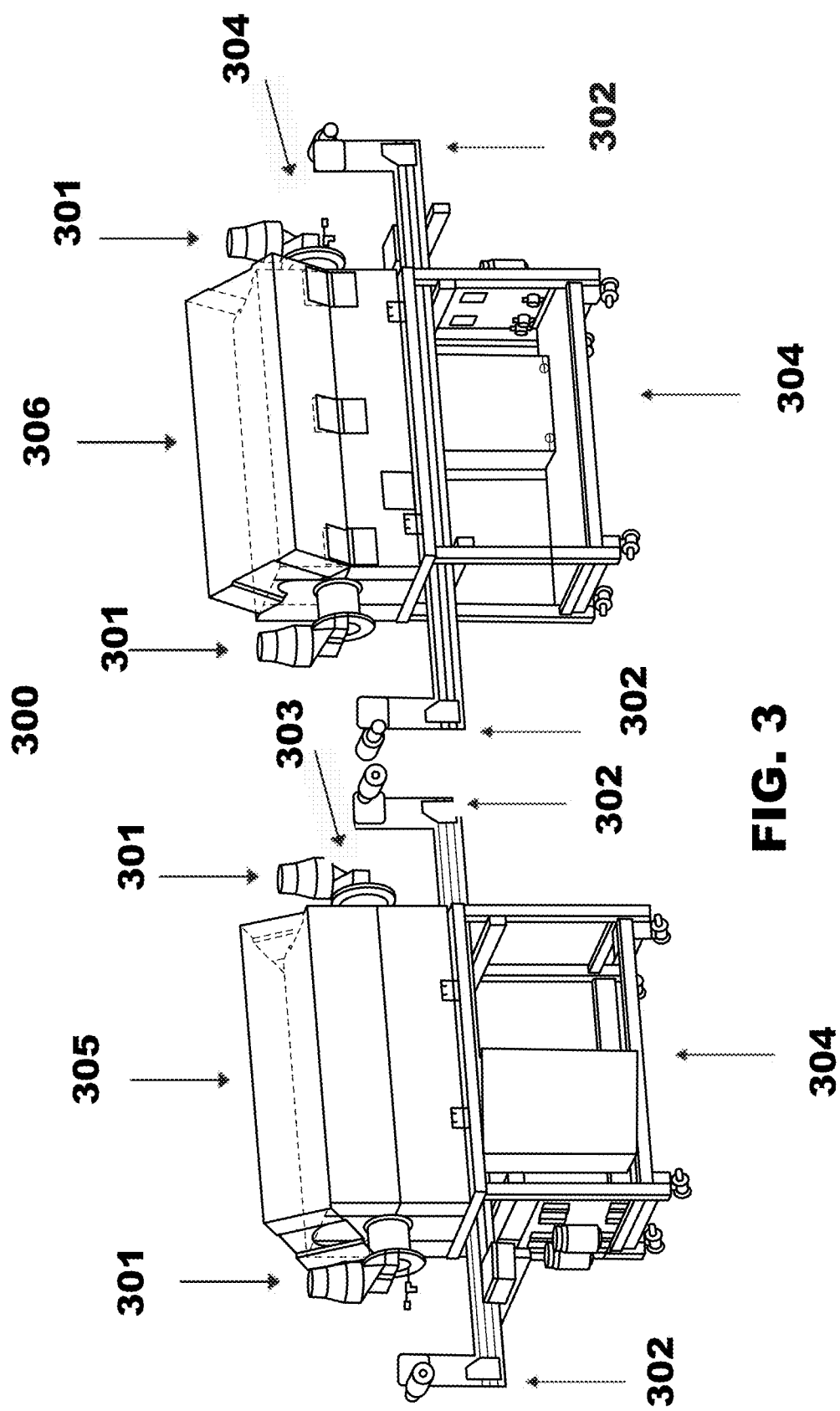
FIG. 3 shows a series of tube furnaces in an embodiment of a process apparatus.

FIG. 3 shows a process apparatus, 300. The process apparatus, 300, includes at least one tube furnace, 305, and at least one tube furnace, 306. Additional tube furnaces may be present. In some embodiments, the tube furnaces are heating zones as in zones, 103, in FIG. 1. The process apparatus, 300, includes exhaust ports, 301, which are positioned at the entrance and exit to each tube furnace, 305 and 306. The process apparatus, 300, includes rollers, 302, which are positioned before and after tube furnaces, 305 and 306. In some embodiments, including any of the foregoing, the rollers, 302, may be substituted with tension controlling devices. FIG. 3 shows tube furnace entrances, 303. FIG. 3 also shows controllers, 304, which may be used to control temperature or the atmosphere, or a combination thereof, in the tube furnaces. The distance between tube furnaces, 305 and 306, can be adjusted by moving the furnaces with respect to each other.

Figure 4:
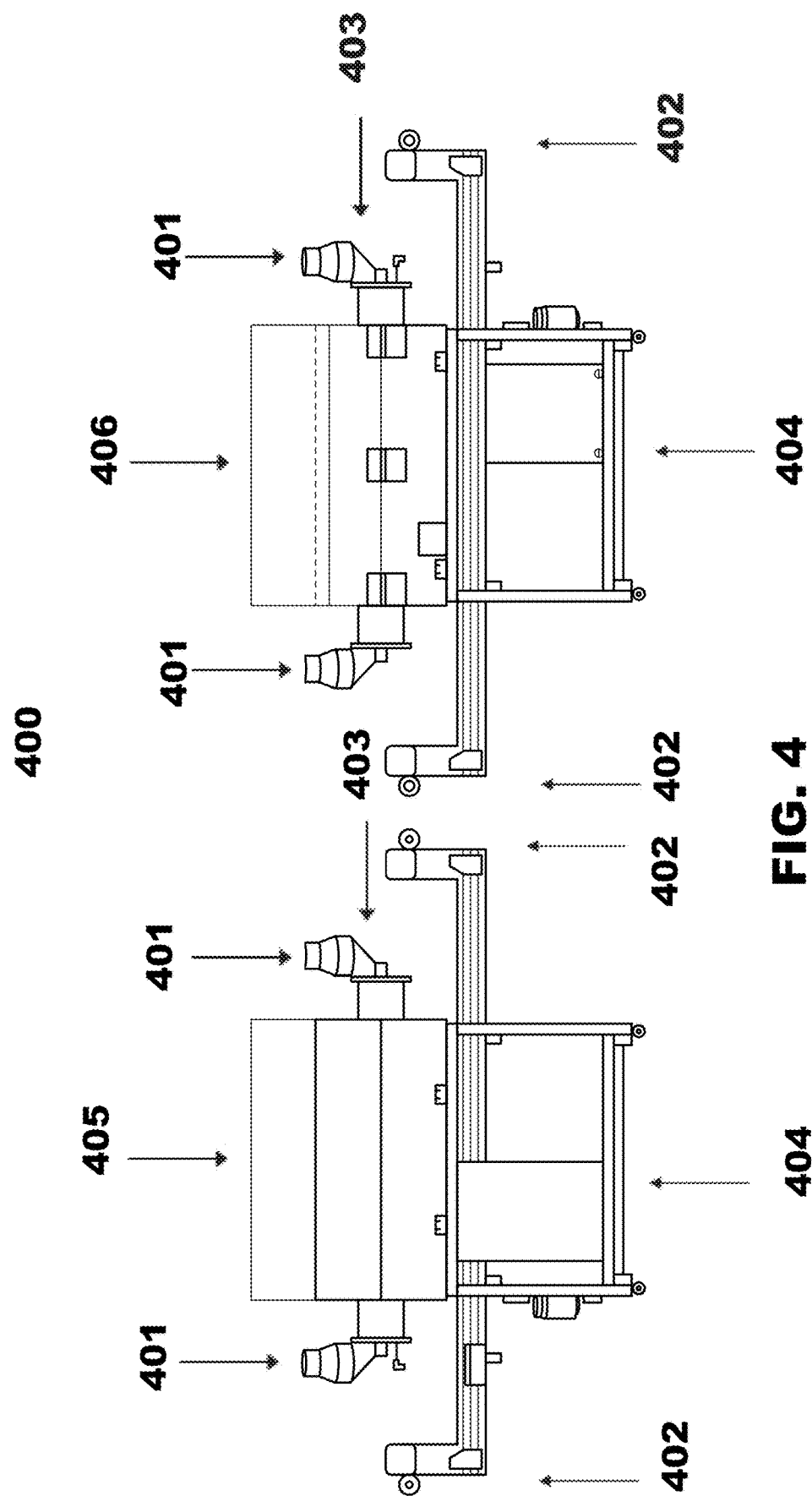
FIG. 4 shows a series of tube furnaces in an embodiment of a process apparatus.
Figure 5:
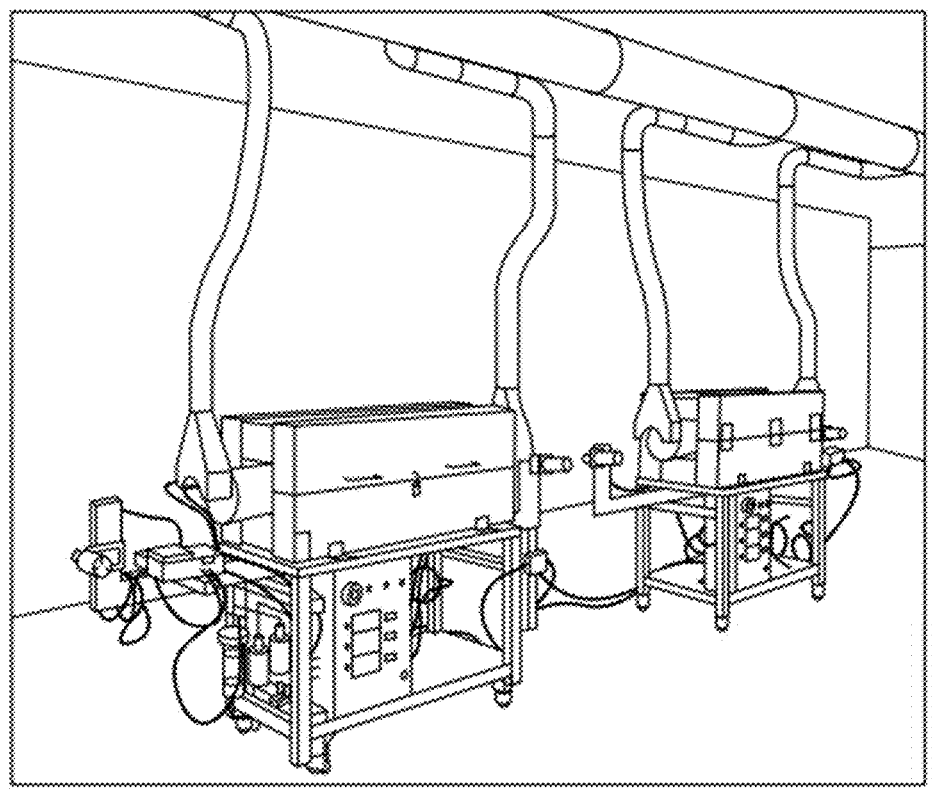
FIG. 5 shows a picture of one embodiment of a process apparatus.

FIG. 4 shows a process apparatus, 400. The process apparatus, 400, includes at least one tube furnace, 405, and at least one tube furnace, 406. Additional tube furnaces may be present. In some embodiments, the tube furnaces are heating zones as in zones, 103, in FIG. 1. The process apparatus, 400, includes exhaust ports, 401, which are positioned at the entrance and exit to each tube furnace, 405 and 406. The process apparatus, 400, includes rollers, 402, which are positioned before and after tube furnaces, 405 and 406. In some embodiments, including any of the foregoing, the rollers, 402, may be substituted with tension controlling devices. FIG. 4 shows tube furnace entrances, 403. FIG. 4 also shows controllers, 404, which may be used to control temperature or the atmosphere, or a combination thereof, in the tube furnaces. The distance between tube furnaces, 405 and 406, can be adjusted by moving the furnaces with respect to each other.

In some embodiments, set forth herein is continuous manufacturing line as in International Patent Application No. PCT/US2022/019641, filed Mar. 9, 2022, and titled RAPID CERAMIC PROCESSING TECHNIQUES AND EQUIPMENT, the entire contents of each of which are herein incorporate by reference in their entirety for all purposes.

In some embodiments, set forth herein is a processing apparatus comprising: a front roller; at least one furnace comprising at least three heating zones; and a runway having a surface that comprises a material selected from: Nickel (Ni), iron (Fe), anodize aluminum, a Ni-alloy, an Fe-alloy, a Ni—Fe alloy, stainless steel, pyrolytic carbon, carbon fiber composite (CFC), graphite; alumina ($Al_2O_3$), zirconia ($ZrO_2$), silicon carbide, magnesium oxide, Molybdenum, molybdenum alloys such as titanium-zirconium-molybdenum (TZM) or molybdenum-lanthanum (MoLa), Tungsten, tungsten alloys, or a combination thereof.

In some examples, the runway has a surface comprising aluminum oxide. In certain examples, the runway comprising aluminum oxide contacts the backside (metal side) of the bilayer.

In some examples, the runway has a surface comprising magnesium oxide. In certain examples, the runway comprising magnesium oxide contacts the backside (metal side) of the bilayer.

In some examples, the runway has a surface comprising boron nitride. In certain examples, the runway comprising magnesium oxide contacts the backside (metal side) of the bilayer.

In some examples, the runway has a surface comprising boron nitride. In certain examples, the runway comprising boron nitride contacts the backside (metal side) of the bilayer.

In some examples, the runway has a surface comprising silicon carbide. In certain examples, the runway comprising silicon carbide does not touch the bilayer but is positioned within 0.5 cm to 5 cm of the bilayer.

In some examples, the runway has a surface comprising graphite. In certain examples, the runway comprising graphite does not touch the bilayer but is positioned within 0.5 cm to 5 cm of the bilayer.

In some examples, the runway has a surface comprising carbon fiber composite. In certain examples, the runway comprising carbon fiber composite does not touch the bilayer but is positioned within 0.5 cm to 5 cm of the bilayer. In certain examples, the carbon fiber composite is coated with boron nitride.

In some examples, the runway has a surface comprising molybdenum (Mo). In some examples, the runway has a surface comprising tungsten (W). In certain examples, the runway comprising Mo or W does not touch the bilayer but is positioned within 0.5 cm to 5 cm of the bilayer.

In some embodiments, there is a runway in the binder-burn out zone.

In some embodiments, there is a runway in the bisque zone.

In some embodiments, there is a runway in the sintering zone. In some of these embodiments, the runway has an alumina-containing surface. In some of these embodiments, the runway has a refractory-material-containing surface.

In some embodiments, there is a runway in the bisque zone and in the sintering zone.

In some embodiments, there is a runway in the binder burn-out zone and in the bisque zone.

In some embodiments, there is a runway in the binder burn-out zone and in the sintering zone.

In some embodiments, there is a runway in the binder burn-out zone, in the bisque zone, and in the sintering zone.

In some embodiments, there is a runway in the cooling zone. In some of these embodiments, the runway has a carbon-containing surface.

In some embodiments, including any of the foregoing, the runways include rollers.

In certain embodiments, the rollers is configured to only contact the metal layer of a bilayer disclosed herein.

In certain embodiments, the rollers are configured to only contact the metal layer of a bilayer disclosed herein. In some embodiments, the rollers do not contact the ceramic layer of the bilayer disclosed herein. In some embodiments, the rollers do not contact the ceramic layer of the bilayer disclosed herein while the bilayer has a temperature of greater than 30° C. In some embodiments, the rollers do not contact the ceramic layer of the bilayer disclosed herein while the bilayer has a temperature of greater than 60° C. In some embodiments, the rollers do not contact the ceramic layer of the bilayer disclosed herein while the bilayer has a temperature of greater than 90° C. In some embodiments, the rollers do not contact the ceramic layer of the bilayer disclosed herein while the bilayer has a temperature of greater than 150° C. In some embodiments, the rollers do not contact the ceramic layer of the bilayer disclosed herein while the bilayer has a temperature of greater than 200° C. In some embodiments, the rollers do not contact the ceramic layer of the bilayer disclosed herein while the bilayer has a temperature of greater than 250° C. In some embodiments, the rollers do not contact the ceramic layer of the bilayer disclosed herein while the bilayer has a temperature of greater than 300° C. In some embodiments, the rollers do not contact the ceramic layer of the bilayer disclosed herein while the bilayer has a temperature of greater than 400° C. In some embodiments, the rollers do not contact the ceramic layer of the bilayer disclosed herein while the bilayer has a temperature of greater than 500° C. In some embodiments, the rollers do not contact the ceramic layer of the bilayer disclosed herein while the bilayer has a temperature of greater than 600° C. In some embodiments, the rollers do not contact the ceramic layer of the bilayer disclosed herein while the bilayer has a temperature of greater than 700° C. In some embodiments, the rollers do not contact the ceramic layer of the bilayer disclosed herein while the bilayer has a temperature of greater than 800° C. In some embodiments, the rollers do not contact the ceramic layer of the bilayer disclosed herein while the bilayer has a temperature of greater than 900° C. In some embodiments, the rollers do not contact the ceramic layer of the bilayer disclosed herein until after the sintering zone of the processing apparatus.

In some embodiments, set forth herein is a processing apparatus comprising: a front roller; at least one furnace comprising at least three heating zones; and at least one of the following: baffles within a heating zone; baffles between two heating zones; curtain purges between two heating zones; means for controlling at least two distinct pressure zones within the at least three heating zones; means for exhausting through the center of the at least one furnace; means for exhausting through the center of the runway; means for purging gas between two heating zones; means for isolating gas between two heating zones; means for mechanically separating two heating zones; or a combination thereof.

In some embodiments, including any of the foregoing, the runway includes an exhaust system. In certain examples, the exhaust system is in the middle of the runway. In certain examples, the exhaust system is located at many points along a binder burn-out pathway. In certain embodiments, the gas flow is configured to flow in a cross-web direction. In certain embodiments, the exhaust is heated from the furnace to a cold trap.

In some embodiments, set forth herein is a processing apparatus comprising: a front roller; at least one furnace comprising at least three heating zones; and a bilayer held under tension, wherein the tension ranges from 0.1 g/cm to 500 g/cm. FIG. 10 shows on the left side bilayer films made under a high tension of 30 to 100 g/cm of web width. FIG. 10 shows on the right side bilayer films made under a low tension of 1 to 15 g/cm of web width. In some embodiments, set forth herein is a processing apparatus comprising: a front roller; at least one furnace comprising at least three heating zones; and a bilayer held under tension, wherein the tension ranges from 1 to 15 g/cm of web width. Tension is measured herein using a load cell when the bilayer is unwound from a roll and before the bilayer is heated to burn-out the binder. In some examples, the tension ranges from 1 to 14 g/cm of web width. In some examples, the tension ranges from 1 to 13 g/cm of web width. In some examples, the tension ranges from 1 to 12 g/cm of web width. In some examples, the tension ranges from 1 to 11 g/cm of web width. In some examples, the tension ranges from 1 to 10 g/cm of web width. In some examples, the tension ranges from 1 to 9 g/cm of web width. In some examples, the tension ranges from 1 to 8 g/cm of web width. In some examples, the tension ranges from 1 to 7 g/cm of web width. In some examples, the tension ranges from 1 to 6 g/cm of web width. In some examples, the tension ranges from 1 to 5 g/cm of web width. In some examples, the tension ranges from 1 to 4 g/cm of web width. In some examples, the tension ranges from 1 to 3 g/cm of web width. In some examples, the tension ranges from 1 to 2 g/cm of web width. In some examples, the tension ranges from 1 to 15 g/cm of web width. In some examples, the tension ranges from 2 to 15 g/cm of web width. In some examples, the tension ranges from 3 to 15 g/cm of web width. In some examples, the tension ranges from 4 to 15 g/cm of web width. In some examples, the tension ranges from 5 to 15 g/cm of web width. In some examples, the tension ranges from 6 to 15 g/cm of web width. In some examples, the tension ranges from 7 to 15 g/cm of web width. In some examples, the tension ranges from 8 to 15 g/cm of web width. In some examples, the tension ranges from 9 to 15 g/cm of web width. In some examples, the tension ranges from 10 to 15 g/cm of web width. In some examples, the tension ranges from 11 to 15 g/cm of web width. In some examples, the tension ranges from 12 to 15 g/cm of web width. In some examples, the tension ranges from 13 to 15 g/cm of web width. In some examples, the tension ranges from 14 to 15 g/cm of web width.

In certain embodiments, the bilayer is held under a tension 30 g worth of tension over a 100 mm wide web that includes a 10 µm thick Ni foil layer in a bilayer. The tension, in some examples, is 3 kg per $cm^2$ (cross sectional-area). In certain embodiments, the bilayer is held under tension that ranges from 0.01 g/cm to 10 g/cm of web width.

In certain embodiments, the bilayer is held under tension that ranges from 0.01 g/cm to 100 g/cm for the bisque bilayer.

In certain embodiments, the bilayer is held under tension that ranges from 0.01 g/cm to 500 g/cm for the green bilayer.

In some embodiments, the tension is unequal in different regions of the processing apparatus. For example, there may be higher tension in the unwind and rewind regions than in the high temperature regions. In some embodiments, the tension is isolated using nip rollers, vacuum rollers, and/or rollers with a wrap angle that is configured to increase or reduce tension across the roller. In some embodiments, the tension in the wind and or unwind region is greater than 5 $kg/cm^2$ of web cross-sectional area, or greater than 10 $kg/cm^2$, or greater than 15 $kg/cm^2$, or greater than 20 $kg/cm^2$ or greater than 25 $kg/cm^2$. In some embodiments, the tension in the wind region is greater than 5 kg/cm², or greater than 10 kg/cm², or greater than 15 kg/cm², or greater than 20 kg/cm² or greater than 25 kg/cm². In some embodiments, the tension of the unwind region is greater than 5 kg/cm² of web cross-sectional area, or greater than 10 kg/cm², or greater than 15 kg/cm², or greater than 20 kg/cm² or greater than 25 kg/cm². In some embodiments, in at least one zone where the temperature is greater than 800° C., the tension is less than 6 kg/cm² of web cross-sectional area, or less than 5 kg/cm², or less than 4 kg/cm², or less than 3 kg/cm², or less than 2 kg/cm², or less than 1 kg/cm², or less than 0.5 kg/cm².

In some embodiments, set forth herein is a processing apparatus comprising: a front roller; at least one furnace comprising at least three heating zones; a bilayer; and at least two or more rollers; wherein the bilayer is wrapped around one of the at least two or more rollers at a wrap angle that ranges from 0 to 40°.

In some embodiments, including any of the foregoing, two aligned rollers are parallel to each other. The wrap angle describes the angle made between the incoming bilayer and outgoing bilayer with respect to the roller. In some examples, the bilayer is wrapped around one of the at least two or more rollers at a wrap angle that ranges 5° to 10°. In some examples, the rollers used for web handling are aligned to each other with a maximum deviation of 0.0005-0.005 degrees. In some examples, the rollers are round to within 0.001" tolerance, or 0.002" tolerance, or 0.003" tolerance, or 0.004" tolerance, or 0.005" tolerance. In some examples, at least one of the rollers has a diameter of at least 7 cm. In some examples, at least one of the rollers has a diameter of at least 8 cm. In some examples, at least one of the rollers has a diameter of at least 9 cm. In some examples, at least one of the rollers has a diameter of at least 10 cm. In some examples, at least one of the rollers has a diameter of at least 15 cm.

In some embodiments, including any of the foregoing, the bilayer is wrapped around one of the at least two or more rollers at a wrap angle of 5°, 6°, 7°, 8°, 9°, 10°, 11°, 12°, 13°, 14°, 15°, 16°, 17°, 18°, 19°, 20°, 22°, 22°, 23°, 24°, 25°, 26°, 27°, 28°, 29°, 30°, 31°, 32°, 33°, 34°, 35°, 36°, 37°, 38°, 39°, or 40°.

In some embodiments, including any of the foregoing, the process apparatus includes a bilayer.

In some embodiments, including any of the foregoing, the three distinct heating zones comprise (a) a binder burn-out section; (b) a bisque section; and (c) a sintering section.

In some embodiments, including any of the foregoing, the process apparatus includes an end roller.

In some embodiments, including any of the foregoing, the front roller is mechanically coupled to the at least one furnace.

In some embodiments, including any of the foregoing, the front roller has a motor which is sealed from the at least one furnace.

In some embodiments, including any of the foregoing, the process apparatus includes a runway comprising a material selected from: Nickel (Ni), iron (Fe), a Ni-alloy, an Fe-alloy, a Ni—Fe alloy, stainless steel, pyrolytic carbon, carbon fiber, graphite; alumina ($Al_2O_3$), zirconia ($ZrO_2$), or a combination thereof. In some embodiments, including any of the foregoing, runway may be coated with a material selected from: Nickel (Ni), iron (Fe), a Ni-alloy, an Fe-alloy, a Ni—Fe alloy, stainless steel, pyrolytic carbon, carbon fiber, graphite; alumina ($Al_2O_3$), zirconia ($ZrO_2$), or a combination thereof. In some embodiments, the runway comprises nickel, carbon, or carbon fiber. In some embodiments, the runway is coated with at least a layer of iron, Ni—Fe alloy, silicon carbide, or boron nitride.

In some embodiments, including any of the foregoing, the runway is inside the at least one furnace.

In some embodiments, including any of the foregoing, the runway is inside the sintering section.

In some embodiments, including any of the foregoing, the runway comprises exhaust ports.

In some embodiments, including any of the foregoing, the runway comprises speed bumps.

In some embodiments, including any of the foregoing, the top runway is center-less.

In some embodiments, including any of the foregoing, the runway comprises holes on its top surface.

In some embodiments, including any of the foregoing, the at least one furnace is sealed.

In some embodiments, including any of the foregoing, the process apparatus includes a cool-down section.

In some embodiments, including any of the foregoing, the process apparatus includes at least one atmospheric controller which controls at least one condition in the furnace selected from the group consisting of gas flow rate, flow direction, gas composition, pressure, and a combination thereof.

In some embodiments, including any of the foregoing, the bilayer is wound onto the front roller.

In some embodiments, including any of the foregoing, the bilayer comprises a metal layer and a green body layer.

In some embodiments, including any of the foregoing, the at least one furnace comprises a multiple zone tunnel kiln (MZTK).

In some embodiments, including any of the foregoing, the rollers comprise a material selected from silicon carbide, Ni, stainless steel, or a combination thereof.

In some embodiments, including any of the foregoing, the rollers are mechanically align-able to within 0.005 inches. In some embodiments, including any of the foregoing, the rollers are mechanically align-able to within 0.001 inches.

In some embodiments, including any of the foregoing, the rollers are mechanically align-able in three-dimensions.

In some embodiments, including any of the foregoing, the process apparatus includes nip rollers. Herein, nip rollers are two rollers which are in contact with the bilayer on top and on bottom at the same point. Nip rollers are used to isolate tension zones—the tension can differ on the two sides of a nip roller.

In some embodiments, including any of the foregoing, the process apparatus includes at least two nip rollers. In some examples, one nip roller is positioned after the unwind section. In some examples, one nip roller is positioned before the rewind section. In some examples, the nip rollers isolate tension so that higher tension (greater than 6 g/cm) may be applied in unwind and rewind, while lower tension (less than 6 g/cm) may be applied in hot zones.

In some embodiments, including any of the foregoing, the at least one furnace comprises hot rollers.

In some embodiments, including any of the foregoing, the at least one furnace comprises rollers configured to form a ramp.

In some embodiments, including any of the foregoing, the MZTK has rollers configured to form an arch inside the MZTK. In some examples, the arch is as shown in FIG. 1.

In some embodiments, including any of the foregoing, the MZTK includes one to twenty rollers configured to form a ramp.

In some embodiments, including any of the foregoing, the MZTK is sealed.

In some embodiments, including any of the foregoing, the MZTK is sealed under vacuum.

In some embodiments, including any of the foregoing, the front roller has a motor which is sealed from the MZTK under vacuum.

In some embodiments, including any of the foregoing, the process apparatus includes baffles between each heating zone.

In some embodiments, including any of the foregoing, the wrap angle around a roller ranges from 0° to 40°.

In some embodiments, including any of the foregoing, the wrap angle around a roller ranges in the binder-burnout section ranges from 0° to 40°.

In some embodiments, including any of the foregoing, the wrap angle around a roller ranges in the sintering section ranges from 0° to 40°.

In some embodiments, including any of the foregoing, the process apparatus includes nip rollers, where the top roller contacts less than 10 cm at each edge of the web, or less than 8 cm at each edge of the web, or less than 6 cm at each edge of the web, or less than 5 cm at each edge of the web, or less than 4 cm at each edge of the web, or less than 3 cm at each edge of the web, or less than 2 cm at each edge of the web, or less than 1 cm at each edge of the web. In some embodiments, including any of the foregoing, the process apparatus includes nip rollers, where the top roller contacts the top of the web. In some embodiments, including any of the foregoing, the process apparatus includes speed bumps, air bearings, or a combination thereof.

In some embodiments, including any of the foregoing, the bilayer is suspended in the MZTK. In some embodiments, including any of the foregoing, the bilayer travels vertically in at least one zone heated to above 600° C.

In some embodiments, including any of the foregoing, the at least one furnace comprises (a) a binder burn-out section; (b) a bisque section; and (c) a sintering section.

In some embodiments, including any of the foregoing, the at least one furnace is sealed such that at least one atmospheric controller controls the flow of gas into and out of the at least one furnace. In some examples, the seal furnace maintains an oxygen partial pressure of less than 100 ppm by weight when the furnace is purged with an $N_2$ flow. In some examples, the seal furnace maintains an oxygen partial pressure of less than 90 ppm by weight when the furnace is purged with an $N_2$ flow. In some examples, the seal furnace maintains an oxygen partial pressure of less than 80 ppm by weight when the furnace is purged with an $N_2$ flow. In some examples, the seal furnace maintains an oxygen partial pressure of less than 70 ppm by weight when the furnace is purged with an $N_2$ flow. In some examples, the seal furnace maintains an oxygen partial pressure of less than 60 ppm by weight when the furnace is purged with an $N_2$ flow. In some examples, the seal furnace maintains an oxygen partial pressure of less than 50 ppm by weight when the furnace is purged with an $N_2$ flow. In some examples, the seal furnace maintains an oxygen partial pressure of less than 40 ppm by weight when the furnace is purged with an $N_2$ flow. In some examples, the seal furnace maintains an oxygen partial pressure of less than 30 ppm by weight when the furnace is purged with an $N_2$ flow.

In some embodiments, including any of the foregoing, the process apparatus includes a pressurized gas line between the bisque section and the sintering section, which pumps gas into the bisque section and into the sintering section.

In some embodiments, including any of the foregoing, the at least one furnace is enclosed in a sealed container.

In some embodiments, including any of the foregoing, the sealed container comprises an atmosphere of Ar, $N_2$, $H_2O$, $H_2$, or a combination thereof.

In some embodiments, including any of the foregoing, an atmospheric controller maintains a reducing atmosphere in the sintering section.

In some embodiments, including any of the foregoing, an atmospheric controller maintains an atmosphere in the sintering section comprising argon (Ar) gas; nitrogen ($N_2$) gas; hydrogen ($H_2$) gas; or a mixture thereof. In some embodiments, including any of the foregoing, the gas flows are configured to introduce moisture in temperature zones below 800° C. In some embodiments, including any of the foregoing, the gas flows are configured to segregate gas from the temperature zones below 800° C. from the environment in temperature zones above 900° C.

In some embodiments, including any of the foregoing, an atmospheric controller maintains an atmosphere comprising less than 500 ppm $O_2$ in the bisque section, the sintering section, or both the bisque section and the sintering section.

In some embodiments, including any of the foregoing, the $H_2$ gas is present at about 1, 2, 3, 4, or 5% v/v.

In some embodiments, including any of the foregoing, the green body layer is a green tape.

In some embodiments, including any of the foregoing, the green body layer is a patch-coated green tape. In some embodiments, including any of the foregoing, the green body layer is a lane-coated green tape.

In some embodiments, including any of the foregoing, the bilayer is oriented for curtain processing as it moves through the process apparatus.

In some embodiments, including any of the foregoing, the bilayer is oriented for vertical processing as it moves through the process apparatus.

In some embodiments, including any of the foregoing, the metal layer comprises a metal selected from the group consisting of nickel (Ni), iron (Fe), copper (Cu), titanium, tungsten, molybdenum, an alloy thereof, or a combination thereof.

In some embodiments, including any of the foregoing, the metal layer is an alloy of Fe and Ni.

In some embodiments, including any of the foregoing, the metal layer is an alloy of Fe and Ni, and the amount of Fe is 1% to 25% (w/w) with the remainder being Ni. In some embodiments, including any of the foregoing, the metal layer is a bilayer of Fe and Ni, and the amount of Fe is 1% to 25% (w/w) with the remainder being Ni.

In some embodiments, including any of the foregoing, the thickness of the metal layer is 1 μm to 20 μm. In some embodiments, including any of the foregoing, the thickness of the metal layer is 4 μm to 10 μm. In some embodiments, including any of the foregoing, the thickness of the metal layer is 6 μm to 10 μm. In some embodiments, including any of the foregoing, the thickness of the metal layer is 8 μm to 10 μm.

In some embodiments, including any of the foregoing, the bilayer is suspended as it moves through the sintering zone.

In some embodiments, including any of the foregoing, the process apparatus includes a sintered bilayer wound around the at least one end roller.

In some embodiments, including any of the foregoing, the sintered bilayer comprises sintered lithium-stuffed garnet.

In some embodiments, including any of the foregoing, the process apparatus is configured to move the bilayer through the at least one furnace at a rate of at least 2 inches per minute.

In some embodiments, including any of the foregoing, the process apparatus is capable of producing at least 200,000 yielded sintered bilayers per week. In some embodiments, including any of the foregoing, the process apparatus is capable of producing at least 1,000 m² of sintered bilayers per week. In some embodiments, including any of the foregoing, the process apparatus is capable of producing at least 1 m² of sintered bilayers per hour. In some embodiments, including any of the foregoing, the process apparatus is capable of producing at least 2 m² of sintered bilayers per hour. In some embodiments, including any of the foregoing, the process apparatus is capable of producing at least 3 m² of sintered bilayers per hour. In some embodiments, including any of the foregoing, the process apparatus is capable of producing at least 4 m² of sintered bilayers per hour. In some embodiments, including any of the foregoing, the process apparatus is capable of producing at least 5 m² of sintered bilayers per hour. In some embodiments, including any of the foregoing, the process apparatus is capable of producing at least 6 m² of sintered bilayers per hour.

In some embodiments, including any of the foregoing, the process apparatus produces bilayers cut to dimensions of 73 mm×90 mm.

In some embodiments, including any of the foregoing, the process apparatus the required minimum web speed to achieve this throughput is 1.0 meters per minute, which will be the assumed web speed in the following sections.

In some embodiments, including any of the foregoing, the process apparatus produces bilayers having a length of 400 m-1500 m. This corresponds to a maximum incoming coil diameter (if using a 6 inch core) of 295 mm-485 mm, and maximum coil weight of 50-180 kg.

In some embodiments, including any of the foregoing, the process apparatus produces bilayers having a maximum outgoing coil diameter (if using a 12 inch core) of 360-450 mm, and the maximum coil weight is 40-140 kg.

In some embodiments, including any of the foregoing, the binder burn-out zone and the sintering zone are positioned parallel to each other.

In some embodiments, including any of the foregoing, the binder burn-out zone is positioned above the sintering zone.

In some embodiments, including any of the foregoing, the process apparatus includes a second binder burn-out zone.

In some embodiments, including any of the foregoing, the entire process apparatus is contained under vacuum.

In some embodiments, including any of the foregoing, the at least one furnace comprises a single furnace with a cooling section, a binder burn-out section; a bisque section; and a sintering section, and then another cooling section. In some embodiments, additional cooling sections are present between the binder burn-out section and bisque section or between the bisque section and the sintering section.

In some embodiments, including any of the foregoing, the sintering section is not directly exposed to Earth's atmosphere. This means that the sintering section has a unique atmosphere in contact with the part of the sintering film or bilayer which is inside the sintering section, and this unique atmosphere is not Earth's atmosphere (e.g., 78% $N_2$, 21% $O_2$). Instead, in the sintering section, the gas which contacts the sintering film or bilayer is an inert or a reducing gas such as Ar, $N_2$, $H_2$, or a combination thereof. This may be accomplished by sealing (partially or completely sealing) the sintering section in a way to isolate it from the Earth's atmosphere. This may be accomplished by flowing gas into, or out of, the sintering section in a way to isolate it from the Earth's atmosphere. This may be accomplished by placing the sintering section in a chamber which is filled with an inert or reducing gas.

In some embodiments, including any of the foregoing, the at least one furnace is not directly exposed to Earth's atmosphere. This means that the at least one furnace has a unique atmosphere in contact with the part of the sintering film or bilayer which is inside the at least one furnace, and this unique atmosphere is not Earth's atmosphere (e.g., 78% $N_2$, 21% $O_2$). Instead, in the at least one furnace, the gas which contacts the sintering film or bilayer is an inert or a reducing gas such as Ar, $N_2$, $H_2$, or a combination thereof. This may be accomplished by sealing the at least one furnace in a way to isolate it from the Earth's atmosphere. This may be accomplished by flowing gas into, or out of, the at least one furnace in a way to isolate it from the Earth's atmosphere. This may be accomplished by placing the at least one furnace in a chamber which is filled with an inert or reducing gas.

In some embodiments, including any of the foregoing, the at least one furnace is sealed such that the at least one atmospheric controller controls the flow of gas into and out of the at least one furnace.

In some embodiments, including any of the foregoing, the flow rate in the binder burn-out section is higher than the flow rate in the bisque section, higher than the flow rate in the sintering section, or higher than both the flow rate in the bisque section and higher than the flow rate in the sintering section.

In some embodiments, including any of the foregoing, the atmospheric controller maintains a consistent atmospheric condition inside the at least one furnace.

In some embodiments, including any of the foregoing, the atmospheric controller maintains a consistent atmospheric condition inside the binder burn-out section.

In some embodiments, including any of the foregoing, the atmospheric controller maintains a consistent atmospheric condition inside the bisque section.

In some embodiments, including any of the foregoing, the atmospheric controller maintains a consistent atmospheric condition inside the sintering section.

In some embodiments, including any of the foregoing, the atmospheric controller maintains an atmosphere in the bisque section comprising argon (Ar) gas; nitrogen ($N_2$) gas; hydrogen ($H_2$) gas; or a mixture thereof.

In some embodiments, including any of the foregoing, the atmospheric controller maintains a reducing atmosphere in the sintering section.

In some embodiments, including any of the foregoing, the atmospheric controller maintains an atmosphere in the sintering section comprising argon (Ar) gas; nitrogen ($N_2$) gas; hydrogen ($H_2$) gas; or a mixture thereof.

In some embodiments, including any of the foregoing, the atmospheric controller maintains an atmosphere comprising less than 500 ppm $O_2$ in the bisque section, the sintering section, or both the bisque section and the sintering section.

In some embodiments, including any of the foregoing, the atmospheric controller maintains an atmosphere comprising less than 400 ppm $O_2$ in the bisque section, the sintering section, or both the bisque section and the sintering section.

In some embodiments, including any of the foregoing, the atmospheric controller maintains an atmosphere comprising less than 300 ppm $O_2$ in the bisque section, the sintering section, or both the bisque section and the sintering section.

In some embodiments, including any of the foregoing, the atmospheric controller maintains an atmosphere comprising less than 200 ppm $O_2$ in the bisque section, the sintering section, or both the bisque section and the sintering section.

In some embodiments, including any of the foregoing, the atmospheric controller maintains an atmosphere comprising less than 100 ppm $O_2$ in the bisque section, the sintering section, or both the bisque section and the sintering section.

In some embodiments, including any of the foregoing, the atmospheric controller maintains an atmosphere comprising less than 10 ppm $O_2$ in the bisque section, the sintering section, or both the bisque section and the sintering section.

In some embodiments, including any of the foregoing, the atmospheric controller maintains an atmosphere in the binder burn-out section comprising $H_2O$ at less than 5% v/v.

In some embodiments, including any of the foregoing, the $H_2$ gas is present at about 1, 2, 3, 4, or 5% v/v.

In some embodiments, including any of the foregoing, the $H_2$ gas is present at about 2.9% v/v.

In some embodiments, including any of the foregoing, the $H_2$ gas is present at about 5% v/v.

In some embodiments, including any of the foregoing, the at least one furnace, or a part thereof, is under vacuum at a pressure less than 1 atmosphere (atm).

In some embodiments, including any of the foregoing, the at least one furnace, or a part thereof, is under vacuum at a pressure less than 100 Torr.

In some uses here, the at least one furnace is pumped to a low vacuum to evacuate air inside the at least one furnace and then the at least one furnace is back-filled with an inert or reducing gas. For example, the at least one furnace may be back-filled with $N_2$. For example, the at least one furnace may be back-filled with $Ar/H_2$. For example, the at least one furnace may be back-filled with Ar.

In some embodiments, including any of the foregoing, the atmosphere in the binder burn-out section is different from the atmosphere in the bisque section.

In some embodiments, including any of the foregoing, the atmosphere in the binder burn-out section is different from the atmosphere in the sintering section.

In some embodiments, including any of the foregoing, the atmosphere in the bisque section is different from the atmosphere in the sintering section.

In some embodiments, including any of the foregoing, the amount of $O_2$ in the binder burn-out section is less than 0.2% by volume.

In some embodiments, including any of the foregoing, the amount of $CO_2$ in the binder burn-out section is less than 0.2% by volume.

In some embodiments, including any of the foregoing, the amount of carbon from $CO_2$ in the sintering section is less than 100 parts-per-million (ppm).

In some embodiments, including any of the foregoing, the amount of carbon from $CO_2$ in the sintering section is about 50 ppm to 100 ppm.

In some embodiments, including any of the foregoing, the bilayer shrinks primarily in the z-direction when moving through the sintering section. Herein, the z-direction is the direct perpendicular to the bilayer surface. Herein, the x-direction is the direction which the bilayer moves through the processing apparatus. The y-direction is perpendicular to the x-direction and in the same plane as the bilayer. The z-direction is perpendicular to both the x- and y-directions.

In some embodiments, including any of the foregoing, the processing apparatus is configured to heat the bilayer at a rate higher than 2.5° C./min.

In some embodiments, including any of the foregoing, the processing apparatus is configured to heat the bilayer at a rate higher than 5° C./min, 10° C./min, 15° C./min, 20° C./min, 25° C./min, 30° C./min, 35° C./min, 40° C./min, 45° C./min, 50° C./min, 55° C./min, 60° C./min, 65° C./min, 70° C./min, 75° C./min, 80° C./min, 85° C./min, 90° C./min, 100° C./min, 200° C./min, or 300° C./min.

In some embodiments, including any of the foregoing, the processing apparatus is configured to heat the bilayer at a rate of about 5° C./min to about 50° C./min.

In some embodiments, including any of the foregoing, the processing apparatus is configured to heat the bilayer at a spatial rate of about 0.5° C./cm to about 50° C./cm. In some embodiments, including any of the foregoing, the processing apparatus is configured to heat the bilayer at a spatial rate of about 1° C./cm to about 5° C./cm. In some embodiments, including any of the foregoing, the processing apparatus is configured to heat the bilayer at a spatial rate of about 0.5° C./cm. In some embodiments, including any of the foregoing, the processing apparatus is configured to heat the bilayer at a spatial rate of about 1° C./cm. In some embodiments, including any of the foregoing, the processing apparatus is configured to heat the bilayer at a spatial rate of about 2° C./cm. In some embodiments, including any of the foregoing, the processing apparatus is configured to heat the bilayer at a spatial rate of about 3° C./cm. In some embodiments, including any of the foregoing, the processing apparatus is configured to heat the bilayer at a spatial rate of about 4° C./cm. In some embodiments, including any of the foregoing, the processing apparatus is configured to heat the bilayer at a spatial rate of about 5° C./cm. In some embodiments, including any of the foregoing, the processing apparatus is configured to heat the bilayer at a spatial rate of about 6° C./cm. In some embodiments, including any of the foregoing, the processing apparatus is configured to heat the bilayer at a spatial rate of about 7° C./cm. In some embodiments, including any of the foregoing, the processing apparatus is configured to heat the bilayer at a spatial rate of about 8° C./cm. In some embodiments, including any of the foregoing, the processing apparatus is configured to heat the bilayer at a spatial rate of about 9° C./cm. In some embodiments, including any of the foregoing, the processing apparatus is configured to heat the bilayer at a spatial rate of about 10° C./cm. In some embodiments, including any of the foregoing, the processing apparatus is configured to heat the bilayer at a spatial rate of about 11° C./cm.

In some embodiments, including any of the foregoing, the processing apparatus includes infrared heaters, which are used to heat the bilayer.

In some embodiments, including any of the foregoing, the processing apparatus includes inductive carbon plate heaters. In certain embodiments, the carbon plates do not touch the green body. In certain embodiments, the carbon plates do not touch the bilayer.

In some embodiments, including any of the foregoing, the processing apparatus uses carbon plate/heating by induction to heat the bilayer.

In some embodiments, including any of the foregoing, the processing apparatus includes lamp-based heating to heat the bilayer. In some embodiments including lamp-based heating, the processing apparatus further includes susceptors configured to absorb at least 20% of the radiation emitted by the lamps.

In some embodiments, including any of the foregoing, the processing apparatus includes oven-based heating.

Depending on the embodiment, heating elements used herein may be carbon plates or carbon paper. In some embodiments, the carbon plates or carbon paper comprise conductive carbon. Depending on the embodiment, heating elements may be molybdenum plates or molybdenum paper.

In some embodiments, the molybdenum plates or molybdenum paper may comprise conductive molybdenum. Current may be applied to heat the conductive carbon plates or conductive carbon paper elements at appropriate rates to temperatures to facilitate sintering within the temperature ranges described herein.

In an embodiment, the maximum heating temperature may range from 900° C. to 2000° C. In an embodiment, the heating temperature may range from 900° C. to 1900° C. In an embodiment, the heating temperature may range from 900° C. to 1800° C. In an embodiment, the heating temperature may range from 900° C. to 1800° C. In an embodiment, the heating temperature may range from 900° C. to 1700° C. In an embodiment, the heating temperature may range from 900° C. to 1600° C. In an embodiment, the heating temperature may range from 900° C. to 1500° C. In an embodiment, the heating temperature may range from 900° C. to 1400° C. In an embodiment, the heating temperature may range from 900° C. to 1300° C. In an embodiment, the heating temperature may range from 900° C. to 1200° C.

In an embodiment, the time in the maximum temperature heating zone may range from 5 seconds to 30 minutes. In an embodiment, the heating time period may range from 5 seconds to 25 minutes. In an embodiment, the heating time period may range from 5 seconds to 20 minutes. In an embodiment, the heating time period may range from 5 seconds to 15 minutes. In an embodiment, the heating time period may range from 5 seconds to 10 minutes. In an embodiment, the heating time period may range from 5 seconds to 5 minutes. In an embodiment, the heating time period may range from 5 seconds to 4 minutes. In an embodiment, the heating time period may range from 5 seconds to 3 minutes. In an embodiment, the heating time period may range from 5 seconds to 4 minutes. In an embodiment, the heating time period may range from 5 seconds to 1 minute.

In some embodiments, the heating elements may have the same area as the material being heated. In some embodiments, the heating elements may be longer than, and as wide as the material being heated. In some embodiments, the heating elements may be the same length as, and be wider than the material being heated. In some embodiments, the heating elements may be shorter than the material being heated. In embodiments in which there is a single heating element, that heating element may have any of the just-described areal relationships to material being heated.

In some embodiments, including any of the foregoing, the processing apparatus has a cool down zone after the sintering section. For example, in a 60 inch furnace, there may be a 20 inch warming zone before the hot zone, a 20 inch hot zone and a 20 inch cooling zone after the hot zone.

In some examples, the at least one furnace has a 1 mm gap above the green body. In some examples, the at least one furnace has a 2 mm gap above the green body. In some examples, the at least one furnace has a 3 mm gap above the green body. In some examples, the at least one furnace has a 4 mm gap above the green body. In some examples, the at least one furnace has a 5 mm gap above the green body. This gap prevents lithium from escaping from the green body.

In some embodiments, including any of the foregoing, the processing apparatus is configured to reduce or eliminate cross-web wrinkling by applying the appropriate amount of tension. For example, to avoid plastic deformation of the foil substrate at high temperature, tension may be kept relatively low. In certain examples, the tension on the foil during sintering is 0.4N to 4N.

In some embodiments, including any of the foregoing, when a separate tool is used for binder burn-out, or when separating tension between the sintering and the binder burn-out sections, the tension on the foil during binder burn-out may be 1.2N to 12N.

In some embodiments, including any of the foregoing, the processing apparatus is configured to reduce or eliminate cross-web wrinkling by using rollers at the entry or exit points of the at least one furnace. Slip rollers, driven rollers, under-driven rollers, over-driven rollers, or other rollers may be used.

In some embodiments, including any of the foregoing, the processing apparatus is configured so that the residence time in the sintering section is two minutes or less.

In some embodiments, including any of the foregoing, the processing apparatus is configured so that the residence time in the sintering section is one minute and thirty seconds or less.

In some embodiments, including any of the foregoing, the processing apparatus is configured so that the residence time in the sintering section is one minute or less.

In some embodiments, including any of the foregoing, the processing apparatus is configured so that the residence time in the sintering section is about thirty seconds or less.

In some embodiments, including any of the foregoing, the processing apparatus is configured so that the residence time in the sintering section is about thirty seconds.

In some embodiments, including any of the foregoing, the processing apparatus is configured so that the residence time in binder burn-out section is about ten times the residence time in the sintering section.

In some embodiments, including any of the foregoing, the processing apparatus includes at least one tension regulator.

In some embodiments, including any of the foregoing, the tension of the bilayer after the front roller is about 270 g.

In some embodiments, including any of the foregoing, the tension of the bilayer before the end roller is about 500 g.

In some embodiments, including any of the foregoing, the width of the bilayer is 8 cm.

In some embodiments, including any of the foregoing, the tension applied to the bilayer is about 34 g/cm.

In some embodiments, including any of the foregoing, the tension applied to the bilayer is about 0.1 N per μm of thickness.

In some embodiments, including any of the foregoing, the tension applied to the bilayer is less than 50% of its yield strength.

In some embodiments, including any of the foregoing, the tension applied to the bilayer is less than 50% of the yield strength of the metal layer.

In some embodiments, including any of the foregoing, the tension applied to the bilayer is about 25% to 50% of its yield strength.

In some embodiments, including any of the foregoing, the tension of the bilayer is about 25% to 50% of the yield strength of the metal layer.

In some embodiments, including any of the foregoing, the green body is a green tape.

In some embodiments, including any of the foregoing, the green body is a patch-coated green tape. Patch coating means that the green body is not continuously deposited on the metal layer. Patch coating means that the green body is deposited in spaced intervals on the metal layer. The metal layer may be scored or partially cut between patches. The metal between patches may be used as the tabs in a battery cell.

In some embodiments, including any of the foregoing, the binder burn-out section is a binder burn-out furnace.

In some embodiments, including any of the foregoing, the binder burn-out furnace is a furnace heated to a temperature sufficient to volatilize, pyrolize, combust, or decompose a binder present in the green body.

In some embodiments, including any of the foregoing, the temperature in the binder burn-out furnace is between 80° C. and 500° C.

In some embodiments, including any of the foregoing, the temperature in the binder burn-out furnace is between 100° C. and 500° C.

In some embodiments, including any of the foregoing, the temperature in the binder burn-out furnace is between 80° C. and 800° C.

In some embodiments, including any of the foregoing, the binder burn-out furnace comprises oxygen. In certain of these embodiments, the sintering furnace does not comprise oxygen.

In some embodiments, including any of the foregoing, the bisque section is a bisque furnace.

In some embodiments, including any of the foregoing, the bisque furnace is a furnace heated to a temperature sufficient to bisque the green body after removing the binder.

In some embodiments, including any of the foregoing, the temperature in the bisque furnace is between 100° C. and 800° C.

In some embodiments, including any of the foregoing, the sintering section is a sintering furnace.

In some embodiments, including any of the foregoing, the sintering furnace is a furnace heated to a temperature sufficient to sinter the green body.

In some embodiments, including any of the foregoing, the sintering furnace is a furnace heated to a temperature sufficient to sinter lithium-stuffed garnet. In some embodiments, including any of the foregoing, the sintering furnace is a furnace heated to a temperature sufficient to sinter lithium aluminum titanium phosphate. In some embodiments, including any of the foregoing, the sintering furnace is a furnace heated to a temperature sufficient to sinter lithium aluminum germanium phosphate. In some embodiments, including any of the foregoing, the sintering furnace is a furnace heated to a temperature of 800-900° C. In some embodiments, including any of the foregoing, the sintering furnace is a furnace heated to a temperature of 900-1000° C. In some embodiments, including any of the foregoing, the sintering furnace is a furnace heated to a temperature of 1000-1100° C. In some embodiments, including any of the foregoing, the sintering furnace is a furnace heated to a temperature of 1100-1200° C.

In some embodiments, including any of the foregoing, the temperature in the sintering furnace is between 500° C. and 1300° C.

In some embodiments, including any of the foregoing, the temperature in the sintering furnace is between 1000° C. and 1300° C.

In some embodiments, including any of the foregoing, the temperature in the sintering furnace is between 1100° C. and 1300° C.

In some embodiments, including any of the foregoing, the binder burn-out furnace is hermetically coupled to the bisque furnace and the bisque furnace is hermetically sealed to the sintering furnace.

In some embodiments, including any of the foregoing, the at least one furnace is a single furnace. In some embodiments, including any of the foregoing, the at least one end roller has a roller diameter greater than 4 cm. In some embodiments, including any of the foregoing, the at least one end roller has a roller diameter greater than 5 cm. In some embodiments, including any of the foregoing, the at least one end roller has a roller diameter greater than 6 cm. In some embodiments, including any of the foregoing, the at least one end roller has a roller diameter greater than 7 cm. In some embodiments, including any of the foregoing, the at least one end roller has a roller diameter greater than 8 cm. In some embodiments, including any of the foregoing, the at least one end roller has a winding tension of greater than 20 g per linear cm of web width.

In some embodiments, including any of the foregoing, the airspace above and below the bilayer is configured to maintain a lithium-rich atmosphere in contact with the sintering film.

In some embodiments, including any of the foregoing, the airspace above and below the bilayer is configured so that the bilayer contains at least 95% by weight of the lithium after processing relative to prior to processing in the processing apparatus.

In some embodiments, including any of the foregoing, the processing apparatus includes at least two end rollers.

In some embodiments, including any of the foregoing, the green body comprises unsintered lithium-stuffed garnet or chemical precursors to lithium-stuffed garnet.

In some embodiments, including any of the foregoing, the processing apparatus includes a sintered bilayer wound around the at least one end roller.

In some embodiments, including any of the foregoing, the sintered bilayer comprises sintered lithium-stuffed garnet. In some embodiments, including any of the foregoing, the sintered bilayer comprises sintered lithium aluminum germanium phosphate. In some embodiments, including any of the foregoing, the sintered bilayer comprises sintered lithium aluminum titanium phosphate.

In some embodiments, including any of the foregoing, the green body comprises a binder.

In some embodiments, including any of the foregoing, the green body comprises a dispersant. In some embodiments, including any of the foregoing, the green body comprises a plasticizer.

In some embodiments, including any of the foregoing, the green body comprises a solvent or a combination of solvents.

In some embodiments, including any of the foregoing, the processing apparatus is configured to move the bilayer through the at least one furnace at rate of at least 2 inches per minute.

In some embodiments, including any of the foregoing, the processing apparatus is configured to move the bilayer through the sintering section at rate of at least 2 inches per minute.

In some embodiments, including any of the foregoing, the processing apparatus includes a curved ramp before the at least one furnace. In some embodiments, including any of the foregoing, the processing apparatus includes a curved ramp before the binder burn-out section. In some embodiments, including any of the foregoing, the processing apparatus includes a curved ramp before the bisque section. In some embodiments, including any of the foregoing, the processing apparatus includes a curved ramp before the sintering section. In some embodiments, including any of the foregoing, the processing apparatus includes a curved ramp inside the at least one furnace. In some embodiments, including any of the foregoing, the processing apparatus includes a curved ramp inside the binder burn-out section. In some embodiments, including any of the foregoing, the processing apparatus includes a curved ramp inside the bisque section. In some embodiments, including any of the foregoing, the processing apparatus includes a curved ramp inside the sintering section. In some embodiments, including any of the foregoing, the curved ramp is coated.

In some embodiments, including any of the foregoing, the coating is a lithium aluminate coating. In some embodiments, including any of the foregoing, the coating is an alumina coating. In some embodiments, including any of the foregoing, the coating is a silicon carbide coating.

In some embodiments, including any of the foregoing, the coating is boron nitride coating.

In some embodiments, including any of the foregoing, the top surface of the curved ramp is made of a ceramic.

In some embodiments, including any of the foregoing, the ceramic is silicon carbide, boron nitride, alumina, zirconia, lithium aluminate.

In some embodiments, including any of the foregoing, the ramp is made of SS 430, SS 304, Kovar, Invar, Haynes 214, greater than 99.5% (w/w) alumina, a carbon composite, boron nitride, or a combination thereof. In some embodiments, speed bumps are deposed a runway. In some embodiments, speed bumps are deposed on a flat runway. In some embodiments, the speed bumps are deposed on a on curved runways. These bumps break the stress from the metal layer continuously touching the runway. These bumps create "airspace" when the film goes up and over the "speed bump". In some embodiments, there is a speed bump on the runway spaced about 1 inches from the next speed bump. In some embodiments, there is a speed bump on the runway spaced about 2 inches from the next speed bump. In some embodiments, there is a speed bump on the runway spaced about 3 inches from the next speed bump. In some embodiments, there is a speed bump on the runway spaced about 4 inches from the next speed bump. In some embodiments, there is a speed bump on the runway spaced about 5 inches from the next speed bump. In some embodiments, there is a speed bump on the runway spaced about 6 inches from the next speed bump. In some embodiments, there is a speed bump on the runway spaced about 7 inches from the next speed bump. In some embodiments, there is a speed bump on the runway spaced about 8 inches from the next speed bump. In some embodiments, there is a speed bump on the runway spaced about 9 inches from the next speed bump. In some embodiments, there is a speed bump on the runway spaced about 10 inches from the next speed bump.

A unique atmosphere, in this instance, means that gaseous or vapor environment in one furnace is materially different from the gaseous or vapor environment in another furnace. For example, a material difference in one oven relative to another may include, but is not limited to, a 5% or greater difference in total pressure, a 5% or greater difference in partial pressure, a two-fold difference in the concentration or amount of a given gas (e.g., $O_2$, $H_2$, $N_2$, Ar, Xe, or $H_2O$) or a 50% difference in the flow rate of one gas or gases (e.g., gas mixture) in one oven relative to another oven. For example, one furnace may include a sufficient amount of $H_2O$ and/or $O_2$ so that organic material can combust if heated to the ignition temperature of the organic material. This may be the conditions in the binder burn out section. In such an example, if another furnace had a low concentration of $O_2$ such that combustion could not be sustained therein even at the combustion temperature, this would demonstrate a material difference in one oven relative to another oven. For example, the sintering oven may have a lower oxygen concentration than the binder burn out oven. In another example, one furnace may include water vapor in concentrations greater than 1,000 parts-per-million (ppm); and another oven may include water vapor in concentrations less than 100 ppm. This difference in the partial pressure of $H_2O$ would also demonstrate a material difference in one oven relative to another oven. In another example, one oven may be under vacuum while another oven may be at 1 atm pressure, and this difference would be a material difference in one oven relative to another oven. In another example, two ovens may have similar gas mixtures but one oven may have a total pressure that is 5% or more lower than the other oven, and this difference would be a material difference in one oven relative to another oven.

In certain embodiments, the binder burn-out oven may include oxidizing agents mixed into the gas or atmosphere which contacts the green tape. These oxidizing agents may include $H_2O$, $O_2$, or clean-dry air. In certain embodiments, the sintering oven does not include oxidizing agents mixed into the gas or atmosphere which contact the sintering film.

In some embodiments, the pressurized enclosure comprises argon (Ar) gas.

In some embodiments, the pressurized enclosure comprises nitrogen ($N_2$) gas.

In some embodiments, the pressurized enclosure further comprises hydrogen ($H_2$) gas.

In some embodiments, the $H_2$ gas is present at about 5% v/v.

In some embodiments, the pressurized enclosure further comprises water ($H_2O$) gas.

In some embodiments, the pressurized enclosure further comprises inert gases such as, but not limited to, $N_2$, $H_2$, Ar, and their mixtures, e.g., $N_2$ and $H_2$. In some embodiments, the mixture is 2.9% $H_2$ and 97.1% $N_2$. In some embodiments, the mixture is 0% $H_2$ and 100% $N_2$. In some embodiments, the mixture is 1% $H_2$ and 99% $N_2$. In some embodiments, the mixture is 2% $H_2$ and 98% $N_2$. In some embodiments, the mixture is 3% $H_2$ and 97% $N_2$. In some embodiments, the mixture is 4% $H_2$ and 98% $N_2$. In some embodiments, the mixture is 5% $H_2$ and 96% $N_2$. In some embodiments, the mixture is 6% $H_2$ and 94% $N_2$. In some embodiments, the mixture is 7% $H_2$ and 93% $N_2$. In some embodiments, the mixture is 8% $H_2$ and 92% $N_2$. In some embodiments, the mixture is 9% $H_2$ and 91% $N_2$. In some embodiments, the mixture is 10% $H_2$ and 90% $N_2$. In some embodiments, the mixture is 0-10% $H_2$ and 90-100% $N_2$. In some embodiments, the mixture is 0-5% $H_2$ and 95-100% $N_2$. In some embodiments, including any of the foregoing, $O_2$ is present at less than 10 parts-per-million (ppm). In some embodiments, including any of the foregoing, $O_2$ is present at 5-10 ppm.

In some embodiments, including any of the foregoing, $O_2$ is present at less than 10 ppm in the binder burn-out oven.

In some embodiments, including any of the foregoing, $O_2$ is present at less than 10 ppm in the sintering oven. In some embodiments, including any of the foregoing, $O_2$ is present at less than 100 ppm in the cooling section after the sintering oven. In some embodiments, including any of the foregoing, $O_2$ is present at less than 70 ppm in the cooling section after the sintering oven. In some embodiments, including any of the foregoing, $O_2$ is present at less than 50 ppm in the cooling section after the sintering oven.

In some embodiments, including any of the foregoing, $O_2$ is present at 5-10 ppm in the binder burn-out oven.

In some embodiments, including any of the foregoing, $O_2$ is present at 5-10 ppm in the sintering oven.

In some embodiments, including any of the foregoing, $O_2$ is present at $10^{-16}$ to $10^{-20}$ Pa in the sintering oven.

In some embodiments, the ovens include $H_2O$ at 1 to 500 ppm.

In some embodiments, the ovens include $H_2O$ at 1 to 1000 ppm.

In certain embodiments, the rapid sintering occurs within a confined space.

The confined space may have an atmosphere that reduces the loss of lithium during sintering of LLZO and helps to retain the stoichiometric amount of lithium in a given LLZO formula. The confined space may be a portion of the oven through which the sintering film moves as it is sintered. Certain processes set forth herein include steps for suspending the film using tension without contacting a surface. Tension may be applied with weights, roller motors, load cells, or other methods for applying tension. Certain processes set forth herein include steps for suspending the film using tension without contacting a surface while moving through the aforementioned confined space. Herein, the portion of the film which is suspended is not contacting a surface, but the devices used to apply tension are contacting other portions of the film. In some embodiments, only the suspended portion of film is sintered while it is not touching other surfaces. Certain processes set forth herein include steps for contacting only one surface (e.g., the bottom surface of a tape or film may contact a roller, tension device, or substrate) during sintering. Certain processes set forth herein include steps for suspending the film using tension, gas flow, or a combination of both tension and gas flow, without contacting a surface. Herein, "without contacting a surface" is specifically referencing the sintering film as it moves through an oven. During the sintering phase, the portion of the green tape that is undergoing sintering is not in contact with any surface which could impart sintering defects into the surface of the green tape. As a green tape moves outside of an oven, the green tape may encounter rollers, rewinders, pins, posts, tension devices, and the like, which contact the green tape's surface. Similarly, as a sintering film moves outside of an oven, the sintered film may encounter rollers, rewinders, pins, posts, and the like, which contact the sintered film. In this case, the contact occurs after the film is sintered, not during sintering. Certain processes set forth herein include steps for continuous peeling of a green tape from a Mylar substrate on which it is disposed. This may occur at the beginning of a sintering process to unroll the green tape from a roller and introduce the peeled green tape into a binder burn out oven. Certain processes set forth herein include steps for applying tension to a green film while it is sintered. Certain processes set forth herein include steps for avoiding reactions with water/oxygen in the ambient while a green tape is processed from a green tape into a sintered film of LLZO. In some embodiments, a metal foil is used in place of a Mylar substrate. In some embodiments, the metal foil is an iron foil, a copper foil, a nickel foil, an alloy thereof, or a combination thereof. In some embodiments, the metal foil is a combination of iron and nickel. In certain embodiments, the combination of iron and nickel has more than 1% iron and the remainder is nickel. In certain embodiments, the combination of iron and nickel has more than 2% iron and the remainder is nickel. In certain embodiments, the combination of iron and nickel has more than 3% iron and the remainder is nickel. In certain embodiments, the combination of iron and nickel has more than 4% iron and the remainder is nickel. In certain embodiments, the combination of iron and nickel has more than 5% iron and the remainder is nickel. In certain embodiments, the combination of iron and nickel has more than 6% iron and the remainder is nickel. In certain embodiments, the combination of iron and nickel has more than 7% iron and the remainder is nickel. In certain embodiments, the combination of iron and nickel has more than 8% iron and the remainder is nickel. In certain embodiments, the combination of iron and nickel has more than 9% iron and the remainder is nickel. In certain embodiments, the combination of iron and nickel has more than 10% iron and the remainder is nickel. In certain embodiments, the combination of iron and nickel has more than 11% iron and the remainder is nickel. In certain embodiments, the combination of iron and nickel has more than 12% iron and the remainder is nickel. In certain embodiments, the combination of iron and nickel has more than 13% iron and the remainder is nickel. In certain embodiments, the combination of iron and nickel has more than 14% iron and the remainder is nickel. In certain embodiments, the combination of iron and nickel has more than 15% iron and the remainder is nickel. In certain embodiments, the combination of iron and nickel has more than 16% iron and the remainder is nickel. In certain embodiments, the combination of iron and nickel has more than 17% iron and the remainder is nickel. In certain embodiments, the combination of iron and nickel has more than 18% iron and the remainder is nickel. In certain embodiments, the combination of iron and nickel has more than 19% iron and the remainder is nickel. In certain embodiments, the combination of iron and nickel has more than 20% iron and the remainder is nickel. In certain embodiments, the combination of iron and nickel has more than 11% iron and the remainder is nickel. In certain embodiments, the combination of iron and nickel has more than 12% iron and the remainder is nickel. In certain embodiments, the combination of iron and nickel has more than 13% iron and the remainder is nickel. In certain embodiments, the combination of iron and nickel has more than 14% iron and the remainder is nickel. In certain embodiments, the combination of iron and nickel has more than 15% iron and the remainder is nickel. In certain embodiments, the combination of iron and nickel has more than 16% iron and the remainder is nickel. In certain embodiments, the combination of iron and nickel has more than 17% iron and the remainder is nickel. In certain embodiments, the combination of iron and nickel has more than 18% iron and the remainder is nickel. In certain embodiments, the combination of iron and nickel has more than 19% iron and the remainder is nickel. In certain embodiments, the combination of iron and nickel has more than 20% iron and the remainder is nickel. In certain embodiments, the combination of iron and nickel has more than 11% iron and the remainder is nickel. In certain embodiments, the combination of iron and nickel has more than 12% iron and the remainder is nickel. In certain embodiments, the combination of iron and nickel has more than 13% iron and the remainder is nickel. In certain embodiments, the combination of iron and nickel has more than 14% iron and the remainder is nickel. In certain embodiments, the combination of iron and nickel has more than 15% iron and the remainder is nickel. In certain embodiments, the combination of iron and nickel has more than 16% iron and the remainder is nickel. In certain embodiments, the combination of iron and nickel has more than 17% iron and the remainder is nickel. In certain embodiments, the combination of iron and nickel has more than 18% iron and the remainder is nickel. In certain embodiments, the combination of iron and nickel has more than 19% iron and the remainder is nickel. In certain embodiments, the combination of iron and nickel has more than 20% iron and the remainder is nickel. In certain embodiments, the combination of iron and nickel has more than 21% iron and the remainder is nickel. In certain embodiments, the combination of iron and nickel has more than 22% iron and the remainder is nickel. In certain embodiments, the combination of iron and nickel has more than 23% iron and the remainder is nickel. In certain embodiments, the combination of iron and nickel has more than 24% iron and the remainder is nickel. In certain embodiments, the combination of iron and nickel has more than 25% iron and the remainder is nickel. In certain embodiments, the combination of iron and nickel has more than 26% iron and the remainder is nickel. In certain embodiments, the combination of iron and nickel has more than 27% iron and the remainder is nickel. In certain embodiments, the combination of iron and nickel has more than 28% iron and the remainder is nickel. In certain embodiments, the combination of iron and nickel has more than 29% iron and the remainder is nickel. In certain embodiments, the combination of iron and nickel has more than 30% iron and the remainder is nickel. In certain embodiments, the combination of iron and nickel has more than 31% iron and the remainder is nickel. In certain embodiments, the combination of iron and nickel has more than 32% iron and the remainder is nickel. In certain embodiments, the combination of iron and nickel has more than 33% iron and the remainder is nickel. In certain embodiments, the combination of iron and nickel has more than 34% iron and the remainder is nickel. In certain embodiments, the combination of iron and nickel has more than 35% iron and the remainder is nickel. In certain embodiments, the combination of iron and nickel has more than 36% iron and the remainder is nickel. In certain embodiments, the combination of iron and nickel has more than 37% iron and the remainder is nickel. In certain embodiments, the combination of iron and nickel has more than 38% iron and the remainder is nickel. In certain embodiments, the combination of iron and nickel has more than 39% iron and the remainder is nickel. In certain embodiments, the combination of iron and nickel has more than 40% iron and the remainder is nickel. In certain embodiments, the combination of iron and nickel has more than 41% iron and the remainder is nickel. In certain embodiments, the combination of iron and nickel has more than 42% iron and the remainder is nickel. In certain embodiments, the combination of iron and nickel has more than 43% iron and the remainder is nickel. In certain embodiments, the combination of iron and nickel has more than 44% iron and the remainder is nickel. In certain embodiments, the combination of iron and nickel has more than 45% iron and the remainder is nickel. In certain embodiments, the combination of iron and nickel has more than 46% iron and the remainder is nickel. In certain embodiments, the combination of iron and nickel has more than 47% iron and the remainder is nickel. In certain embodiments, the combination of iron and nickel has more than 48% iron and the remainder is nickel. In certain embodiments, the combination of iron and nickel has more than 49% iron and the remainder is nickel. In certain embodiments, the combination of iron and nickel has more than 50% iron and the remainder is nickel. In certain embodiments, the combination of iron and nickel has more than 51% iron and the remainder is nickel. In certain embodiments, the combination of iron and nickel has more than 52% iron and the remainder is nickel. In certain embodiments, the combination of iron and nickel has more than 53% iron and the remainder is nickel. In certain embodiments, the combination of iron and nickel has more than 54% iron and the remainder is nickel. In certain embodiments, the combination of iron and nickel has more than 55% iron and the remainder is nickel. In certain embodiments, the combination of iron and nickel has more than 56% iron and the remainder is nickel. In certain embodiments, the combination of iron and nickel has more than 57% iron and the remainder is nickel. In certain embodiments, the combination of iron and nickel has more than 58% iron and the remainder is nickel. In certain embodiments, the combination of iron and nickel has more than 59% iron and the remainder is nickel. In certain embodiments, the combination of iron and nickel has more than 60% iron and the remainder is nickel. In certain embodiments, the combination of iron and nickel has more than 61% iron and the remainder is nickel. In certain embodiments, the combination of iron and nickel has more than 62% iron and the remainder is nickel. In certain embodiments, the combination of iron and nickel has more than 63% iron and the remainder is nickel. In certain embodiments, the combination of iron and nickel has more than 64% iron and the remainder is nickel. In certain embodiments, the combination of iron and nickel has more than 65% iron and the remainder is nickel. In certain embodiments, the combination of iron and nickel has more than 66% iron and the remainder is nickel. In certain embodiments, the combination of iron and nickel has more than 67% iron and the remainder is nickel. In certain embodiments, the combination of iron and nickel has more than 68% iron and the remainder is nickel. In certain embodiments, the combination of iron and nickel has more than 69% iron and the remainder is nickel. In certain embodiments, the combination of iron and nickel has more than 70% iron and the remainder is nickel. In certain embodiments, the combination of iron and nickel has more than 71% iron and the remainder is nickel. In certain embodiments, the combination of iron and nickel has more than 72% iron and the remainder is nickel. In certain embodiments, the combination of iron and nickel has more than 73% iron and the remainder is nickel. In certain embodiments, the combination of iron and nickel has more than 74% iron and the remainder is nickel. In certain embodiments, the combination of iron and nickel has more than 75% iron and the remainder is nickel. In certain embodiments, the combination of iron and nickel has more than 76% iron and the remainder is nickel. In certain embodiments, the combination of iron and nickel has more than 77% iron and the remainder is nickel. In certain embodiments, the combination of iron and nickel has more than 78% iron and the remainder is nickel. In certain embodiments, the combination of iron and nickel has more than 79% iron and the remainder is nickel. In certain embodiments, the combination of iron and nickel has more than 80% iron and the remainder is nickel. In certain embodiments, the combination of iron and nickel has more than 81% iron and the remainder is nickel. In certain embodiments, the combination of iron and nickel has more than 82% iron and the remainder is nickel. In certain embodiments, the combination of iron and nickel has more than 83% iron and the remainder is nickel. In certain embodiments, the combination of iron and nickel has more than 84% iron and the remainder is nickel. In certain embodiments, the combination of iron and nickel has more than 85% iron and the remainder is nickel. In certain embodiments, the combination of iron and nickel has more than 86% iron and the remainder is nickel. In certain embodiments, the combination of iron and nickel has more than 87% iron and the remainder is nickel. In certain embodiments, the combination of iron and nickel has more than 88% iron and the remainder is nickel. In certain embodiments, the combination of iron and nickel has more than 89% iron and the remainder is nickel. In certain embodiments, the combination of iron and nickel has more than 90% iron and the remainder is nickel. In certain embodiments, the combination of iron and nickel has more than 91% iron and the remainder is nickel. In certain embodiments, the combination of iron and nickel has more than 92% iron and the remainder is nickel. In certain embodiments, the combination of iron and nickel has more than 93% iron and the remainder is nickel. In certain embodiments, the combination of iron and nickel has more than 94% iron and the remainder is nickel. In certain embodiments, the combination of iron and nickel has more than 95% iron and the remainder is nickel. In certain embodiments, the combination of iron and nickel has more than 96% iron and the remainder is nickel. In certain embodiments, the combination of iron and nickel has more than 97% iron and the remainder is nickel. In certain embodiments, the combination of iron and nickel has more than 98% iron and the remainder is nickel. In certain embodiments, the combination of iron and nickel has more than 99% iron and the remainder is nickel.

In some embodiments, the binder burn out chimney is replaced with Watlow Heater Cartridges embedded in plates, where the plates are perforated to allow gas to diffuse through them. The plates may incorporate a gas diffuser, gas manifold, channels, or other means to direct gas flow over the product surface(s). The unit includes exhaust ports to remove the products of debindering.

In some embodiments, a 6 inch diameter Lindbergh Bisque tube furnace is used. In some embodiments this furnace is at 650° C. The furnace may be at 200-900° C. The furnace may incorporate multiple temperature zones. The furnace may include a member to support the product during transit; the member may be made of inconel, hastelloy, Haynes Alloy 214, nickel, steel, stainless steel, boron nitride, silicon carbide, aluminum nitride, alumina, or another ceramic or metal. The support member may include a coating of Haynes alloy, nickel, steel, stainless steel, boron nitride, silicon carbide, aluminum nitride, alumina, or another ceramic or metal.

D. Processes of Using

In some embodiments, set forth herein is a process of using a continuous process apparatus, comprising the following operations: (a) heating a green bilayer as the green bilayer moves through at least one furnace to produce a bilayer having less than 1% organic content, and (b) winding the bilayer having less than 1% organic content onto a roller.

In some embodiments, set forth herein is a process of using a continuous process apparatus, comprising the following operations: (a) providing, or having provided, a process apparatus disclosed herein; (b) heating the bilayer as the bilayer moves through the at least one furnace to produce a bisqued bilayer, and (c) winding the bisqued body.

In some embodiments, including any of the foregoing, the process includes step (d) unwinding the bisqued bilayer.

In some embodiments, including any of the foregoing, the process includes step (e) sintering the bilayer.

In some embodiments, including any of the foregoing, the process includes winding up the sintered bilayer on an end roller.

In some embodiments, including any of the foregoing, the sintered bilayer as cut strips.

In some embodiments, including any of the foregoing, the bisqued bilayer after step (c) is rolled up on a roller before it is later sintered.

In some embodiments, set forth herein is a process of using a continuous process apparatus, comprising the following operations: (a) providing, or having provided, a process apparatus disclosed herein; (b) heating a bilayer as the bilayer moves through the at least one furnace to produce a sintered bilayer.

During this process, a variety of embodiments of use are possible depending on certain conditions and the article being produced. In some example, a leader tape will be used. This leader tape will be attached to the green tape with a high temperature ceramic (e.g., zirconia) epoxy, or a metallic weld, or a mechanical connection such as staples. During the binder burn-out process, the green tape will be, in certain embodiments, suspended so that the green tape is not in contact with surfaces (e.g., setters). During the sintering process, the green tape will be, in certain embodiments, suspended so that the green tape is not in contact with surfaces (e.g., setters). This suspension may be accomplished by a variety of means. For example, tension, air bearings, or other devices may be used to suspend the green tape. In some embodiments, the surfaces of, for example, rollers, which the green tape may contact before or after sintering, may be coated with nickel or an inert coating that contains nickel. During sintering, in some embodiments, the sintering tape will move through a narrow gap made of nickel-plated metal plates. In some embodiments, the metal plates are stainless steel metal plates. In some embodiments, this gap will be less than 5 mm in thickness, wherein the thickness is the maximum distance between the nickel-plated metal plates, perpendicular to the face of one of the metal plates. In some embodiments, this gap will be less than 4.5 mm. In some embodiments, this gap will be less than 4 mm. In some embodiments, this gap will be less than 3.5 mm. In some embodiments, this gap will be less than 3 mm. In some embodiments, this gap will be less than 2.5 mm. In some embodiments, this gap will be less than 2 mm. In some embodiments, this gap will be less than 1.5 mm. In some embodiments, this gap will be less than 1 mm. In some embodiments, this gap will be less than 0.5 mm. In some embodiments, this gap will be less than 500 μm. In some embodiments, this gap will be less than 400 μm. In some embodiments, this gap will be less than 300 μm. In some embodiments, this gap will be less than 200 μm. In some embodiments, this gap will be less than 100 μm. In some embodiments, this narrow gap is helpful to prevent lithium loss from a sintering article during the sintering process.

In some embodiments, the flatness of the green tape will be controlled by applying tension to the green tape. In some embodiments, the flatness of the green tape will be controlled by precise tape slitting, which imparts minimal stress to edges of the sintered article. In some embodiments, the flatness of the green tape will be controlled by laser cutting the edges pre- or post-sintered articles. In some embodiments, the flatness of the green tape will be controlled by adjusting the lateral heating profile, e.g., heating center of film first. In some embodiments, flatness is controlled by precise alignment of the rollers applying the tension and other rollers in the processing apparatus.

In some embodiments, the sintered microstructure (high density, small grains) of the produced sintered article will be controlled by rapid sintering. In some embodiments, the sintered microstructure (high density, small grains) of the produced sintered article will be controlled by temperature ramp rate control, by tape speed, by the multiple heating zones, or combinations thereof.

In some embodiments, the process will use atmospheric controls. This may include, for example, controlling the amount of $O_2$ in the sintering oven to less than 100 ppm or even lower. In some embodiments, atmospheric controls includes using $N_2$, Ar, or other inert gases to form gas curtains around the oven's (e.g., around the inlets and outlets to an oven). In some embodiments, atmospheric controls includes using excess flow around the inlets and outlets to an oven. In some embodiments, atmospheric controls includes using narrow openings around the inlets and outlets to an oven. In some embodiments, atmospheric controls includes using gas injection near the center of an oven. This gas injection may lead to laminar flow from center to both ends of the oven. In some embodiments, atmospheric controls includes passive or active overpressure inside an oven by using high gas flows and low opening sizes around the inlets and outlets to an oven.

In some embodiments, atmospheric controls includes using an enclosure to provide an enclosed environment with atmosphere control around or near an oven. For example, an enclosure filled with nitrogen with some regions exposed to reducing environment. The reducing environment may be accomplished by providing a partial pressure of $H_2$ or CO.

In some embodiments, the green tapes are rapidly sintered. The time at which any given part of a film spends at a temperature above room temperature may be between 15 seconds and 20 minutes. In other embodiments, the time at which any given part of a film spends at a temperature above room temperature may be between 1 minute and 10 minutes. In other embodiments, the time at which any given part of a film spends at a temperature above room temperature may be between 1 minute and 5 minutes. In other embodiments, the time at which any given part of a film spends at a temperature above room temperature may be between 1 minute and 2 minutes. In other embodiments, the time at which any given part of a film spends at a temperature above room temperature may be between 1 minute and 90 minutes. In other embodiments, the time at which any given part of a film spends at a temperature above room temperature may be between 1 minute and 75 minutes. In other embodiments, the time at which any given part of a film spends at a temperature above room temperature may be between 1 minute and 60 minutes.

To avoid surface contamination of the sintered article, or pre-sintered article as it moves through the processing apparatus, the films may be cooled to less than 40° C. In some embodiments, the sintered films are maintained in an atmosphere that has a low $H_2O$ content. For example, the $H_2O$ content may be less than 10 ppm. In some embodiments, the sintered films are maintained in an atmosphere that is mostly argon gas. In some embodiments, the sintered films are maintained in an atmosphere that is mostly nitrogen gas. In some embodiments, the sintered films are maintained in clean dry air (CDA).

Because the green tape bilayer mechanical properties will shrink as it is processed in the processing apparatus, different tape speeds (e.g., different roller rotation speeds) may be used for the green tape stage, as compared to the binder burn-out stage, or the sintering stage. Each part of the line may have different tape speeds. These varying speeds may, in some embodiments, be accomplished by independent tension control (e.g., dancer after bisque furnace, tension control after sintering).

Because of lateral shrinkage during sintering, the bilayer may laterally shrink during sintering, the length of the sintering zone (along tape direction) may be large compared to the lateral shrinkage distance. This will make the angle of the tape edges low.

The green tape strength may change as it is processed in the processing apparatus. To accommodate this, the tape tension may be varied throughout the processing apparatus. For example, the tape may be under one tension setting in the binder burn out oven, and the tape may be under a different tension setting in the bisque oven, and, still, the tape may be under yet another a different tension in the sintering oven. The bilayer may be under higher tension in the winding and unwinding sections than in the binder burnout oven or the bisque oven or the sintering oven.

In some embodiments, the green tapes are peeled off Mylar substrates before moving through the continuous manufacturing line. This may be accomplished using a sharp knife edge (e.g., 180° angle at knife edge), tension controls, and other devices.

In some embodiments, the methods include (a) loading a roll of unsintered film on a front roller, (b) unrolling the unsintered film, (c) sintering the unsintered film to produce a sintered film, and (d) rolling the sintered film onto an end roller, wherein the operations are conducted in a controlled atmosphere. A roller may be used to keep the green film or the sintered film in a desired position.

In some embodiments, the green tape moves through the processing apparatus at a rate of about 2 inches to 25 inches per minute. In some embodiments, the green tape moves through the processing apparatus at a rate of about 3 inches to 6 inches per minute. In some embodiments, the green tape moves through the processing apparatus at a rate of about 1 inches to 5 inches per minute. In some embodiments, the green tape moves through the processing apparatus at a rate of about 5 inches to 10 inches per minute.

In some embodiments, the tape moves through the processing apparatus at a rate of about 2-25 inches/min. In some embodiments, the tape moves through the processing apparatus at a rate of about 3-6 inches/min.

In some embodiments, including any of the foregoing, the rate that the tape moves through the processing apparatus refers to the distance traveled and time spent moving through the sintering oven.

FIG. 12 shows one embodiment of a processing apparatus in a vertical processing orientation. Bilayer, 1101, unwinds as bilayer, 1109, as it moves through a first heating zone, 1102, a second heating zone, 1104, a third heating zone, 1106, and a fourth heating zone, 1107. Heating zone, 1107, may also be a cooling zone. Rollers, 1103 and 1105, help to guide the bilayer and maintain proper tension on the bilayer. The final product is shown as sintered roll, 1108, which may also be a bisqued roll, 1108, if sintering has not occurred in the heating zones. The bilayer, 1109, moves vertically up and away from the ground as it moves through zone, 1102. The bilayer, 1109, moves downward toward the ground as it moves through zone, 1106. The bilayer, 1109, moves parallel with the ground as it moves through zone, 1104.

E. Materials Formed by the Processes Disclosed Herein

In some embodiments, set forth herein is a bisqued article prepared by a process herein.

In some embodiments, set forth herein is a sintered article prepared by a process herein.

In some embodiments, set forth herein is a bisque bilayer comprising lithium-stuffed garnet, wherein the bisqued bilayer is wound around a roller, and wherein the bilayer is less than 100 μm thick.

In some embodiments, including any of the foregoing, the bilayer comprises a layer of lithium-stuffed garnet and a layer of metal foil, wherein the layer of lithium-stuffed garnet has a thickness of 10 μm to 30 μm and the layer of metal foil has a thickness of 2-10 μm.

In some embodiments, including any of the foregoing, the grain size in the ceramic sintered layer of the bilayer has a $d_{90}$<5 μm, or <4 μm or <3 μm or <2 μm or <1 μm. The ceramic sintered layer has a porosity of <10 vol %, or <8 vol %, or <6 vol %, or <5 vol %, or <4 vol %, or <3 vol %, or <2 vol %, or <1 vol %, or <0.5 vol %. The interfacial porosity (porosity within the nearest 5 μm to the bilayer interface) is <2 vol %, or <1.5 vol %, or <1 vol %, or <0.5 vol %. These variables are controllable by the sintering atmosphere used to make the sintered bilayer. The gas atmosphere, the ramp rate, and the sintering dwell time may be controlled to produce these features. The slurry may include ceramic particles having a particle size of $d_{50}$ of less than 1 μm, less than 0.5 μm, less than 0.25 μm, or less than 0.1 μm.

In some embodiments, set forth herein is a sintered bilayer comprising lithium-stuffed garnet, wherein the bilayer is wound around a roller, and wherein the bilayer is less than 100 μm thick.

In some embodiments, including any of the foregoing, the bilayer comprises a layer of lithium-stuffed garnet and a layer of metal foil, wherein the layer of lithium-stuffed garnet has a thickness of 10-30 μm and the layer of metal foil has a thickness of 2-10 μm.

In some embodiments, including any of the foregoing, the layer of metal foil comprises nickel, iron, or combinations thereof.

In some embodiments, set forth herein is a sintered bilayer prepared by a process herein.

In some embodiments, including any of the foregoing, the sintered bilayer includes lithium-stuffed garnet.

In some embodiments, including any of the foregoing, the bilayer comprises a layer of lithium-stuffed garnet and a layer of metal foil, wherein the layer of lithium-stuffed garnet has a thickness of 10-30 μm and the layer of metal foil has a thickness of 2-10 μm.

In some embodiments, including any of the foregoing, the layer of metal foil comprises nickel, iron, or combinations thereof.

In some embodiments, including any of the foregoing, the green body layer comprises unsintered lithium-stuffed garnet.

In some embodiments, including any of the foregoing, the green body layer comprises the chemical precursors to lithium-stuffed garnet.

In some embodiments, including any of the foregoing, the metal layer of the bilayer comprises a metal selected from the group consisting of nickel (Ni), iron (Fe), copper (Cu), platinum (Pt), gold (Au), silver, an alloy thereof, or a combination thereof.

In some embodiments, including any of the foregoing, the metal layer of the bilayer is an alloy of Fe and Ni.

In some embodiments, including any of the foregoing, the metal layer of the bilayer is an alloy of Fe and Ni, and the amount of Fe is 1% to 25% (w/w) with the remainder being Ni.

In some embodiments, including any of the foregoing, the thickness of the metal layer of the bilayer is 1 μm to 20 μm.

In some embodiments, including any of the foregoing, the thickness of the metal layer of the bilayer is 1 μm to 10 μm.

In some embodiments, including any of the foregoing, the processing apparatus includes a green tape wound around the at least one front roller.

In some embodiments, the sintering of the LLZO films occurs without contacting portions of the LLZO film which are sintering with other surfaces, such as processing apparatus surfaces, during sintering. Not contacting the portion of the film which is sintering may have unexpectedly advantageous properties such as low flatness, retention of the stoichiometric amount of lithium in a given LLZO formula, and advantageous microstructure (e.g., high density, small grain size, and combinations thereof). Not contacting the top surface of the film will result in fewer surface defects such as scratches or tears.

In some embodiments, including any of the foregoing, the sintered article comprises a bilayer. In embodiments, the bilayer includes a metal foil and a ceramic film. In some embodiments, the sintered article comprises a trilayer, with two ceramic layers sandwiching a metal layer. In some embodiments, the metal is Ni. In some embodiments, the Ni is 1 μm thick. In some embodiments, the Ni is 2 μm thick. In some embodiments, the Ni is 3 μm thick. In some embodiments, the Ni is 4 μm thick. In some embodiments, the Ni is 5 μm thick. In some embodiments, the Ni is 6 μm thick. In some embodiments, the Ni is 7 μm thick. In some embodiments, the Ni is 8 μm thick. In some embodiments, the Ni is 9 μm thick. In some embodiments, the Ni is 10 μm thick. In some embodiments, the Ni is 11 μm thick. In some embodiments, the Ni is 12 μm thick. In some embodiments, the Ni is 13 μm thick. In some embodiments, the Ni is 14 μm thick. In some embodiments, the Ni is 15 μm thick. In some embodiments, the Ni is 16 μm thick. In some embodiments, the Ni is 17 μm thick. In some embodiments, the Ni is 18 μm thick. In some embodiments, the Ni is 19 μm thick. In some embodiments, the Ni is 20 μm thick.

In some embodiments, a slurry may be deposited onto a piece of foil, forming a green tape with a foil backing. In some embodiments, the foil is a Mylar foil. The green tape with foil backing may be wound up into a roll, forming a roll of unsintered film with a foil backing. The roll of unsintered film with a foil backing may be loaded onto a processing apparatus as described herein. In some embodiments, a method of using the processing apparatus may include: (a) loading a roll of unsintered film with a foil backing on a front roller, (b) unrolling the unsintered film, (c) sintering the unsintered film to produce a sintered film with a foil backing, and (d) rolling the sintered film with a foil backing onto an end roller, wherein the operations are conducted in a controlled atmosphere. In some embodiments, the foil backing may comprise nickel metal or nickel foil.

In some embodiments, the green film sintered using the processing apparatus is a bilayer or a trilayer.

In some embodiments, various layer architectures can be envisioned and sintered according to the sintering methods set forth herein: A) free-standing lithium stuffed garnet material; B) free-standing lithium stuffed garnet material which optionally includes an active material, a binder, a solvent, and, or, carbon; C) a bilayer having one layer of a lithium stuffed garnet and one layer of a metal powder, foil or sheet; D) a bilayer having one layer of a lithium stuffed garnet and one layer comprising a metal powder, foil or sheet, E) a bilayer having one layer of a lithium stuffed garnet material which optionally includes an active material, a binder, a solvent, and, or, carbon and one layer of a metal powder, foil, or sheet; F) a trilayer having two layers of a lithium stuffed garnet and one layer of a metal powder, foil or sheet, between and in contact with the garnet layers; G) a trilayer having two layers of a lithium stuffed garnet and one layer comprising a metal powder, foil or sheet, between and in contact with the garnet layers; and H) a trilayer having two layers of a lithium stuffed garnet material wherein each garnet layer optionally includes an active material, a binder, a solvent, and, or, carbon and one layer of a metal powder, foil, or sheet, between and in contact with the garnet layers.

In some cases, a bilayer may be sintered using a processing apparatus described herein. In some cases, a trilayer may be sintered using a processing apparatus described herein.

A trilayer may comprises a layer of lithium-stuffed garnet, a metal layer, and a second layer of lithium-stuffed garnet on the opposite side of the metal layer. A bilayer film may pass through the processing apparatus with a layer of lithium-stuffed garnet facing up and the second layer of lithium-stuffed garnet facing down.

A bilayer may comprise a layer of lithium-stuffed garnet and a layer of metal foil. In some embodiments, a metal layer comprises Ni, Fe, Cu, Al, Sn, In, Ag, Au, steel, alloys, or combinations thereof. For example, the metal layer may include Ni and Fe. For example, the metal layer may include 90% Ni and 10% Fe. For example, the metal layer may include Ni and Fe. For example, the metal layer may include 91% Ni and 9% Fe. For example, the metal layer may include Ni and Fe. For example, the metal layer may include 92% Ni and 8% Fe. For example, the metal layer may include Ni and Fe. For example, the metal layer may include 93% Ni and 7% Fe. For example, the metal layer may include Ni and Fe. For example, the metal layer may include 94% Ni and 6% Fe. For example, the metal layer may include Ni and Fe. For example, the metal layer may include 95% Ni and 5% Fe. For example, the metal layer may include Ni and Fe. For example, the metal layer may include 96% Ni and 4% Fe. For example, the metal layer may include Ni and Fe. For example, the metal layer may include 97% Ni and 3% Fe. For example, the metal layer may include Ni and Fe. For example, the metal layer may include 98% Ni and 2% Fe. For example, the metal layer may include Ni and Fe. For example, the metal layer may include 99% Ni and 1% Fe. In some embodiments, a metal layer is a sheet of metal. In some embodiments, a metal layer is a sheet of aluminum. In some embodiments, a metal layer is a sheet of nickel. In some embodiments, a metal layer may be malleable. In some embodiments, the metal layer is 1 μm thick. In some embodiments, the metal layer is 2 μm thick. In some embodiments, the metal layer is 3 μm thick. In some embodiments, the metal layer is 4 μm thick. In some embodiments, the metal layer is 5 μm thick. In some embodiments, the metal layer is 6 μm thick. In some embodiments, the metal layer is 7 μm thick. In some embodiments, the metal layer is 8 μm thick. In some embodiments, the metal layer is 9 μm thick. In some embodiments, the metal layer is 10 μm thick. In some embodiments, the metal layer is 11 μm thick. In some embodiments, the metal layer is 12 μm thick. In some embodiments, the metal layer is 13 μm thick. In some embodiments, the metal layer is 14 μm thick. In some embodiments, the metal layer is 15 μm thick. In some embodiments, the metal layer is 16 μm thick. In some embodiments, the metal layer is 17 μm thick. In some embodiments, the metal layer is 18 μm thick. In some embodiments, the metal layer is 19 μm thick. In some embodiments, the metal layer is 20 μm thick.

In some embodiments, the lithium-stuffed garnet-metal sintered films herein are 1 μm to 100 μm in thickness. In certain embodiments, these films are co-sintered with a mixed amount of lithium-stuffed garnet and a metal. The metal may be selected from the group consisting of Ni, Mg, Li, Fe, Al, Cu, Au, Ag, Pd, Pt, Ti, steel, alloys thereof, and combination thereof. The lithium-stuffed garnet and metal are mixed as powders and then co-sintered to form a film. In some embodiments, the film includes a uniform mixture of lithium-stuffed garnet and metal. The relative amounts of lithium-stuffed garnet and metal may vary by volume percent from 1% lithium-stuffed garnet up to 99% lithium-stuffed garnet with the remainder being the metal.

In some embodiments, including any of the foregoing, lithium-stuffed garnet is sintered onto a ceramic-metal film.

The processing apparatus systems and processes set forth herein are useful for making a variety of materials. These materials include but are not limited to lithium-stuffed garnet film films. These materials include but are not limited to bilayers of a lithium-stuffed garnet film on a metal layer or trilayers of a metal layer between two lithium-stuffed garnet films. The processing apparatus systems and processes set forth herein are useful for making lithium-stuffed garnet films or composite materials, including but not limited to any of the sintered films or film-including materials set forth in PCT/US2016/043428, filed Jul. 21, 2016, and published as WO2017015511A1-titled PROCESSES AND MATERIALS FOR CASTING AND SINTERING GREEN GARNET THIN FILMS; PCT/US2019/056584, filed Oct. 16, 2019, and published as WO2020081718A1-titled SINTERING LARGE AREA CERAMIC FILMS; PCT/US2016/15209, filed Jan. 27, 2016, and published as WO2017131676A1-titled ANNEALED GARNET ELECTROLYTE SEPARATORS; PCT/US2017/039069, filed Jan. 23, 2017, and published as WO2018236394A1-titled LITHIUM-STUFFED GARNET ELECTROLYTES WITH SECONDARY PHASE INCLUSIONS. PCT/US2019/54117, filed Oct. 1, 2019, and published as WO2020072524A1—titled METHODS OF MAKING AND USING AN ELECTROCHEMICAL CELL COMPRISING AN INTERLAYER; U.S. Pat. Nos. 10,403,931; 10,290,895; 9,966,630 B2; 10,347,937 B2; and 10,103,405, the entire contents of each of which are herein incorporate by reference in their entirety for all purposes.

In some embodiments, including any of the foregoing, the ceramic-metal film may be an oxide-metal film. In some embodiments, the film has one layer that is a ceramic and one layer that is a metal. In other embodiments, the film is a homogenous mixture of ceramic and metal. In some embodiments, the ceramic-metal film comprises a ceramic and a metal. In some embodiments, the volume percent of the ceramic is 10% and the volume percent of the metal is 90%. In some embodiments, the volume percent of the ceramic is 20% and the volume percent of the metal is 80%. In some embodiments, the volume percent of the ceramic is 30% and the volume percent of the metal is 70%. In some embodiments, the volume percent of the ceramic is 40% and the volume percent of the metal is 60%. In some embodiments, the volume percent of the ceramic is 50% and the volume percent of the metal is 50%. In some embodiments, the volume percent of the ceramic is 60% and the volume percent of the metal is 40%. In some embodiments, the volume percent of the ceramic is 70% and the volume percent of the metal is 30%. In some embodiments, the volume percent of the ceramic is 80% and the volume percent of the metal is 20%. In some embodiments, the volume percent of the ceramic is 90% and the volume percent of the metal is 10%. In some embodiments, the volume percent of the ceramic is 5% and the volume percent of the metal is 95%. In some embodiments, the volume percent of the ceramic is 15% and the volume percent of the metal is 85%. In some embodiments, the volume percent of the ceramic is 25% and the volume percent of the metal is 75%. In some embodiments, the volume percent of the ceramic is 35% and the volume percent of the metal is 65%. In some embodiments, the volume percent of the ceramic is 45% and the volume percent of the metal is 55%. In some embodiments, the volume percent of the ceramic is 55% and the volume percent of the metal is 45%. In some embodiments, the volume percent of the ceramic is 65% and the volume percent of the metal is 32%. In some embodiments, the volume percent of the ceramic is 75% and the volume percent of the metal is 25%. In some embodiments, the volume percent of the ceramic is 85% and the volume percent of the metal is 15%. In some embodiments, the volume percent of the ceramic is 95% and the volume percent of the metal is 5%.

In some embodiments, including any of the foregoing, the ceramic-metal film comprises an oxide and a metal. In some embodiments, the volume percent of the oxide is 10% and the volume percent of the metal is 90%. In some embodiments, the volume percent of the oxide is 20% and the volume percent of the metal is 80%. In some embodiments, the volume percent of the oxide is 30% and the volume percent of the metal is 70%. In some embodiments, the volume percent of the oxide is 40% and the volume percent of the metal is 60%. In some embodiments, the volume percent of the oxide is 50% and the volume percent of the metal is 50%. In some embodiments, the volume percent of the oxide is 60% and the volume percent of the metal is 40%. In some embodiments, the volume percent of the oxide is 70% and the volume percent of the metal is 30%. In some embodiments, the volume percent of the oxide is 80% and the volume percent of the metal is 20%. In some embodiments, the volume percent of the oxide is 90% and the volume percent of the metal is 10%. In some embodiments, the volume percent of the oxide is 5% and the volume percent of the metal is 95%. In some embodiments, the volume percent of the oxide is 15% and the volume percent of the metal is 85%. In some embodiments, the volume percent of the oxide is 25% and the volume percent of the metal is 75%. In some embodiments, the volume percent of the oxide is 35% and the volume percent of the metal is 65%. In some embodiments, the volume percent of the oxide is 45% and the volume percent of the metal is 55%. In some embodiments, the volume percent of the oxide is 55% and the volume percent of the metal is 45%. In some embodiments, the volume percent of the oxide is 65% and the volume percent of the metal is 32%. In some embodiments, the volume percent of the oxide is 75% and the volume percent of the metal is 25%. In some embodiments, the volume percent of the oxide is 85% and the volume percent of the metal is 15%. In some embodiments, the volume percent of the oxide is 95% and the volume percent of the metal is 5%.

In some embodiments, including any of the foregoing, the ceramic-metal film may be an oxide-metal film. In some embodiments, the ceramic-metal film comprises a ceramic and a metal. In some embodiments, the weight percent of the ceramic is 10% and the weight percent of the metal is 90%. In some embodiments, the weight percent of the ceramic is 20% and the weight percent of the metal is 80%. In some embodiments, the weight percent of the ceramic is 30% and the weight percent of the metal is 70%. In some embodiments, the weight percent of the ceramic is 40% and the weight percent of the metal is 60%. In some embodiments, the weight percent of the ceramic is 50% and the weight percent of the metal is 50%. In some embodiments, the weight percent of the ceramic is 60% and the weight percent of the metal is 40%. In some embodiments, the weight percent of the ceramic is 70% and the weight percent of the metal is 30%. In some embodiments, the weight percent of the ceramic is 80% and the weight percent of the metal is 20%. In some embodiments, the weight percent of the ceramic is 90% and the weight percent of the metal is 10%. In some embodiments, the weight percent of the ceramic is 5% and the weight percent of the metal is 95%. In some embodiments, the weight percent of the ceramic is 15% and the weight percent of the metal is 85%. In some embodiments, the weight percent of the ceramic is 25% and the weight percent of the metal is 75%. In some embodiments, the weight percent of the ceramic is 35% and the weight percent of the metal is 65%. In some embodiments, the weight percent of the ceramic is 45% and the weight percent of the metal is 55%. In some embodiments, the weight percent of the ceramic is 55% and the weight percent of the metal is 45%. In some embodiments, the weight percent of the ceramic is 65% and the weight percent of the metal is 32%. In some embodiments, the weight percent of the ceramic is 75% and the weight percent of the metal is 25%. In some embodiments, the weight percent of the ceramic is 85% and the weight percent of the metal is 15%. In some embodiments, the weight percent of the ceramic is 95% and the weight percent of the metal is 5%.

In some embodiments, including any of the foregoing, the ceramic in the ceramic-metal film may be selected from alumina, silica, titania, lithium-stuffed garnet, lithium aluminate, aluminum hydroxide, an aluminosilicate, lithium zirconate, lanthanum aluminate, lanthanum zirconate, lanthanum oxide, lithium aluminum titanium phosphate, lithium aluminum germanium phosphate, lithium lanthanum titanate, lithium lanthanum oxide, zirconia, $Li_2ZrO_3$, $xLi_2O$-$(1-x)SiO_2$ (where $x=0.01$-$0.99$), $aLi_2O$-$bB_2O_3$-$cSiO_2$ (where $a+b+c=1$), $LiLaO_2$, $LiAlO_2$, $Li_2O$, $Li_3PO_4$, or combinations thereof.

In embodiments, the trilayer includes a metal foil and a green ceramic film on both sides of the metal foil. A metal foil in a bilayer or trilayer may have a thickness of between 0.5 μm to 50 μm. A metal foil in a bilayer or trilayer may have a thickness of between 3 μm to 30 μm. In some embodiments, the metal foil in a bilayer or trilayer may have a thickness of between 5-20 μm. In other embodiments, the metal foil in a bilayer or trilayer may have a thickness of between 5 μm to 15 μm.

In some embodiments, including any of the foregoing, the sintered article comprises LLZO.

In some embodiments, the sintered ceramic film has a $D_{50}$ grain size less than 5 μm. In some embodiments, the sintered ceramic film has a $D_{50}$ grain size less than 4 μm. In some embodiments, the sintered ceramic film has a $D_{50}$ grain size less than 3 μm. In some embodiments, the sintered ceramic film has a $D_{50}$ grain size less than 2 μm. In some embodiments, the sintered ceramic film has a $D_{50}$ grain size less than 1 μm. In some embodiments, the sintered ceramic film has a $D_{50}$ grain size less than 0.9 μm. In some embodiments, the sintered ceramic film has a $D_{50}$ grain size less than 0.8 μm. In some embodiments, the sintered ceramic film has a $D_{50}$ grain size less than 0.7 μm. In some embodiments, the sintered ceramic film has a $D_{50}$ grain size less than 0.6 μm. In some embodiments, the sintered ceramic film has a $D_{50}$ grain size less than 0.5 μm. In some embodiments, the sintered ceramic film has a $D_{50}$ grain size less than 0.4 µm. In some embodiments, the sintered ceramic film has a $D_{50}$ grain size less than 0.3 µm. In some embodiments, the sintered ceramic film has a $D_{50}$ grain size less than 0.2 µm. In some embodiments, the sintered ceramic film has a $D_{50}$ grain size less than 0.1 micron. In some embodiments, the sintered ceramic film has a $D_{90}$ grain size less than 5 µm. In some embodiments, the sintered ceramic film has a $D_{90}$ grain size less than 4 µm. In some embodiments, the sintered ceramic film has a $D_{90}$ grain size less than 3 µm. In some embodiments, the sintered ceramic film has a $D_{90}$ grain size less than 2 µm. In some embodiments, the sintered ceramic film has a $D_{90}$ grain size less than 1 µm. In some embodiments, the sintered ceramic film has a $D_{90}$ grain size less than 0.9 µm. In some embodiments, the sintered ceramic film has a $D_{90}$ grain size less than 0.8 µm. In some embodiments, the sintered ceramic film has a $D_{90}$ grain size less than 0.7 µm. In some embodiments, the sintered ceramic film has a $D_{90}$ grain size less than 0.6 µm. In some embodiments, the sintered ceramic film has a $D_{90}$ grain size less than 0.5 µm. In some embodiments, the sintered ceramic film has a $D_{90}$ grain size less than 0.4 µm. In some embodiments, the sintered ceramic film has a $D_{90}$ grain size less than 0.3 µm. In some embodiments, the sintered ceramic film has a $D_{90}$ grain size less than 0.2 µm. In some embodiments, the sintered ceramic film has a $D_{90}$ grain size less than 0.1 micron. In some embodiments, the sintered ceramic film has a porosity of less than 5 vol %. In some embodiments, the sintered ceramic film has a porosity of 1 less than 4 vol %. In some embodiments, the sintered ceramic film has a porosity of less than 3 vol %. In some embodiments, the sintered ceramic film has a porosity of less than 2 vol %. In some embodiments, the sintered ceramic film has a porosity of less than 1 vol %. In some embodiments, the sintered ceramic film has a porosity of less than 0.5 vol %. In some embodiments, the sintered ceramic film has a porosity of less than 0.4 vol %. In some embodiments, the sintered ceramic film has a porosity of less than 0.3 vol %. In some embodiments, the sintered ceramic film has a porosity of less than 0.2 vol %. In some embodiments, the sintered ceramic film has a density of greater than 95 vol %. In some embodiments, the sintered ceramic film has a density of greater than 96 vol %. In some embodiments, the sintered ceramic film has a density of greater than 97 vol %. In some embodiments, the sintered ceramic film has a density of greater than 98 vol %. In some embodiments, the sintered ceramic film has a density of greater than 99 vol %. In some embodiments, the sintered ceramic film has a density of greater than 99.5 vol %. In some embodiments, the sintered ceramic film has a density of greater than 99.6 vol %. In some embodiments, the sintered ceramic film has a density of greater than 99.7 vol %. In some embodiments, the sintered ceramic film has a density of greater than 99.8 vol %. In some embodiments, the sintered ceramic film has a density of greater than 99.9 vol %.

In some embodiments, a roll of sintered film may further comprise additional padding material interleaved between layers of the roll.

In some embodiments, including any of the foregoing, the sintered ceramic film has a $D_{50}$ grain size of less than 5 microns (µm).

In some embodiments, including any of the foregoing, the sintered ceramic film has a $D_{90}$ grain size of less than 5 µm.

In some embodiments, including any of the foregoing, the sintered ceramic film has a porosity of less than 5% by volume.

In some embodiments, including any of the foregoing, the sintered film has a surface defect density of fewer than 100 protrusions per square centimeter from the surface with an aspect ratio (height/diameter) of greater than 1 and height greater than 2 microns relative to the median height of the surrounding 1000 µm² area.

In some embodiments, including any of the foregoing, the sintered film has a surface defect density of fewer than 100 valleys per square centimeter from the surface with an aspect ratio (height/diameter) greater than 1 and a depth greater than 2 microns relative to the median height of the surrounding 1000 µm² area.

In some embodiments, including any of the foregoing, the sintered film has a surface defect density of fewer than 100 protrusions per square centimeter at the interface between a lithium-stuffed garnet film and a metal layer with an aspect ratio (height/diameter) of greater than 1.

In some embodiments, including any of the foregoing, the sintered film has a surface defect density of fewer than 100 valleys per square centimeter the interface between a lithium-stuffed garnet film and a metal layer with an aspect ratio (height/diameter) greater than 1.

In some embodiments, including any of the foregoing, the $D_{50}$ grain size is at least 10 nm.

In some embodiments, including any of the foregoing, the $D_{50}$ grain size is at least 50 nm.

In some embodiments, including any of the foregoing, the $D_{50}$ grain size is at least 0.5 µm.

F. Sintered Lithium-Stuffed Garnet on Metal Foil

The processing apparatus disclosed herein may be used to sinter lithium-stuffed garnet on a metal foil. In some embodiments, the metal foil is a densified metal layer. In certain embodiments, the metal foil is a densified metal layer that also includes a ceramic. In some of these embodiments, the ceramic is a lithium-stuffed garnet.

In some embodiments, the metal foil or metal layer is nickel, steel, stainless steel, copper, aluminum, Kovar, Invar, ceramic, Haynes216, or a combination thereof. In some embodiments, the metal foil was produced at least in part by roll annealing. In some embodiments, the metal foil was produced at least in part by an electrodeposition process. In certain embodiments, the LLZO is sintered on a metal foil. In some of these embodiments, the metal foil is pure Ni. In some of these embodiments, the metal foil is a combination of Ni and Fe. In some of these embodiments, the metal foil comprises 5-20% Fe and 80-95% Ni. In some of these embodiments, the metal foil comprises 10-20% Fe and 80-90% Ni.

In certain embodiments, the LLZO is sintered on a metal foil. In some of these embodiments, the metal foil is pure Cu. In some of these embodiments, the metal foil comprises 5-20% Cu and 80-95% Ni. In some of these embodiments, the metal foil comprises 10-20% Cu and 80-90% Ni. In some of these embodiments, the metal foil is a combination of Cu and Fe.

In some embodiments, the green tape which is described above as deposited on mylar foil is instead deposited onto a metal layer. The metal may be nickel, steel, stainless steel, copper, aluminum, Kovar, Invar, ceramic, Haynes216, or a combination thereof. In this example, the green tape does not need to be peeled off mylar and can instead be directly sintered on the metal. The green tape the metal may be rolled up together before the green tape is moved through the processing apparatus. In some embodiments, a backing layer is applied to the metal which is rolled up with a green tape on the metal. In some embodiments, an interleaf layer is used when the metal with a green tape on the metal is rolled up. The interleaf provides padding between the layers which are rolled up.

In some embodiments, the processing apparatus is used to sintered lithium-stuffed garnet with no underlying substrate.

In some embodiments, the processing apparatus is used to sinter a green lithium-stuffed garnet layer adjacent to a green oxide/metal mixed layer. The green oxide/metal mixed layer may comprise Ni powder in 0.0001-25% by weight, Fe powder in 1-25% by weight, or combinations thereof. In some cases, the green oxide/metal mixed layer comprises 1-20 weight % of Ni and 1-10 weight % of Fe and the remainder is lithium-stuffed garnet. In some cases, the green oxide/metal mixed layer comprises 5-15 weight % of Ni and 1-5 weight % of Fe and the remainder is lithium-stuffed garnet. In some cases, the green oxide/metal mixed layer comprises 10-15 weight % of Ni and 3-5 weight % of Fe and the remainder is lithium-stuffed garnet.

Other configurations are contemplated herein. For example, a bare film configuration may be as follows: a sintered LLZO film with no other, metal-containing layers.

For example, a co-sintering configuration may include a bilayer of green LLZO and green metal-ceramic layer. The metal-ceramic layer is a metal and ceramic powder while in green state.

For example, an on-foil configuration may be as follows. This includes casting a green LLZO on a metal layer/foil. The metal layer is a dense layer, not a powder. The foil in this case has no ceramic in it, can be purchased, and is typically made by processes other than sintering (e.g., electrodeposition or roll-annealing). The metal layer may additionally include ceramic inclusions of <10 vol %.

G. Bilayers & Additional Embodiments

In some embodiments, including any of the foregoing, the width of the bilayer to be processed is about 700 mm. In some embodiments, including any of the foregoing, the width of the bilayer to be processed is about 600 mm. In some embodiments, including any of the foregoing, the width of the bilayer to be processed is about 500 mm. In some embodiments, including any of the foregoing, the width of the bilayer to be processed is about 400 mm. In some embodiments, including any of the foregoing, the width of the bilayer to be processed is about 300 mm.

In some embodiments, including any of the foregoing, the width of the bilayer to be processed is about 250 mm.

In some embodiments, including any of the foregoing, the width of the bilayer to be processed is about 200 mm.

In some embodiments, including any of the foregoing, the width of the bilayer to be processed is about 150 mm.

In some embodiments, including any of the foregoing, the width of the bilayer to be processed is about 100 mm. In some embodiments, including any of the foregoing, the width of the bilayer to be processed is about 90 mm. In some embodiments, including any of the foregoing, the width of the bilayer to be processed is about 80 mm.

In some embodiments, including any of the foregoing, the width of the bilayer to be processed is about 50 mm.

In some embodiments, including any of the foregoing, the metal foil in the bilayer tape is an alloy of Nickel, consists essentially of Ni, or consist essentially of pure Ni, or consists only of pure Ni.

In some embodiments, including any of the foregoing, the average thickness of the metal foil will range from 4.5 $\mu m$ to 10.5 $\mu m$. In certain examples, the average thickness is 4, 5, 6, 7, 8, 9, 10, or 11. $\mu m$. In certain examples, the average thickness 4.5, 5.5, 6.5, 7.5, 8.5, 9.5, 10.5, or 11.5 $\mu m$. Thickness is measured by scanning electron microscope (SEM) unless stated otherwise.

In some embodiments, including any of the foregoing, the thickness of the foil may vary across the width and length by up to +/−1.25 $\mu m$.

In some embodiments, including any of the foregoing, the ceramic layer covers the majority of the width of the metal foil, but there may a region at both edges of the foil without any ceramic layer; these regions which may be up to 15 mm in width. In some embodiments, including any of the foregoing, the metal foil has one or two uncoated edges of about 3 mm. In some embodiments, including any of the foregoing, the metal foil has one or two uncoated edges of about 4 mm. In some embodiments, including any of the foregoing, the metal foil has one or two uncoated edges of about 5 mm. In some embodiments, including any of the foregoing, the metal foil has one or two uncoated edges of about 6 mm. In some embodiments, including any of the foregoing, the metal foil has one or two uncoated edges of about 7 mm. In some embodiments, including any of the foregoing, the metal foil has one or two uncoated edges of about 8 mm. In some embodiments, including any of the foregoing, the metal foil has one or two uncoated edges of about 9 mm. In some embodiments, including any of the foregoing, the metal foil has one or two uncoated edges of about 10 mm. In some embodiments, including any of the foregoing, the metal foil has one or two uncoated edges of about 11 mm. In some embodiments, including any of the foregoing, the metal foil has one or two uncoated edges of about 12 mm. In some embodiments, including any of the foregoing, the metal foil has one or two uncoated edges of about 13 mm. In some embodiments, including any of the foregoing, the metal foil has one or two uncoated edges of about 14 mm.

In some embodiments, including any of the foregoing, in the central region of the ceramic layer, the average thickness of the sintered, dense ceramic layer will range from 18 $\mu m$ to 42 $\mu m$, and the thickness may vary locally across the width and length of the web by up to +/−1.5 $\mu m$.

In some embodiments, including any of the foregoing, the thickness of the ceramic layer prior to processing will be higher, up to a maximum of 2.25× the sintered thickness. Therefore, the average thickness of the ceramic layer in the central region prior to sintering will be up to 95 $\mu m$, and it may vary across the width and length by up to +/−3.4 $\mu m$.

In some embodiments, including any of the foregoing, the incoming bilayer will be in the form of a roll, wound up on a core having a diameter between 3 inches and 6 inches.

At the end of the process, in some embodiments, including any of the foregoing, the sintered tape shall be wound up on a roll again with a minimum core diameter of 6-12 inches.

In some embodiments, including any of the foregoing, the if the BBO and sintering are carried out in separate tools, the tape shall be wound up into a roll after the BBO process, with a minimum core diameter of 6-12 inches, to allow transporting it to the sinter tool in roll form.

In some embodiments, including any of the foregoing, the maximum outgoing coil diameter (if using a 12 inch core) is 360-450 mm, and the maximum coil weight is 40-140 kg.

H. Gas & Atmosphere

I. Configuration

In some examples, each heating zone has its own individually controllable gas outlet and exhaust, thereby allowing to flow different gases, different total flow amounts, and different exhaust openings in each zone. The gas flow within each zone, in these examples, shall be perpendicular to the web movement (i.e., machine) direction. This means either flow perpendicular to the web or across the web would be acceptable, but flow in the machine direction is not.

II. Available Gases

The systems and apparatus herein shall allow flowing the following gases, or mixtures thereof: nitrogen ($N_2$), forming gas ($N_2+H_2$ with $H_2<5\%$), wet nitrogen, wet forming gas.

III. Atmosphere Requirements

In some embodiments, throughout the entire tool (e.g., furnace), $O_2$ levels, as measured by sampling gas from each zone individually using an $O_2$ analyzer while flowing only $N_2$ gas in all zones, shall be maintained below 10 ppm-50 ppm.

In some embodiments, requirements for $H_2O$ levels, as measured by sampling gas from each zone individually using a dew point analyzer while the tool is in its typical gas flow configuration (which may include flowing forming gas and wet nitrogen and wet forming gas), differ for different sections of the temperature profile.

IV. Gas Flows

In some embodiments, in the BBO stage, the maximum refresh rate is 1-3 exchanges per minute. One exchange per minute means that the flow rate of gas in volume per minute is equal to the internal volume accessible to the gas. Two exchanges per minute means that the flow rate of gas in volume per minute (at STP) is twice the internal volume accessible to the gas. In some embodiments, in the sinter stage, the maximum refresh rate is 0.3-3 exchanges per minute.

V. Effluent Management

Organic vapors from binder removal are prone to condense and leave residue on cooler surfaces. Any condensation on internal surfaces of the tool shall be avoided by heating the internal surfaces that carry binder effluent; the heating is continued without cold spots until reaching a building exhaust system or a cooling trap.

VI. Atmospheric Controls

The processing apparatus as a complete system, or various components of the processing apparatus (e.g., ovens), may be encased in enclosures that provide atmospheric controls.

Various gas curtains may be used with the processing apparatus, as a complete system, or with various components of the processing apparatus (e.g., ovens), to provide atmospheric controls.

In some embodiments, atmospheric controls includes using narrow oven openings.

In some embodiments, atmospheric controls includes using excess flow at oven inlets and outlets. In some embodiments, atmospheric controls includes using a $N_2$ or Ar-filled glove box around various components such as rollers. In some embodiments, atmospheric controls includes using overpressures inside ovens. In some embodiments, the pressure inside the oven is at least 0.1 inch of water column greater than ambient pressure. In some embodiments, the pressure inside the oven is at least 0.3 inch of water column greater than ambient pressure. In some embodiments, the pressure inside the oven is at least 0.5 inch of water column greater than ambient pressure. In some embodiments, the pressure inside the oven is at least 0.7 inch of water column greater than ambient pressure. In some embodiments, the pressure inside the oven is at least 0.9 inch of water column greater than ambient pressure. In some embodiments, the pressure inside the oven is at least 1 inch of water column greater than ambient pressure.

In some embodiments, atmospheric controls includes controlling the amount of $H_2O$ in an oven. In some embodiments, atmospheric controls includes controlling the amount of $O_2$ in an oven. In some embodiments, atmospheric controls includes controlling the amount of $O_2$ in an oven to levels less than 100 ppm. In some embodiments, atmospheric controls includes controlling the amount of $O_2$ in an oven to levels less than 10 ppm. In some embodiments, atmospheric controls includes controlling the amount of $O_2$ in an oven to levels less than 1 ppm. In some embodiments, atmospheric controls includes controlling the amount of $H_2$ in an oven. In some embodiments, atmospheric controls includes controlling the amount of $N_2$ in an oven.

In some embodiments, the gas curtain is an $N_2$ curtain.

In some embodiments, an air box (tunnel configuration) is used with exhaust.

In some embodiments, an air box with a feedback loop is used to form a gas feed tube. In some embodiments, $O_2$ sensor(s) in the ovens are also included.

In some embodiments, the process will use atmospheric controls. This may include, for example, controlling the amount of $O_2$ in the sintering oven to less than 100 ppm or even lower. In some embodiments, atmospheric controls includes using $N_2$, Ar, or other inert gases to form gas curtains around the ovens (e.g., around the inlets and outlets to an oven). In some embodiments, atmospheric controls includes using excess flow around the inlets and outlets to an oven. In some embodiments, atmospheric controls includes using narrow openings around the inlets and outlets to an oven. In some embodiments, atmospheric controls includes using gas injection near the center of an oven. This gas injection may lead to laminar flow from center to both ends of the oven. In some embodiments, atmospheric controls includes passive or active overpressure inside an oven by using high gas flows and low opening sizes around the inlets and outlets to an oven.

In some embodiments, atmospheric controls includes using an enclosure to provide an enclosed environment with atmosphere control around or near an oven. For example, an enclosure filled with nitrogen with some regions exposed to reducing environment. The reducing environment may be accomplished by providing a partial pressure of $H_2$ or CO.

In some embodiments, parts of the manufacturing line are enclosed in a container or room, which includes atmosphere controls. For example, the manufacturing line may be completely enclosed in a clean room. The inlet and/or outlet of the processing apparatus may be enclosed in a clean room. In certain of these embodiments, gases are introduced into the enclosed container or room (e.g., clean room) which are free of particles. CDA refers to clean dry air and is the air or gases which have been filtered to remove particles based on the size of those particles. The gases may include $N_2$, Ar, forming gas (Ar/$H_2$; or $N_2$/$H_2$), or a combination thereof.

Pressure is measured with pressure gauge(s) and gas flow is controlled by mass-flow controllers.

In some embodiments, set forth herein is a processing apparatus comprising:
  a front roller;
  at least one furnace comprising at least three heating zones; and
  a runway having a surface that comprises a material selected from:
    nickel (Ni), iron (Fe), a Ni-alloy, an Fe-alloy, a Ni—Fe alloy, stainless steel, pyrolytic carbon, carbon fiber composite (CFC), graphite,
alumina ($Al_2O_3$), zirconia ($ZrO_2$), boron nitride, silicon carbide, magnesium oxide, or a combination thereof.

In some embodiments, set forth herein is a processing apparatus comprising:
a front roller; at least one furnace comprising at least three heating zones; and at least one of the following:
baffles within a heating zone;
baffles between two heating zones;
curtain purges between two heating zones;
means for controlling at least two distinct pressure zones within the at least three heating zones;
means for exhausting at least one furnace;
means for purging gas between two heating zones;
means for isolating gas between two heating zones;
means for mechanically separating two heating zones; or
a combination thereof.

In some embodiments, set forth herein is a processing apparatus comprising:
a front roller;
at least one furnace comprising at least three heating zones; and
a bilayer held under tension, wherein the tension ranges from 0.1 g/cm to 500 g/cm of web width.

In some embodiments, set forth herein is a processing apparatus comprising:
a front roller;
at least one furnace comprising at least three heating zones;
a bilayer; and
at least two or more rollers;
wherein the bilayer is wrapped around one of the at least two or more rollers at a wrap angle that ranges from 0 to 40°.

In some embodiments, including any of the foregoing, the processing apparatus includes a bilayer.

In some embodiments, including any of the foregoing, the bilayer is a metal-ceramic bilayer.

In some embodiments, including any of the foregoing, the three distinct heating zones comprise (a) a binder burn-out section; (b) a bisque section; and (c) a sintering section.

In some embodiments, including any of the foregoing, the processing apparatus includes an end roller.

In some embodiments, including any of the foregoing, the front roller is mechanically coupled to the at least one furnace.

In some embodiments, including any of the foregoing, the front roller has a motor which is sealed from the at least one furnace.

In some embodiments, including any of the foregoing, the runway is inside the at least one furnace. In some embodiments, including any of the foregoing, the runway is inside the sintering section. In some embodiments, including any of the foregoing, the runway comprises exhaust ports. In some embodiments, including any of the foregoing, the runway comprises speed bumps. In some embodiments, including any of the foregoing, the top runway is center-less. In some embodiments, including any of the foregoing, the runway comprises holes on its top surface. In some embodiments, including any of the foregoing, the at least one furnace is sealed.

In some embodiments, including any of the foregoing, the processing apparatus includes a cool-down section.

In some embodiments, including any of the foregoing, the processing apparatus includes at least one atmospheric controller which controls at least one condition in the furnace selected from the group consisting of gas flow rate, flow direction, gas composition, pressure, and combinations thereof.

In some embodiments, including any of the foregoing, the bilayer is wound onto the front roller.

In some embodiments, including any of the foregoing, the bilayer comprises a metal layer and a ceramic layer.

In some embodiments, including any of the foregoing, the ceramic layer is green, bisqued, or sintered.

In some embodiments, including any of the foregoing, the at least one furnace comprises a multiple zone tunnel kiln (MZTK).

In some embodiments, including any of the foregoing, rollers comprise a material selected from silicon carbide, Ni, stainless steel, or a combination thereof.

In some embodiments, including any of the foregoing, the processing apparatus includes rollers that are mechanically align-able to within 0.005 inches. In some embodiments, including any of the foregoing, the processing apparatus includes rollers that are mechanically align-able to within 0.001 inches. In some embodiments, including any of the foregoing, the processing apparatus includes rollers that are mechanically align-able in three-dimensions.

In some embodiments, including any of the foregoing, the processing apparatus includes nip rollers. In some embodiments, including any of the foregoing, the at least one furnace comprises hot rollers.

In some embodiments, including any of the foregoing, the at least one furnace comprises rollers configured to form a ramp. In some embodiments, including any of the foregoing, the MZTK has rollers configured to form an arch inside the MZTK. In some embodiments, including any of the foregoing, the processing apparatus includes one to thirty rollers configured to form a ramp. In some embodiments, including any of the foregoing, the processing apparatus includes one to twenty rollers configured to form a ramp.

In some embodiments, including any of the foregoing, the MZTK is sealed.

In some embodiments, including any of the foregoing, the MZTK is sealed under vacuum.

In some embodiments, including any of the foregoing, the front roller has a motor which is sealed from the MZTK under vacuum.

In some embodiments, including any of the foregoing, the process apparatus includes baffles between each heating zone.

In some embodiments, including any of the foregoing, the wrap angle around a roller ranges from 0° to 40°. In some embodiments, including any of the foregoing, the wrap angle around a roller ranges in the binder-burnout section ranges from 0° to 40°. In some embodiments, including any of the foregoing, the wrap angle around a roller ranges in the sintering section ranges from 0° to 40°. In some embodiments, including any of the foregoing, the processing apparatus includes nip rollers on edges, speed bumps, air bearings, or a combination thereof.

In some embodiments, including any of the foregoing, the bilayer is suspended in the process apparatus.

In some embodiments, including any of the foregoing, the at least one furnace comprises (a) a binder burn-out section; (b) a bisque section; and (c) a sintering section.

In some embodiments, including any of the foregoing, the at least one furnace is sealed such that at least one atmospheric controller controls the flow of gas into and out of the at least one furnace.

In some embodiments, including any of the foregoing, the processing apparatus includes a pressurized gas line between the bisque section and the sintering section, which pumps gas into the bisque section and into the sintering section.

In some embodiments, including any of the foregoing, the at least one furnace is enclosed in a sealed container.

In some embodiments, including any of the foregoing, the sealed container comprises an atmosphere of Ar, $N_2$, $H_2$, or a combination thereof.

In some embodiments, including any of the foregoing, an atmospheric controller maintains a reducing atmosphere in the sintering section.

In some embodiments, including any of the foregoing, an atmospheric controller maintains an atmosphere in the sintering section comprising argon (Ar) gas; nitrogen ($N_2$) gas; hydrogen ($H_2$) gas; or a mixture thereof.

In some embodiments, including any of the foregoing, an atmospheric controller maintains an atmosphere comprising less than 500 ppm $O_2$ in the bisque section, the sintering section, or both the bisque section and the sintering section.

In some embodiments, including any of the foregoing, the $H_2$ gas is present at about 1, 2, 3, 4, or 5% v/v.

In some embodiments, including any of the foregoing, the ceramic layer is green is a green tape.

In some embodiments, including any of the foregoing, the ceramic layer is green is a patch-coated green tape.

In some embodiments, including any of the foregoing, the bilayer is oriented for curtain processing as it moves through the process apparatus.

In some embodiments, including any of the foregoing, the bilayer is oriented for vertical processing as it moves through the process apparatus.

In some embodiments, including any of the foregoing, the metal layer comprises a metal selected from the group consisting of nickel (Ni), iron (Fe), copper (Cu), titanium, tungsten, molybdenum, an alloy thereof, or a combination thereof.

In some embodiments, including any of the foregoing, the metal layer is an alloy of Fe and Ni.

In some embodiments, including any of the foregoing, the metal layer is an alloy of Fe and Ni, and the amount of Fe is 1% to 25% (w/w) with the remainder being Ni.

In some embodiments, including any of the foregoing, the thickness of the metal layer is 1 µm to 20 µm. In some embodiments, including any of the foregoing, the bilayer is suspended as it moves through the sintering zone. In some embodiments, including any of the foregoing, the processing apparatus includes a sintered bilayer wound around the at least one end roller. In some embodiments, including any of the foregoing, the sintered bilayer comprises a metal layer and a sintered oxide layer. In some embodiments, including any of the foregoing, the sintered bilayer comprises a metal layer and a sintered lithium-stuffed garnet layer. In some embodiments, including any of the foregoing, the process apparatus is configured to move the bilayer through the at least one furnace at a rate of at least 2 inches per minute. In some embodiments, including any of the foregoing, the binder burn-out zone and the sintering zone are positioned parallel to each other.

In some embodiments, including any of the foregoing, the binder burn-out zone is positioned above the sintering zone.

In some embodiments, including any of the foregoing, the processing apparatus further includes a second binder burn-out zone.

In some embodiments, including any of the foregoing, the entire process apparatus is contained under vacuum.

In some embodiments, set forth herein is a process of using a continuous process apparatus, comprising the following operations:
(a) heating a green bilayer as the green bilayer moves through at least one furnace to produce a bilayer having less than 1% organic content, and
(b) winding the bilayer having less than 1% organic content onto a roller.

In some embodiments, set forth herein is a process of using a continuous process apparatus, comprising the following operations:
(a) providing, or having provided, a process apparatus as set forth herein;
(b) heating the bilayer as the bilayer moves through the at least one furnace to produce a bisqued bilayer, and
(c) winding the bisqued body.

In some embodiments, including any of the foregoing, the process further includes (d) unwinding the bisqued bilayer.

In some embodiments, including any of the foregoing, the process further includes (e) sintering the bilayer.

In some embodiments, including any of the foregoing, the process further includes winding up the sintered bilayer on an end roller.

In some embodiments, including any of the foregoing, the sintered bilayer as cut strips.

In some embodiments, including any of the foregoing, the bisqued bilayer after step (c).

In some embodiments, set forth herein is a bisqued article prepared by a process set forth herein.

In some embodiments, set forth herein is a sintered article prepared by a process set forth herein.

In some embodiments, set forth herein is a bisque bilayer comprising lithium-stuffed garnet, wherein the bisqued bilayer is wound around a roller, and wherein the bilayer is less than 100 µm thick.

In some embodiments, including any of the foregoing, bilayer comprises a layer of lithium-stuffed garnet and a layer of metal foil, wherein the layer of lithium-stuffed garnet has a thickness of 10 µm-30 µm and the layer of metal foil has a thickness of 2 µm-10 µm.

In some embodiments, set forth herein is a sintered bilayer comprising lithium-stuffed garnet, wherein the bilayer is wound around a roller, and wherein the bilayer is less than 100 µm thick.

In some embodiments, including any of the foregoing, the bilayer comprises a layer of lithium-stuffed garnet and a layer of metal foil, wherein the layer of lithium-stuffed garnet has a thickness of 10 µm-30 µm and the layer of metal foil has a thickness of 2 µm-10 µm.

In some embodiments, including any of the foregoing, the layer of metal foil comprises nickel, iron, or combinations thereof.

In some embodiments, set forth herein is a process of using a continuous process apparatus, comprising the following operations: (a) providing, or having provided, a process apparatus set forth herein; (b) heating a bilayer as the bilayer moves through the at least one furnace to produce a sintered bilayer.

In some embodiments, set forth herein is a sintered bilayer prepared by a process above.

In some embodiments, including any of the foregoing, the process includes lithium-stuffed garnet.

In some embodiments, including any of the foregoing, the bilayer comprises a layer of lithium-stuffed garnet and a layer of metal foil, wherein the layer of lithium-stuffed garnet has a thickness of 10 μm to 30 μm and the layer of metal foil has a thickness of 2-10 μm.

In some embodiments, including any of the foregoing, the layer of metal foil comprises nickel, iron, or combinations thereof.

I. Additional Embodiments

In at least one embodiment, set forth herein is a process for making a sintered bilayer, including: providing a green bilayer, including a green body layer and a metal layer, under tension of 1 N to 300 N per meter of web width; moving the green bilayer through a first heating zone to produce a debindered bilayer; moving the debindered bilayer through a second heating zone to prepare a sintered bilayer; wherein the debindered bilayer is in an arched configuration as the debindered bilayer moves through the second heating zone; wherein the debindered bilayer is in the second heating zone for about 1 second to about 3 minutes; wherein the temperature in the second heating zone is 1050° C. to 1250° C.; and wherein the thickness of the sintered bilayer is less than 100 μm.

In some embodiments, including any of the foregoing, the tension is 10 N to 200 N per meter of web width.

In some embodiments, including any of the foregoing, the tension is 40 N to 200 N per meter of web width.

In some embodiments, including any of the foregoing, the tension is 80 N to 150 N per meter of web width.

In some embodiments, including any of the foregoing, the tension is 125 N to 200 N per meter of web width.

In some embodiments, including any of the foregoing, the green bilayer is under the recited tension in the first heating zone.

In some embodiments, including any of the foregoing, the debindered bilayer is under the recited tension in the second heating zone.

In some embodiments, including any of the foregoing, the tension in the first heating zone is different than the tension in the second heating zone.

In some embodiments, including any of the foregoing, the tension in the first heating zone is lower than the tension in the second heating zone.

In some embodiments, including any of the foregoing, the tension is 125 N to 250 N per meter of web width in the first heating zone; and 10 N to 200 N per meter of web width in the second heating zone.

In some embodiments, including any of the foregoing, the tension is 125 N to 250 N per meter of web width in the first heating zone; and 40 N to 200 N per meter of web width in the second heating zone.

In some embodiments, including any of the foregoing, the tension is 3 N to 35 N per meter of web width in the first heating zone; and 3 N to 35 N per meter of web width in the second heating zone. In certain examples, the tension is applied using a flat runway.

In some embodiments, including any of the foregoing, the tension is 125 N to 250 N per meter of web width in the first heating zone; and 40 N to 190 N per meter of web width in the second heating zone. In certain examples, the tension is applied using a runway in an arched configuration. In certain examples, the radius of curvature for the arched configuration is 3-5 meters.

In some embodiments, including any of the foregoing, tension is maintained by a tension controller that has a ±10% tolerance or less.

The process of any foregoing embodiment, further including cooling the sintered bilayer. In certain examples, the process includes cooling the sintered bilayer to room temperature.

In some embodiments, including any of the foregoing, the green body layer includes ceramic powder and a binder.

In some embodiments, including any of the foregoing, the sintered bilayer includes a sintered oxide layer.

In some embodiments, including any of the foregoing, the sintered bilayer includes sintered lithium-stuffed garnet.

In some embodiments, including any of the foregoing, the metal layer includes nickel, iron, or an alloy thereof.

In some embodiments, including any of the foregoing, the thickness of the metal layer is 1 μm to 10 μm.

In some embodiments, including any of the foregoing, the thickness of the sintered oxide layer is 5 μm to 40 μm.

In some embodiments, including any of the foregoing, the width of the sintered bilayer is 300 mm or less.

In some embodiments, including any of the foregoing, the width of the sintered bilayer is at least 0.5 μm.

In some embodiments, including any of the foregoing, the sintered bilayer length is at least 1 meter.

In some embodiments, including any of the foregoing, the sintered bilayer length is less than 500 meter.

In some embodiments, including any of the foregoing, the bilayer moves through the second heating zone at a rate from 1 cm/min to 200 cm/min.

In some embodiments, including any of the foregoing, the bilayer moves through the second heating zone at a rate from 5 cm/min to 100 cm/min through the second heating zone.

In some embodiments, including any of the foregoing, the bilayer moves through the second heating zone at a rate from 8 cm/min to 80 cm/min.

In some embodiments, including any of the foregoing, the bilayer moves through the second heating zone at a rate of from 20 cm/min to 80 cm/min.

In some embodiments, including any of the foregoing, the bilayer moves through the second heating zone at a rate of about 80 cm/min.

In some embodiments, including any of the foregoing, the debindered bilayer is in an arched configuration characterized by a radius of curvature of 0.5 meters to 4.0 meters.

In some embodiments, including any of the foregoing, the debindered bilayer is in an arched configuration characterized by a radius of curvature of 2.0 meters to 4.0 meters.

In some embodiments, including any of the foregoing, the debindered bilayer is in an arched configuration characterized by a radius of curvature of 1.0 meter, 2.0 meters, 3.0 meters, or 4.0 meters.

In some embodiments, including any of the foregoing, the debindered bilayer is in an arched configuration characterized by a radius of curvature of 1 meter.

In some embodiments, including any of the foregoing, the debindered bilayer is in an arched configuration characterized by a radius of curvature of 3.8 meters.

In some embodiments, including any of the foregoing, the green bilayer is in an arched configuration characterized by a radius of curvature of 0.5 meters to 4.0 meters.

In some embodiments, including any of the foregoing, the green bilayer is in an arched configuration characterized by a radius of curvature of 2.0 meters to 4.0 meters.

In some embodiments, including any of the foregoing, the green bilayer is in an arched configuration characterized by a radius of curvature of 1.0 meter, 2.0 meters, 3.0 meters, or 4.0 meters.

In some embodiments, including any of the foregoing, the green bilayer is in an arched configuration characterized by a radius of curvature of 1 meter.

In some embodiments, including any of the foregoing, the green bilayer is in an arched configuration characterized by a radius of curvature of 3.8 meters.

In some embodiments, including any of the foregoing, the green bilayer is in an arched configuration characterized by a radius of curvature of 5.0 meters.

In some embodiments, including any of the foregoing, the at least one runway provides the arched configuration. This means that the runway is used with tension to curve the bilayer in an arched configuration.

In some embodiments, including any of the foregoing, at least one roller provides the arched configuration. This means that at least one or more rollers is used with tension to curve the bilayer in an arched configuration.

In some embodiments, including any of the foregoing, at least one speed bump provides the arched configuration. This means that at least one or more speed bumps is used with tension to curve the bilayer in an arched configuration.

In some embodiments, including any of the foregoing, the first heating zone is 60 inches in length.

In some embodiments, including any of the foregoing, the second heating zone is 60 inches in length.

In some embodiments, including any of the foregoing, the debindered bilayer is in the second heating zone for about 10 seconds, 11 seconds, 12 seconds, 13 seconds, 14 seconds, 15 seconds, 16 seconds, 17 seconds, 18 seconds, 19 seconds, 20 seconds, 21 seconds, 22 seconds, 23 seconds, 24 seconds, 25 seconds, 26 seconds, 27 seconds, 28 seconds, 29 seconds, 30 seconds, 31 seconds, 32 seconds, 33 seconds, 34 seconds, 35 seconds, 36 seconds, 37 seconds, 38 seconds, 39 seconds, 40 seconds, 41 seconds, 42 seconds, 43 seconds, 44 seconds, 45 seconds, 46 seconds, 47 seconds, 48 seconds, 49 seconds, 50 seconds, 51 seconds, 52 seconds, 53 seconds, 54 seconds, 55 seconds, 56 seconds, 57 seconds, 58 seconds, 59 seconds, 60 seconds, 70 seconds, 80 seconds, or 90 seconds.

In some embodiments, including any of the foregoing, the green bilayer moves horizontally through the first heating zone.

In some embodiments, including any of the foregoing, the green bilayer moves vertically through the first heating zone.

In yet another embodiment, set forth herein is a process for making a sintered bilayer, including: providing a green bilayer including a green body layer and a metal layer; moving the green bilayer through a first heating zone to produce a debindered bilayer; moving the debindered bilayer through a second heating zone to prepare a sintered bilayer; wherein the debindered bilayer is in an arched configuration as the debindered bilayer moves through the second heating zone; wherein the debindered bilayer is in the second heating zone for about 1 second to about 3 minutes; wherein the temperature in the second heating zone is 1050° C. to 1250° C.; and wherein the thickness of the sintered bilayer is less than 100 µm.

In some embodiments, including any of the foregoing, the tension is 10 N to 200 N per meter of web width.

In some embodiments, including any of the foregoing, the tension is 40 N to 200 N per meter of web width.

In some embodiments, including any of the foregoing, the tension is 80 N to 150 N per meter of web width.

In some embodiments, including any of the foregoing, the tension is 125 N to 200 N per meter of web width.

In some embodiments, including any of the foregoing, the tension is 150 N to 200 N per meter of web width.

In some embodiments, including any of the foregoing, the tension is 180 N to 200 N per meter of web width.

In some embodiments, including any of the foregoing, the green bilayer is under the recited tension in the first heating zone.

In some embodiments, including any of the foregoing, the debindered bilayer is under the recited tension in the second heating zone.

In some embodiments, including any of the foregoing, the tension in the first heating zone is different than the tension in the second heating zone.

In some embodiments, including any of the foregoing, the tension in the first heating zone is lower than the tension in the second heating zone.

In some embodiments, including any of the foregoing, the tension is 125 N to 250 N per meter of web width in the first heating zone; and 10 N to 200 N per meter of web width in the second heating zone.

In some embodiments, including any of the foregoing, the tension is 125 N to 250 N per meter of web width in the first heating zone; and 40 N to 200 N per meter of web width in the second heating zone.

In some embodiments, including any of the foregoing, tension is maintained by a tension controller that has a ±10% tolerance or less.

The process of a foregoing embodiment, further including cooling the sintered bilayer. In certain examples, the process includes cooling the sintered bilayer to room temperature.

In some embodiments, including any of the foregoing, the green body layer includes ceramic powder and a binder.

In some embodiments, including any of the foregoing, the sintered bilayer includes a sintered oxide layer.

In some embodiments, including any of the foregoing, the sintered bilayer includes sintered lithium-stuffed garnet.

In some embodiments, including any of the foregoing, the metal layer includes nickel, iron, or an alloy thereof.

In some embodiments, including any of the foregoing, the thickness of the metal layer is 1 µm to 10 µm.

In some embodiments, including any of the foregoing, the thickness of the sintered oxide layer is 5 µm to 40 µm.

In some embodiments, including any of the foregoing, the width of the sintered bilayer is 300 mm or less.

In some embodiments, including any of the foregoing, the width of the sintered bilayer is at least 0.5 µm.

In some embodiments, including any of the foregoing, the sintered bilayer length is at least 1 meter.

In some embodiments, including any of the foregoing, the sintered bilayer length is less than 500 meter.

In some embodiments, including any of the foregoing, the bilayer moves through the second heating zone at a rate from 1 cm/min to 200 cm/min.

In some embodiments, including any of the foregoing, the bilayer moves through the second heating zone at a rate from 5 cm/min to 100 cm/min through the second heating zone.

In some embodiments, including any of the foregoing, the bilayer moves through the second heating zone at a rate from 8 cm/min to 80 cm/min.

In some embodiments, including any of the foregoing, the bilayer moves through the second heating zone at a rate of from 20 cm/min to 80 cm/min.

In some embodiments, including any of the foregoing, the bilayer moves through the second heating zone at a rate of about 80 cm/min.

In some embodiments, including any of the foregoing, debindered bilayer is in an arched configuration characterized by a radius of curvature of 0.5 meters to 4.0 meters.

In some embodiments, including any of the foregoing, the debindered bilayer is in an arched configuration characterized by a radius of curvature of 2.0 meters to 4.0 meters.

In some embodiments, including any of the foregoing, the debindered bilayer is in an arched configuration characterized by a radius of curvature of 1.0 meter, 2.0 meters, 3.0 meters, or 4.0 meters.

In some embodiments, including any of the foregoing, the debindered bilayer is in an arched configuration characterized by a radius of curvature of 1 meter.

In some embodiments, including any of the foregoing, the debindered bilayer is in an arched configuration characterized by a radius of curvature of 3.8 meters.

In some embodiments, including any of the foregoing, the green bilayer is in an arched configuration characterized by a radius of curvature of 0.5 meters to 4.0 meters.

In some embodiments, including any of the foregoing, the green bilayer is in an arched configuration characterized by a radius of curvature of 2.0 meters to 4.0 meters.

In some embodiments, including any of the foregoing, the green bilayer is in an arched configuration characterized by a radius of curvature of 1.0 meter, 2.0 meters, 3.0 meters, or 4.0 meters.

In some embodiments, including any of the foregoing, the green bilayer is in an arched configuration characterized by a radius of curvature of 1 meter.

In some embodiments, including any of the foregoing, the green bilayer is in an arched configuration characterized by a radius of curvature of 3.8 meters.

In some embodiments, including any of the foregoing, at least one runway provides the arched configuration.

In some embodiments, including any of the foregoing, at least one roller provides the arched configuration.

In some embodiments, including any of the foregoing, at least one speed bump provides the arched configuration.

In some embodiments, including any of the foregoing, the first heating zone is 60 inches in length.

In some embodiments, including any of the foregoing, the second heating zone is 60 inches in length.

In some embodiments, including any of the foregoing, the debindered bilayer is in the second heating zone for about 1 second, 2 seconds, 3 seconds, 4 seconds, 5 seconds, 6 seconds, 7 seconds, 8 seconds, 9 seconds, 10 seconds, 11 seconds, 12 seconds, 13 seconds, 14 seconds, 15 seconds, 16 seconds, 17 seconds, 18 seconds, 19 seconds, 20 seconds, 21 seconds, 22 seconds, 23 seconds, 24 seconds, 25 seconds, 26 seconds, 27 seconds, 28 seconds, 29 seconds, 30 seconds, 31 seconds, 32 seconds, 33 seconds, 34 seconds, 35 seconds, 36 seconds, 37 seconds, 38 seconds, 39 seconds, 40 seconds, 41 seconds, 42 seconds, 43 seconds, 44 seconds, 45 seconds, 46 seconds, 47 seconds, 48 seconds, 49 seconds, 50 seconds, 51 seconds, 52 seconds, 53 seconds, 54 seconds, 55 seconds, 56 seconds, 57 seconds, 58 seconds, 59 seconds, 60 seconds, 70 seconds, 80 seconds, or 90 seconds.

In some embodiments, including any of the foregoing, the green bilayer moves horizontally through the first heating zone.

In some embodiments, including any of the foregoing, the green bilayer moves vertically through the first heating zone.

In still another embodiment, set forth herein is a process for making a sintered bilayer, including: providing a green bilayer, including a green body layer and a metal layer, under tension of 1 N to 300 N per meter of web width; moving the green bilayer through a first heating zone to produce a debindered bilayer; moving the debindered bilayer through a second heating zone to prepare a sintered bilayer; wherein the debindered bilayer is in the second heating zone for about 1 second to about 3 minutes; wherein the temperature in the second heating zone is 1050° C. to 1250° C.; and wherein the thickness of the sintered bilayer is less than 100 µm.

In some embodiments, including any of the foregoing, the debindered bilayer is in an arched configuration as the debindered bilayer moves through the second heating zone.

In some embodiments, including any of the foregoing, the debindered bilayer is in flat configuration as the debindered bilayer moves through the second heating zone.

In some embodiments, including any of the foregoing, the tension is 3 N to 100 N per meter of web width.

In some embodiments, including any of the foregoing, the tension is 3 N to 80 N per meter of web width.

In some embodiments, including any of the foregoing, the tension is 3 N to 50 N per meter of web width.

In some embodiments, including any of the foregoing, the tension is 3 N to 35 N per meter of web width.

In some embodiments, including any of the foregoing, the tension is 3 N to 30 N per meter of web width.

In some embodiments, including any of the foregoing, the tension is 10 N to 20 N per meter of web width.

In some embodiments, including any of the foregoing, the green bilayer is under the recited tension in the first heating zone.

In some embodiments, including any of the foregoing, the debindered bilayer is under the recited tension in the second heating zone.

In some embodiments, including any of the foregoing, the tension in the first heating zone is different than the tension in the second heating zone.

In some embodiments, including any of the foregoing, the tension in the first heating zone is lower than the tension in the second heating zone.

In some embodiments, including any of the foregoing, the tension is 3 N to 50 N per meter of web width in the first heating zone; and 3 N to 50 N per meter of web width in the second heating zone.

In some embodiments, including any of the foregoing, the tension is 3 N to 35 N per meter of web width in the first heating zone; and 3 N to 35 N per meter of web width in the second heating zone.

In some embodiments, including any of the foregoing, tension is maintained by a tension controller that has a +10% tolerance or less.

The process of a foregoing embodiment, further including cooling the sintered bilayer. In certain examples, the process includes cooling the sintered bilayer to room temperature.

In some embodiments, including any of the foregoing, the green body layer includes ceramic powder and a binder.

In some embodiments, including any of the foregoing, the sintered bilayer includes a sintered oxide layer.

In some embodiments, including any of the foregoing, the sintered bilayer includes sintered lithium-stuffed garnet.

In some embodiments, including any of the foregoing, the metal layer includes nickel, iron, or an alloy thereof.

In some embodiments, including any of the foregoing, the thickness of the metal layer is 1 µm to 10 µm.

In some embodiments, including any of the foregoing, the thickness of the sintered oxide layer is 5 µm to 40 µm.

In some embodiments, including any of the foregoing, the width of the sintered bilayer is 300 mm or less.

In some embodiments, including any of the foregoing, the width of the sintered bilayer is at least 0.5 µm.

In some embodiments, including any of the foregoing, the sintered bilayer length is at least 1 meter.

In some embodiments, including any of the foregoing, the sintered bilayer length is less than 500 meter.

In some embodiments, including any of the foregoing, the bilayer moves through the second heating zone at a rate from 1 cm/min to 200 cm/min.

In some embodiments, including any of the foregoing, the bilayer moves through the second heating zone at a rate from 5 cm/min to 100 cm/min through the second heating zone.

In some embodiments, including any of the foregoing, the bilayer moves through the second heating zone at a rate from 8 cm/min to 80 cm/min.

In some embodiments, including any of the foregoing, the bilayer moves through the second heating zone at a rate of from 20 cm/min to 80 cm/min.

In some embodiments, including any of the foregoing, the bilayer moves through the second heating zone at a rate of about 80 cm/min.

In some embodiments, including any of the foregoing, the debindered bilayer is in an arched configuration characterized by a radius of curvature of 0.5 meters to 4.0 meters.

In some embodiments, including any of the foregoing, the debindered bilayer is in an arched configuration characterized by a radius of curvature of 2.0 meters to 4.0 meters.

In some embodiments, including any of the foregoing, the debindered bilayer is in an arched configuration characterized by a radius of curvature of 1.0 meter, 2.0 meters, 3.0 meters, 4.0 meters, or 5.0 meters.

In some embodiments, including any of the foregoing, the debindered bilayer is in an arched configuration characterized by a radius of curvature of 1 meter.

In some embodiments, including any of the foregoing, the debindered bilayer is in an arched configuration characterized by a radius of curvature of 3.8 meters.

In some embodiments, including any of the foregoing, the green bilayer is in an arched configuration characterized by a radius of curvature of 0.5 meters to 6.0 meters.

In some embodiments, including any of the foregoing, the green bilayer is in an arched configuration characterized by a radius of curvature of 0.5 meters to 4.0 meters.

In some embodiments, including any of the foregoing, the green bilayer is in an arched configuration characterized by a radius of curvature of 2.0 meters to 4.0 meters.

In some embodiments, including any of the foregoing, the green bilayer is in an arched configuration characterized by a radius of curvature of 1.0 meter, 2.0 meters, 3.0 meters, 4.0 meters, or 5.0 meters.

In some embodiments, including any of the foregoing, the green bilayer is in an arched configuration characterized by a radius of curvature of 1 meter.

In some embodiments, including any of the foregoing, the green bilayer is in an arched configuration characterized by a radius of curvature of 3.8 meters.

In some embodiments, including any of the foregoing, the green bilayer is in an arched configuration characterized by a radius of curvature of 5.0 meters.

In some embodiments, including any of the foregoing, at least one runway provides the arched configuration.

In some embodiments, including any of the foregoing, at least one roller provides the arched configuration.

In some embodiments, including any of the foregoing, at least one speed bump provides the arched configuration.

In some embodiments, including any of the foregoing, the first heating zone is 60 inches in length.

In some embodiments, including any of the foregoing, the second heating zone is 60 inches in length.

In some embodiments, including any of the foregoing, the debindered bilayer is in the second heating zone for about 1 second, 2 seconds, 3 seconds, 4 seconds, 5 seconds, 6 seconds, 7 seconds, 8 seconds, 9 seconds, 10 seconds, 11 seconds, 12 seconds, 13 seconds, 14 seconds, 15 seconds, 16 seconds, 17 seconds, 18 seconds, 19 seconds, 20 seconds, 21 seconds, 22 seconds, 23 seconds, 24 seconds, 25 seconds, 26 seconds, 27 seconds, 28 seconds, 29 seconds, 30 seconds, 31 seconds, 32 seconds, 33 seconds, 34 seconds, 35 seconds, 36 seconds, 37 seconds, 38 seconds, 39 seconds, 40 seconds, 41 seconds, 42 seconds, 43 seconds, 44 seconds, 45 seconds, 46 seconds, 47 seconds, 48 seconds, 49 seconds, 50 seconds, 51 seconds, 52 seconds, 53 seconds, 54 seconds, 55 seconds, 56 seconds, 57 seconds, 58 seconds, 59 seconds, 60 seconds, 70 seconds, 80 seconds, or 90 seconds.

In some embodiments, including any of the foregoing, the green bilayer moves horizontally through the first heating zone.

In some embodiments, including any of the foregoing, the green bilayer moves vertically through the first heating zone.

In another embodiment, set forth herein is a process for sintering a bilayer, including providing a bilayer under tension of 1 N to 300 N; wherein the bilayer thickness is 1 µm to 100 µm; wherein the bilayer includes a layer including a ceramic disposed on a metal layer; sintering the bilayer at about 1050° C. to about 1250° C. for about 1 second to about 3 minutes.

In some embodiments, including any of the foregoing, the ceramic layer includes ceramic powder.

In some embodiments, including any of the foregoing, the ceramic layer is a sintered ceramic.

In some embodiments, including any of the foregoing, the ceramic layer includes lithium-stuffed garnet.

In some embodiments, including any of the foregoing, the metal layer is nickel foil.

In some embodiments, including any of the foregoing, the bilayer thickness is from 1 µm to 50 µm.

In some embodiments, including any of the foregoing, the ceramic layer thickness is less than 25 µm.

In some embodiments, including any of the foregoing, the metal layer thickness is less than 25 µm.

In some embodiments, including any of the foregoing, the bilayer width is 300 mm or less.

In some embodiments, including any of the foregoing, the bilayer length is at least 1 meter long.

In some embodiments, including any of the foregoing, the bilayer is sintered at about 1100° C. to about 1200° C.

In some embodiments, including any of the foregoing, the bilayer moves at a rate of about 5 cm/min to about 100 cm/min.

In some embodiments, including any of the foregoing, the bilayer is disposed on a flat runway.

In some embodiments, including any of the foregoing, the bilayer is disposed on a curved runway.

In some embodiments, including any of the foregoing, the tension is 10 N to 200 N per meter of web width.

In some embodiments, including any of the foregoing, the tension is 40 N to 200 N per meter of web width.

In some embodiments, including any of the foregoing, the tension is 80 N to 150 N per meter of web width.

In some embodiments, including any of the foregoing, the tension is 125 N to 200 N per meter of web width.

In some embodiments, including any of the foregoing, the bilayer is under the recited tension as it moves through a first heating zone.

In some embodiments, including any of the foregoing, the bilayer is under the recited tension as it moves through a second heating zone.

In some embodiments, including any of the foregoing, the tension in the first heating zone is different than the tension in the second heating zone.

In some embodiments, including any of the foregoing, the tension in the first heating zone is lower than the tension in the second heating zone.

In some embodiments, including any of the foregoing, the tension is 125 N to 250 N per meter of web width in the first heating zone; and 10 N to 200 N per meter of web width in the second heating zone.

In some embodiments, including any of the foregoing, the tension is 125 N to 250 N per meter of web width in the first heating zone; and 40 N to 200 N per meter of web width in the second heating zone.

In some embodiments, including any of the foregoing, tension is maintained by a tension controller that has a ±10% tolerance or less.

The process of a foregoing embodiment, further including cooling the bilayer. In certain examples, the process includes cooling the bilayer to room temperature.

In some embodiments, including any of the foregoing, the bilayer includes a green body layer that includes ceramic powder and a binder.

In some embodiments, including any of the foregoing, the bilayer includes a sintered oxide layer.

In some embodiments, including any of the foregoing, the bilayer includes sintered lithium-stuffed garnet.

In some embodiments, including any of the foregoing, the metal layer includes nickel, iron, or an alloy thereof.

In some embodiments, including any of the foregoing, the thickness of the metal layer is 1 µm to 10 µm.

In some embodiments, including any of the foregoing, the thickness of the sintered oxide layer is 5 µm to 40 µm.

In some embodiments, including any of the foregoing, the width of the sintered bilayer is 300 mm or less.

In some embodiments, including any of the foregoing, the width of the sintered bilayer is at least 0.5 µm.

In some embodiments, including any of the foregoing, the sintered bilayer length is at least 1 meter. In some examples, the sintered bilayer length is at least 2 meters. In some examples, the sintered bilayer length is at least 3 meters. In some examples, the sintered bilayer length is at least 4 meters. In some examples, the sintered bilayer length is at least 5 meters. In some examples, the sintered bilayer length is at least 6 meters. In some examples, the sintered bilayer length is at least 7 meters. In some examples, the sintered bilayer length is at least 8 meters. In some examples, the sintered bilayer length is at least 9 meters. In some examples, the sintered bilayer length is at least 10 meters. In some examples, the sintered bilayer length is at least 20 meters. In some examples, the sintered bilayer length is at least 30 meters. In some examples, the sintered bilayer length is at least 40 meters. In some examples, the sintered bilayer length is at least 50 meters. In some examples, the sintered bilayer length is at least 60 meters. In some examples, the sintered bilayer length is at least 70 meters. In some examples, the sintered bilayer length is at least 80 meters. In some examples, the sintered bilayer length is at least 90 meters. In some examples, the sintered bilayer length is at least 100 meters.

In some embodiments, including any of the foregoing, the sintered bilayer length is less than 500 meter.

In some embodiments, including any of the foregoing, the bilayer moves through the second heating zone at a rate from 1 cm/min to 200 cm/min.

In some embodiments, including any of the foregoing, the bilayer moves through the second heating zone at a rate from 5 cm/min to 100 cm/min through the second heating zone.

In some embodiments, including any of the foregoing, the bilayer moves through the second heating zone at a rate from 8 cm/min to 80 cm/min.

In some embodiments, including any of the foregoing, the bilayer moves through the second heating zone at a rate of from 20 cm/min to 80 cm/min.

In some embodiments, including any of the foregoing, the bilayer moves through the second heating zone at a rate of about 10 cm/min.

In some embodiments, including any of the foregoing, the bilayer moves through the second heating zone at a rate of about 20 cm/min.

In some embodiments, including any of the foregoing, the bilayer moves through the second heating zone at a rate of about 30 cm/min.

In some embodiments, including any of the foregoing, the bilayer moves through the second heating zone at a rate of about 40 cm/min.

In some embodiments, including any of the foregoing, the bilayer moves through the second heating zone at a rate of about 50 cm/min.

In some embodiments, including any of the foregoing, the bilayer moves through the second heating zone at a rate of about 60 cm/min.

In some embodiments, including any of the foregoing, the bilayer moves through the second heating zone at a rate of about 70 cm/min.

In some embodiments, including any of the foregoing, the bilayer moves through the second heating zone at a rate of about 80 cm/min.

In some embodiments, including any of the foregoing, the bilayer moves through the second heating zone at a rate of about 90 cm/min.

In some embodiments, including any of the foregoing, the bilayer moves through the second heating zone at a rate of about 100 cm/min.

In some embodiments, including any of the foregoing, the bilayer moves through the second heating zone at a rate of about 110 cm/min.

In some embodiments, including any of the foregoing, the bilayer moves through the second heating zone at a rate of about 120 cm/min.

In some embodiments, including any of the foregoing, the bilayer moves through the second heating zone at a rate of about 130 cm/min.

In some embodiments, including any of the foregoing, the bilayer moves through the second heating zone at a rate of about 140 cm/min.

In some embodiments, including any of the foregoing, the bilayer moves through the second heating zone at a rate of about 150 cm/min.

In some embodiments, including any of the foregoing, the bilayer moves through the second heating zone at a rate of about 160 cm/min.

In some embodiments, including any of the foregoing, the bilayer moves through the second heating zone at a rate of about 170 cm/min.

In some embodiments, including any of the foregoing, the bilayer moves through the second heating zone at a rate of about 180 cm/min.

In some embodiments, including any of the foregoing, the bilayer moves through the second heating zone at a rate of about 190 cm/min.

In some embodiments, including any of the foregoing, the bilayer moves through the second heating zone at a rate of about 200 cm/min.

In some embodiments, including any of the foregoing, the bilayer is in an arched configuration characterized by a radius of curvature of 0.5 meters to 6.0 meters.

In some embodiments, including any of the foregoing, the bilayer is in an arched configuration characterized by a radius of curvature of 0.5 meters to 4.0 meters.

In some embodiments, including any of the foregoing, the bilayer is in an arched configuration characterized by a radius of curvature of 2.0 meters to 4.0 meters.

In some embodiments, including any of the foregoing, the bilayer is in an arched configuration characterized by a radius of curvature of 2.0 meters to 6.0 meters.

In some embodiments, including any of the foregoing, the bilayer is in an arched configuration characterized by a radius of curvature of 1.0 meter, 2.0 meters, 3.0 meters, 4.0 meters, or 5.0 meters.

In some embodiments, including any of the foregoing, the bilayer is in an arched configuration characterized by a radius of curvature of 1 meter.

In some embodiments, including any of the foregoing, the bilayer is in an arched configuration characterized by a radius of curvature of 3.8 meters.

In some embodiments, including any of the foregoing, the bilayer is in an arched configuration characterized by a radius of curvature of 5.0 meters.

In some embodiments, including any of the foregoing, at least one runway provides the arched configuration.

In some embodiments, including any of the foregoing, at least one roller provides the arched configuration.

In some embodiments, including any of the foregoing, at least one speed bump provides the arched configuration.

In some embodiments, including any of the foregoing, the first heating zone is 60 inches in length.

In some embodiments, including any of the foregoing, the second heating zone is 60 inches in length.

In some embodiments, including any of the foregoing, the bilayer is in the second heating zone for about 1 second, 2 seconds, 3 seconds, 4 seconds, 5 seconds, 6 seconds, 7 seconds, 8 seconds, 9 seconds, 10 seconds, 11 seconds, 12 seconds, 13 seconds, 14 seconds, 15 seconds, 16 seconds, 17 seconds, 18 seconds, 19 seconds, 20 seconds, 21 seconds, 22 seconds, 23 seconds, 24 seconds, 25 seconds, 26 seconds, 27 seconds, 28 seconds, 29 seconds, 30 seconds, 31 seconds, 32 seconds, 33 seconds, 34 seconds, 35 seconds, 36 seconds, 37 seconds, 38 seconds, 39 seconds, 40 seconds, 41 seconds, 42 seconds, 43 seconds, 44 seconds, 45 seconds, 46 seconds, 47 seconds, 48 seconds, 49 seconds, 50 seconds, 51 seconds, 52 seconds, 53 seconds, 54 seconds, 55 seconds, 56 seconds, 57 seconds, 58 seconds, 59 seconds, 60 seconds, 70 seconds, 80 seconds, or 90 seconds.

In some embodiments, including any of the foregoing, the bilayer moves horizontally through the first heating zone.

In some embodiments, including any of the foregoing, the bilayer moves vertically through the first heating zone.

In a further embodiment, set forth herein is a process for sintering a bilayer, including providing a bilayer under tension of 5 N to 100 N; wherein the bilayer thickness is 1 µm to 100 µm; wherein the bilayer includes a layer including a ceramic disposed on a metal layer; sintering the bilayer in an arched configuration at about 1050° C. to about 1250° C. for about 1 second to about 3 minutes.

In another embodiment, set forth herein is a process for sintering a bilayer, including providing a bilayer; wherein the bilayer thickness is 1 µm to 100 µm; wherein the bilayer includes a layer including a ceramic disposed on a metal layer; sintering the bilayer in an arched configuration at about 1050° C. to about 1250° C. for about 1 second to about 3 minutes.

In some embodiments, including any of the foregoing, the bilayer is under tension of 5 N to 100 N.

In some embodiments, including any of the foregoing, the bilayer radius of curvature is 2 meters to 4 meters.

In some embodiments, including any of the foregoing, the bilayer radius of curvature is 2 meters to 6 meters.

In some embodiments, including any of the foregoing, the ceramic layer includes ceramic powder and a binder.

In some embodiments, including any of the foregoing, the ceramic layer is a sintered ceramic.

In some embodiments, including any of the foregoing, the ceramic layer is sintered lithium-stuffed garnet.

In some embodiments, including any of the foregoing, the metal layer is nickel foil.

In some embodiments, including any of the foregoing, the bilayer thickness is from 1 µm to 50 µm.

In some embodiments, including any of the foregoing, the ceramic layer thickness is less than 25 µm.

In some embodiments, including any of the foregoing, the metal layer thickness is less than 10 µm.

In some embodiments, including any of the foregoing, the bilayer width is 300 mm or less.

In some embodiments, including any of the foregoing, the bilayer length is at least 1 meter long.

In some embodiments, including any of the foregoing, the bilayer is sintered at about 1100° C. to about 1200° C.

In some embodiments, including any of the foregoing, the bilayer moves at a rate of about 5 cm/min and 80 cm/min.

In some embodiments, including any of the foregoing, the bilayer is disposed on a curved runway.

J. Examples

Solvents used herein, unless stated otherwise, were selected from alcohols, such as methanol, ethanol, isopropanol, butanol, pentanol, hexanol, and other classes of organic solvents such as ethers and aromatic solvents, including, but not limited to, dibutyl ether, diethyl ether, diisopropyl ether, dimethoxy ethane, diethoxy ethane, tetrahydrofuran, toluene, xylene, toluene: ethanol, acetone, N-methyl-2-pyrrolidone (NMP) diacetone alcohol, ethyl acetate, acetonitrile, hexane, nonane, dodecane, and methyl ethyl ketone (MEK).

Reagents, chemicals, and materials were commercially purchased unless specified otherwise to the contrary.

Pouch cell containers were purchased from Showa Denko.

The Electrochemical potentiostat used was an Arbin potentiostat.

Electrical impedance spectroscopy (EIS) was performed with a Biologic VMP3, VSP, VSP-300, SP-150, or SP-200.

Electron microscopy was performed in a FEI Quanta SEM, an Apreo SEM, a Helios 600i, or a Helios 660 FIB-SEM.

X-ray powder diffraction (XRD) was performed in a Bruker D8 Advance A25 with Cu K-α radiation at room temperature (e.g., between 21° C. and 23° C.). Source is Cu-Ka, wavelength at 1.54 Å. X-ray at 40 kV and 25 mA. Detector: LYNXEYE_XE with PSD opening 2.843. Divergence slit at 0.6 mm and antiscatter at 5.0 mm fixed.

Milling was performed using a Retsch PM 400 Planetary Ball Mill. Mixing was performed using a Fischer Scientific vortex mixer, a Flaktek speed mixer, or a Primix filmix homogenizer unless specified otherwise.

Casting was performed on a TQC drawdown table. Calendering was performed on an IMC calender unless specified otherwise.

Light scattering was performed on a Horiba, model: Partica, Model No.: LA-950V2, general term: laser scattering particle size distribution analyzer.

The Lithium Nickel Cobalt Manganese Oxide (NMC) used in the Examples was $LiNi_{0.85}Co_{0.1}Mn_{0.05}O_2$ unless specified otherwise.

Example 1—Making a Sintered Roll—Prophetic Example

In this Example, a slurry would be made by mixing lithium stuffed garnet, a solvent, a binder, and a plasticizer. The following slurry compositions would be used.

Slurry one: LLZO powders would be dispersed in ethanol with 2 wt % polyacrylic acid, using an ultrasonic horn. Larger particles would be allowed to settle. The supernatant would be decanted and the recovered powder would be dried in air. The collected powder, polyvinyl butyral, benzyl butyl phthalate, acetone, and ethanol at weight ratios 37:3:3:29:29 would be added to a vial and ball-milled with 2.0 mm diameter $ZrO_2$ beads for 10 hours to 24 hours. The slurry would be cast using a doctor blade onto a metal substrate; film thicknesses would be controlled by adjusting the blade height. The green film would be dried and wound around a core of at least 8 cm diameter.

Slurry two: LLZO powders with 3 percent by weight (wt %) polyacrylic acid would be dispersed in ethanol. A second solution of polyvinyl butyral, benzyl butyl phthalate, and acetone would be mixed in weight ratios of 1:1:10. The second solution and first solution would be mixed in equal parts by volume. The resulting slurry would be milled with $ZrO_2$ beads for 8-16 hours. The slurry would be cast using a doctor blade onto a metal substrate at a thickness controlled by the doctor blade height. The green film would be dried and wound around a core of at least 8 cm diameter.

Slurry three: An aqueous polymer solution would be prepared by dissolving methylcellulose, polyethylene glycol and glycerol in water. The component weight ratios would be water:methylcellulose:polyethylene glycol:glycerol=100:1:4:4. LLZO (lithium-stuffed garnet) powder would be added to the polymer solution at equal weight to the solution. The slurry would be mixed with $ZrO_2$ beads for 5-60 min. The slurry would be cast on metal foil with a doctor blade; the thickness would be controlled by doctor blade gap. The green film would be dried and wound around a core of at least 8 cm diameter.

Slurry four: LLZO was ball milled in a mixture of equal parts of ethanol, xylene, toluene. Menhaden fish oil at 2-5 wt % relative to LLZO would be added dropwise for 30 minutes. Polyvinyl butyral at 6-10 wt % relative to LLZO, polyethylene glycol at 2-4 wt % relative to LLZO and benzyl butyl phthalate at 3-7 wt % relative to LLZO would be added and mixed. Tapes would be cast on metal substrate with a doctor blade. After drying at 45° C. for 1-6 hours, the tape would be wound around a core of at least 8 cm diameter.

Slurry five: A slurry would be prepared by mixing 100 g LLZO powder, 2-4 g of glyceryl trioleate, 100-200 g of n-propyl propionate, 15-25 g of elvacite E-2046 and ball milling. The slurry would be cast by doctor blade onto a metal foil substrate, dried, and wound.

Slurry six: A slurry would be prepared by mixing 20 g LLZO powder, 25-40 g of a solvent mixture (ethanol: butanol:propylene glycol in volume percentages within the ranges 70-80:15-25:0-5), 1-3 g of dibutyl phthalate, 1-4 g of PVB, and 0.1-1 g of dispersant in a mill. The dispersant may be a dispersant such as Anti-terra-202 from BYK. After mixing, the slurry would be filtered, de-aerated, and cast by comma coating onto a metal substrate. The green tape would be dried and wound.

Slurry seven: A slurry would be made by mixing water (30 parts by mass), LLZO powder (12-18 parts by mass) a binder solution (WB4101, WB40B-44, WB40B-53 from Polymer Innovations at 8 parts by mass) for at least one hour in a mill. After mixing, the slurry would be filtered, de-aerated, and cast by slot die coating onto a metal substrate. The green tape would be dried and wound.

Slurry eight: LLZO powder would be milled in a mixed solvent of toluene and isopropanol plus fish oil. The mixture would be mixed for 1-5 hours to prepare a slurry. A binder solution of toluene and isopropanol plus polyvinyl butyral, and butyl benzyl phthalate would be mixed. The binder solution would be added to the slurry and mixed. The mixture would be de-aerated, filtered, and cast onto a metal carrier. The green tape would be dried and wound.

Slurry nine: A slurry of calcined LLZO would be prepared by mixing 80 g of calcined LLZO powder with 50 ml of a 33% w/w solution of polyvinyl butyral in toluene and 4 g of plasticizer di-butyl phthalate. A polyacrylic binder would be included at 3 weight percent of the solution. The slurry would be tape casted onto a metal substrate using a doctor blade. The cast mixed slurry would be allowed to dry at room temperature for 2-6 hours to form a green film. The dried green film would be wound around a core of at least 8 cm diameter.

After drying, the dried slurry on the nickel foil would be placed on a continuous processing apparatus.

In a first step, the binder would be burned off by heating the green bilayer to produce a debindered bilayer.

In a second step, the green tape would be heated in the bisque oven to produce a bisqued bilayer.

In a third step, the green tape would be sintered at about 1100° C. to form a sintered bilayer.

The sintered bilayer film would be rolled up on the end roller. Alternatively, the sintered bilayer would be cut to sheets.

In a second processing apparatus, the green bilayer would be moved back and forth between the bisque and binder burn-out oven. The ovens would be turned on and off to selectively heat the film in either the bisque or binder burn-out oven. For sintering, the bisque oven would be increased in temperature to the sintering temperature.

Example 2—Making a Sintered Roll—Prophetic Example

In this Example, a slurry would be made by mixing lithium stuffed garnet, a solvent, a binder, and a plasticizer.

Specifically, lithium-stuffed garnet would be mixed with an acrylic binder and benzyl butyl phthalate in an aprotic solvent to form the slurry. The slurry would be cast onto a Ni foil to form the bilayer. The slurry would be dried and then rolled up.

After drying, the dried slurry on the nickel foil would be placed on the continuous manufacturing line. The green bilayer would form when the slurry dried on the nickel foil. Then, the tape would be moved through the apparatus.

The bilayer would be moved at 5 cm/min through the processing apparatus with a hold at the sintering section for about 10 minutes at around 1100° C.

Example 3—Making a Debindered Roll with Controlled Grain and Particle Sizes

A slurry was made by dispersing powder of lithium-stuffed garnet (with $d_{50}$<1 µm) with solvent, binder, and plasticizer, wherein the binder and plasticizer content was 8-20 wt % of the solids. Xylenes were added to control viscosity in the range of 50-1000 cP at a shear rate of 20 Hz. The slurry was cast on a nickel foil of width 60 mm to 150 mm using a comma coater with a fixed gap distance of 200 µm-400 µm. The bilayer was dried and rolled up around a core of about 9 cm diameter. The green ceramic layer thickness was 50 µm to 80 µm thick; the metal layer thickness was 5 µm to 15 µm thick. The roll was transferred to a process apparatus, unwound, and fed at a speed of 5-20 cm/min through temperature zones configured to debinder (i.e., to remove the binder from) the bilayer. The temperature zones were set to 600 to 900° C., with an atmosphere configured to remove organic burnout product and reduce lithium loss. After debindering, the product was rolled up. The roll of debindered bilayer material was stored for later sintering, testing and analysis.

Example 4—Making a Bisque Roll with Controlled Grain and Particle Sizes

A slurry was made by dispersing powder of lithium-stuffed garnet (with $d_{50}$<1 µm) with solvent, binder, and plasticizer, wherein the binder and plasticizer content was 8 wt % to 20 wt % of the solids. Solvent was added to control viscosity in the range of 50-1000 cP at a shear rate of 20 Hz. The slurry was cast on a metal foil of width 60 mm to 150 mm using a comma coater with a fixed gap distance of 200 µm to 400 µm. The bilayer was dried and rolled up around a core of about 9 cm diameter. The green ceramic layer thickness was 50 µm to 80 µm thick; the metal layer thickness was 5 µm to 15 µm thick. The roll was transferred to a process apparatus, unwound, and fed at a speed of 5 cm/min to 20 cm/min through temperature zones configured to debinder the bilayer. The temperature zones were set to 600-900° C., with an atmosphere configured to remove organic burnout product and reduce lithium loss.

Example 5—Making a Sintered Roll with Controlled Grain and Particle Sizes

A slurry was made by dispersing powder of lithium-stuffed garnet (with $d_{50}$<1 µm) with solvent, binder, and plasticizer, wherein the binder and plasticizer content was 8-20 wt % of the solids. Solvent was added to control viscosity in the range of 50-1000 cP at a shear rate of 20 Hz. The slurry was cast on a metal foil of width 60 mm to 150 mm using a comma coater with a fixed gap distance of 200 µm to 400 µm. The bilayer was dried and rolled up around a core of about 9 cm diameter. The green ceramic layer thickness was 50 µm to 80 µm thick; the metal layer thickness was 5 µm to 15 µm thick. The roll was transferred to a process apparatus, unwound, and fed at a speed of 5 cm/min to 20 cm/min through temperature zones configured to debinder, bisque and sinter the bilayer. The temperature zones were set to 600-1300° C., with an atmosphere configured to remove organic burnout product and reduce lithium loss. After sintering, the product was rolled up. The roll of sintered bilayer material was stored for later testing and analysis.

Example 6—Testing a Sintered Roll

Sintered films were made as in Example 5. Area-specific resistance (ASR) was measured by current interrupt measurement.

Battery cells were made from the separator cut from a roll of sintered film and a cathode of 3 mAh/cm² loading of NMC ($Li(Ni_{1-x-y}Mn_xCo_y)O_2$) active material. The batteries were charged and discharged at 30° C. with an intermittent current pulse with constant current density of 0.33 mA/cm² and within the operation voltage of 3 V to 4.2 V. The current pulse was applied for 30 minutes, the current was stopped, and the system was relaxed at open circuit conditions for 3 minutes. This intermittent pulse was repeated until the cell voltage reached to 4.2V during charging and 3V during discharging. The area-specific resistance (ASR) of the battery cells was obtained by reading voltage drop during relaxation steps during charging. The ASR was measured to be between 15 to 25 Ωcm² at 30° C.

Example 7—Making and Testing a Sintered Bilayer

Sintered bilayer films were made as in Example 5. Specifically, lithium-stuffed garnet would be mixed with an acrylic binder and benzyl butyl phthalate in an aprotic solvent to form the slurry. The slurry was cast onto a Ni foil to form the bilayer.

The bilayer (referred to as a web) web moved at 5 cm/min through the CML with a hold at the sintering section for about 10 minutes at around 1100° C.

A battery was assembled with a 30×30 mm bilayer separator cut from the sintered roll and a cathode of 3.1 mAh/cm² loading of NMC active material. The cathode was infiltrated by a liquid or gel catholyte containing a lithium salt and a solvent to dissolve the salt. The cell was cycled at a rate of 1 C charge, 1 C discharge rate, at 30° C., 50 pounds-per-square-inch (PSI) (~3.4 atm). The cell retained more than 90% of its initial capacity after 800 cycles of 100% depth-of-discharge. See FIG. 13.

Figure 6:
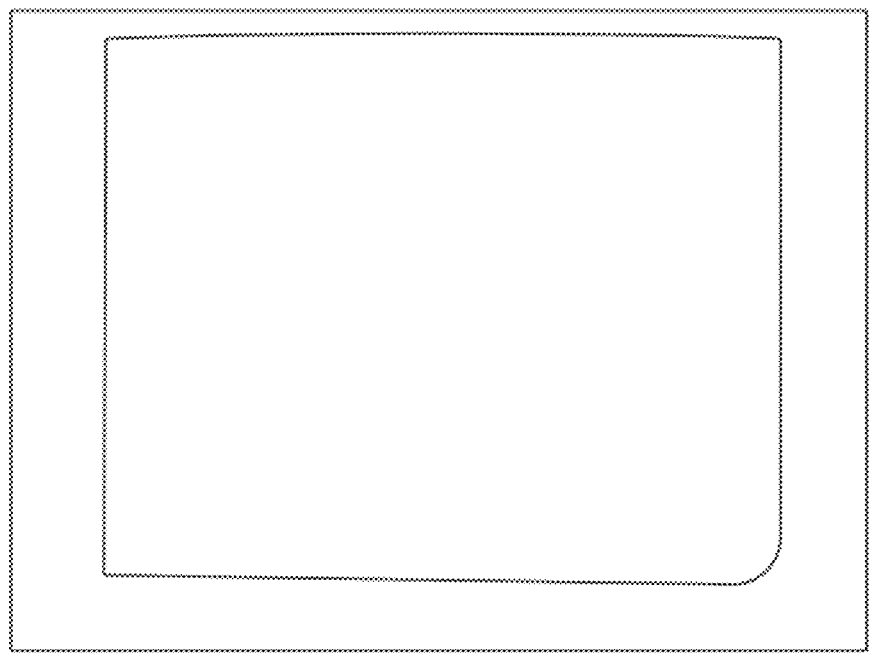
FIG. 6 shows an image of a bilayer made in Example 8.
Figure 7:
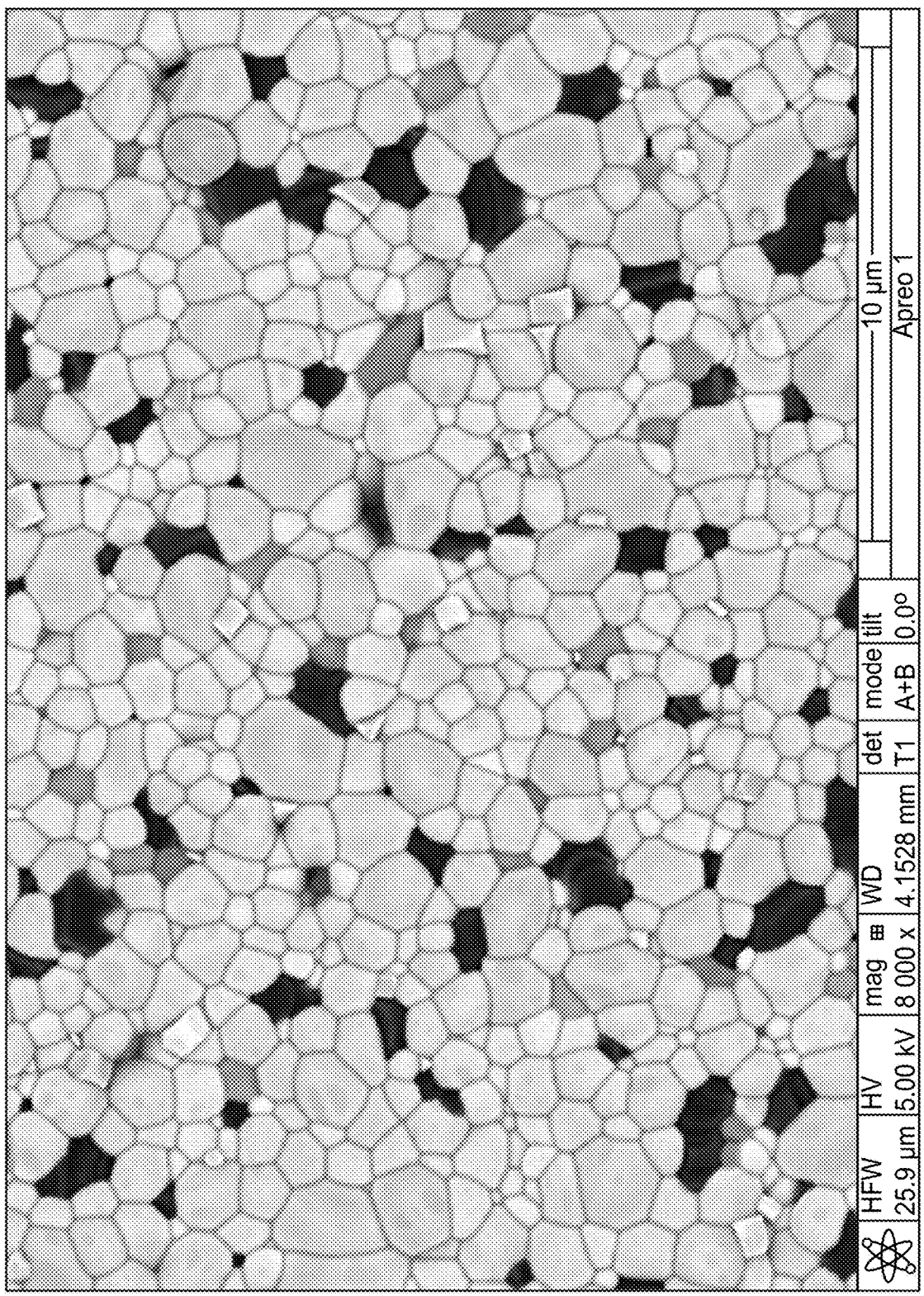
FIG. 7 shows a scanning electron microscopy (SEM) top-down image of a bilayer showing the lithium-stuffed garnet layer of the bilayer made in Example 8. The lithium-stuffed garnet top layer has a porosity less than 1% by volume.
Figure 8:
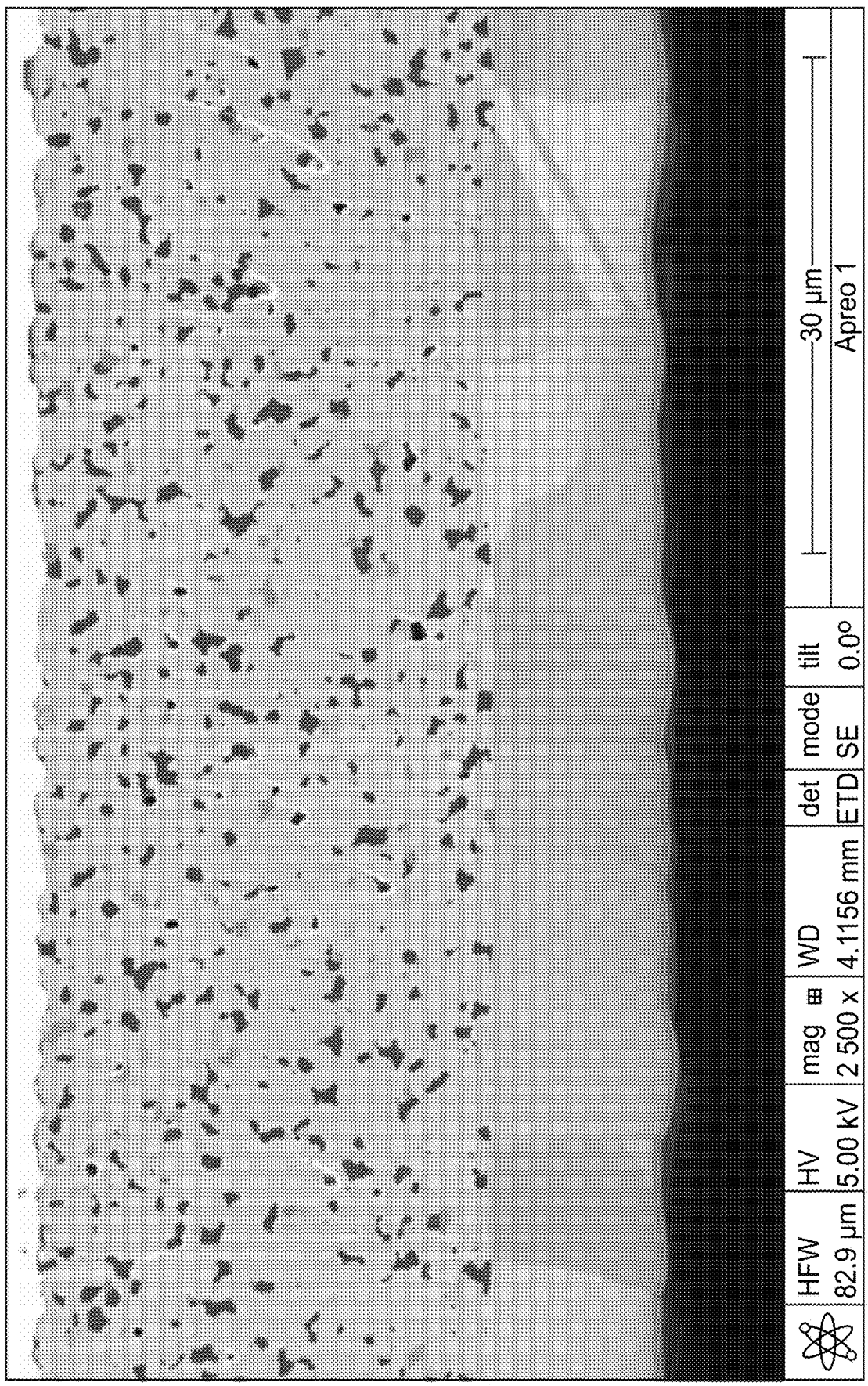
FIG. 8 shows a scanning electron microscopy (SEM) cross-sectional image of the sintered oxide, comprising lithium-stuffed garnet, layer of a bilayer made in Example 8. The lithium-stuffed garnet top layer has a porosity less than 1% by volume.
Figure 9:
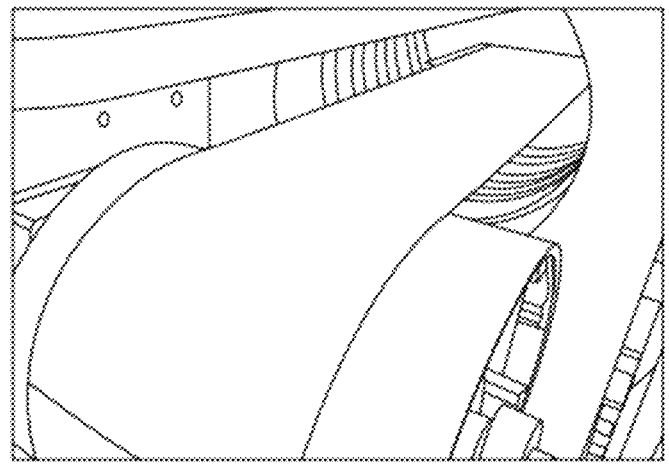
FIG. 9 shows a bisque bilayer and a sintered bilayer wound around rollers.
Figure 9:
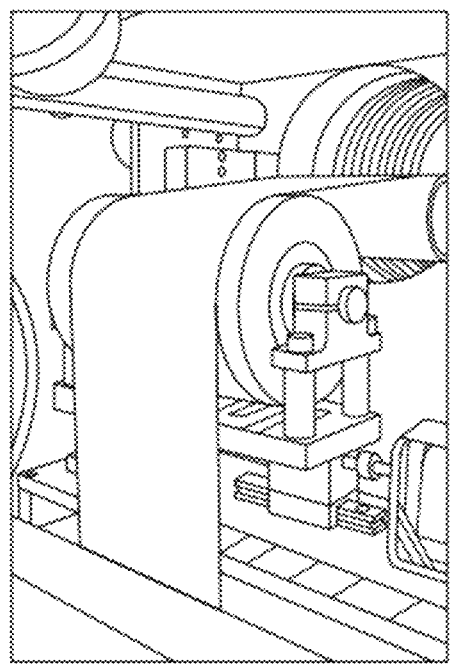

Example 8-Making Material in FIGS. 6, 7, and 8

$D_{90}$ herein is for sintered grains unless stated otherwise.

A slurry was made by dispersing powder of lithium-stuffed garnet with solvent, binder, and plasticizer, wherein the binder and plasticizer content was 8-20 wt % of the solids. Solvent was added to control viscosity in the range of 50-1000 cP at a shear rate of 20 Hz. The slurry was cast on a metal foil (width 60-150 mm) using a comma coater with a fixed gap distance of 200-400 µm, dried, and rolled up. The green ceramic layer thickness was 50 µm-80 µm thick; the metal layer thickness was 5-15 µm thick. The roll was transferred to a process apparatus, unwound, and fed at a speed of 5-20 cm/min through temperature zones configured to debinder, bisque, and sinter the layer. The binder burn-out temperature zones include an atmosphere configured to remove organic burnout. The sintering temperature zones were set to 900-1250° C., to promote densification. After sintering, the product was rolled up. The roll of sintered material was transferred to a cutting machine that cut pieces into sizes of 11 mm disc, 30×30 mm square, and 70×85 mm rectangles for testing and analysis. The product is imaged in FIGS. 6 and 7.

Scanning electron microscopy (SEM) was used to image a cross-section of the bilayer made herein. The lithium-stuffed garnet top layer is ~32 μm thick. The grain size $D_{90}$ is 1.3-1.9 μm. FIG. 6 shows an optical image of the lithium-stuffed garnet side of the bilayer. FIG. 7 shows a top-down view scanning electron microscopy (SEM) image of the lithium-stuffed garnet side of the bilayer. FIG. 8 shows a scanning electron microscopy (SEM) cross-sectional image of a bilayer made by a process apparatus herein. The lithium-stuffed garnet top layer has a porosity less than 1% by volume.

The porosity is volume %, calculated by image segmentation. A deep learning model is used to identify regions in the image that are porous; the model is trained on manually-segmented images that are labeled with the dark regions as porosity.

Example 10—Sintering a Bilayer Using a Flat Runway

A slurry was made by dispersing powder of lithium-stuffed garnet (with $d_{50}$<1 μm) with xylenes, acrylic binder, plasticizer, and acrylate dispersant, wherein the binder, plasticizer, and dispersant content was 10-20 wt % of the solids. Solvent was added to control viscosity in the range of 50-1000 cP at a shear rate of 20 Hz. The slurry was cast on a metal foil of width 60 mm to 150 mm using a comma coater with a fixed gap distance of 100 μm to 200 μm. The green ceramic layer thickness was 20 μm to 50 μm thick; the metal layer thickness was 5 μm to 10 μm thick. The roll was transferred to a process apparatus, unwound, and fed at a speed of 5 cm/min to 80 cm/min through a first heating zone to prepare a debindered bilayer. The temperature of the first heating zone was 700° C. to 900° C.

Then the roll was fed at a speed of 40 cm/min to 200 cm/min through a second heating zone to prepare a sintered bilayer. The temperature of the second heating zone was 1050° C. to 1250° C. The second heating zone was a tube furnace about 60 inches in length. A flat runway extended from the opening to the exit of the second heating zone. The debindered bilayer conformed to the same of the runway by applying tension to the debindered bilayer between 3 and 35 N per meter of web width.

After sintering, the product was cut into sheets and was stored for later testing and analysis.

Example 11—Sintering a Bilayer Using an Arched Configuration Runway

A slurry was made by dispersing powder of lithium-stuffed garnet (with $d_{50}$<1 μm) with xylenes, acrylic binder, plasticizer, and acrylate dispersant, wherein the binder, plasticizer, and dispersant content was 10-20 wt % of the solids. Solvent was added to control viscosity in the range of 50-1000 cP at a shear rate of 20 Hz. The slurry was cast on a metal foil of width 60 mm to 150 mm using a comma coater with a fixed gap distance of 100 μm to 200 μm. The bilayer was dried and rolled up around a core of about 9 cm diameter. The green ceramic layer thickness was 20 μm to 50 μm thick; the metal layer thickness was 5 μm to 10 μm thick. The roll was transferred to a process apparatus, unwound, and fed at a speed of 20 cm/min to 200 cm/min through a first heating zone to prepare a debindered bilayer. The temperature of the first heating zone was 700° C. to 900° C.

Then the roll was fed at a speed of 10 cm/min, 20 cm/min, 40 cm/min, or 101 cm/min through a second heating zone to prepare a sintered bilayer. The temperature of the second heating zone was 1050° C. to 1250° C. The second heating zone was a tube furnace about 60 inches in length. The bilayer was passed through the second heating zone for times between 90 seconds and 5 minutes. An arched runway having a radius of curvature of 5.0 meters extended from the opening to the exit of the second heating zone. The debindered bilayer conformed to the same of the runway by applying tension to the debindered bilayer between 40 and 187.5 N per meter of web width.

After sintering, the bilayers were cut into pieces.

FIG. 16 shows height maps of resulting bilayers that were made in this Example 11.

FIGS. 17-20 show the flatness of the resulting bilayers made using the heat treatment process with variable tensions in N per meter of web width as listed.

FIG. 17 had a web speed of 10 cm/min; FIG. 18 had a web speed of 20 cm/min; FIG. 19 had a web speed of 40.5 cm/min; FIG. 20 had a web speed of 101 cm/min. Speed listed in FIGS. 17-20 is in inches/minute.

Table 1 shows the average roughness, as measured using a Keyence microscope, of the data from FIGS. 17-20.

TABLE 1

| Web speed (inches/m) | Tension (N/m) | Avg. roughness |
|---|---|---|
| 4 | 0.1 | 31.7 |
| 4 | 2.5 | 24.9 |
| 4 | 0.9 | 17.9 |
| 8 | 0.1 | 20.5 |
| 8 | 19.6 | 16.7 |
| 8 | 31.1 | 11.1 |
| 8 | 39.2 | 13.6 |
| 8 | 62.5 | 9.1 |
| 8 | 93.9 | 5.2 |
| 8 | 125 | 5.6 |
| 8 | 187.5 | 7.6 |
| 16 | 9.8 | 7.5 |
| 16 | 125 | 5.4 |
| 16 | 187.5 | 4.9 |
| 40 | 0.1 | 9.9 |
| 40 | 9.8 | 7.3 |

The embodiments and examples described above are intended to be merely illustrative and non-limiting. Those skilled in the art will recognize or will be able to ascertain using no more than routine experimentation, numerous equivalents of specific compounds, materials and procedures. All such equivalents are considered to be within the scope and are encompassed by the appended claims.

What is claimed is:

1. A process for making a sintered bilayer, comprising:
    providing a green bilayer, comprising a green body layer and a metal layer, under tension of 1 N to 300 N per meter of web width;
    moving the green bilayer through a first heating zone to produce a debindered bilayer;
    moving the debindered bilayer through a second heating zone to prepare a sintered bilayer;
    wherein the debindered bilayer is in an arched configuration as the debindered bilayer moves through the second heating zone;
    wherein the debindered bilayer is in the second heating zone for about 1 second to about 3 minutes;
    wherein the tension is from 31.1 N to 187.5 N per meter of web width in the second heating zone;
    wherein the temperature in the second heating zone is 1050° C. to 1250° C.; and
    wherein the thickness of the sintered bilayer is less than 100 μm.

2. The process of claim 1, wherein the green bilayer is under tension of 1 N to 300 N in the first heating zone.

3. The process of claim 1, wherein the tension in the first heating zone is different than the tension in the second heating zone.

4. The process of claim 1, wherein the tension in the first heating zone is lower than the tension in the second heating zone.

5. The process of claim 1, wherein the tension is 3 N to 35 N per meter of web width in the first heating zone.

6. The process of claim 1, wherein the tension is 3 N to 30 N per meter of web width in the first heating zone.

7. The process of claim 1, wherein the tension is 10 N to 20 N per meter of web width in the first heating zone.

8. The process of claim 1, wherein the sintered bilayer comprises sintered lithium-stuffed garnet.

9. The process of claim 1, wherein the metal layer comprises nickel, iron, or an alloy thereof.

10. The process of claim 1, wherein the thickness of the metal layer is 1 µm to 10 µm.

11. The process of claim 8, wherein the thickness of the sintered lithium-stuffed garnet layer is 5 µm to 40 µm.

12. The process of claim 1, wherein the sintered bilayer length is at least 1 meter.

13. The process of claim 1, wherein debindered bilayer is in an arched configuration characterized by a radius of curvature of 0.5 meters to 6.0 meters.

14. The process of claim 1, wherein at least one runway provides the arched configuration.

15. The process of claim 1, wherein at least one roller provides the arched configuration.

16. The process of claim 1, wherein at least one speed bump provides the arched configuration.

17. The process of claim 1, wherein the debindered bilayer is heated at a rate higher than 300° C./min.

18. A sintered bilayer with an average roughness of less than 15 as measured by Keyence microscopy, wherein the sintered bilayer is made by a process comprising:
   providing a green bilayer, comprising a green body layer and a metal layer, under tension of 1 N to 300 N per meter of web width;
   moving the green bilayer through a first heating zone to produce a debindered bilayer;
   moving the debindered bilayer through a second heating zone to prepare a sintered bilayer;
   wherein the debindered bilayer is in an arched configuration as the debindered bilayer moves through the second heating zone;
   wherein the debindered bilayer is in the second heating zone for about 1 second to about 3 minutes;
   wherein the tension is from 31.1 N to 187.5 N per meter of web width in the second heating zone;
   wherein the temperature in the second heating zone is 1050° C. to 1250° C.; and
   wherein the thickness of the sintered bilayer is less than 100 µm.

19. The process of claim 1, wherein the debindered bilayer moves through the second heating zone at a rate from 10 cm/min to 80 cm/min.

20. The process of claim 19, wherein the rate is from 20 cm/min to 80 cm/min.

* * * * *